US011350060B1

(12) United States Patent
Mitura

(10) Patent No.: US 11,350,060 B1
(45) Date of Patent: May 31, 2022

(54) USING MOTION SENSORS FOR DIRECTION DETECTION

(71) Applicant: Amazon Technologies, Inc., Seattle, WA (US)

(72) Inventor: Michael Jason Mitura, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 91 days.

(21) Appl. No.: 16/285,726

(22) Filed: Feb. 26, 2019

Related U.S. Application Data

(60) Provisional application No. 62/638,895, filed on Mar. 5, 2018.

(51) Int. Cl.
*H04N 7/18* (2006.01)
*H04N 5/33* (2006.01)
*G06T 7/20* (2017.01)

(52) U.S. Cl.
CPC ............ *H04N 7/188* (2013.01); *G06T 7/20* (2013.01); *H04N 5/33* (2013.01); *H04N 7/186* (2013.01); *G06T 2207/10048* (2013.01); *G06T 2207/30196* (2013.01); *G06T 2207/30232* (2013.01)

(58) Field of Classification Search
CPC .......... H04N 7/188; H04N 5/33; H04N 7/186; G06T 7/20; G06T 2207/30232; G06T 2207/30196; G06T 2207/10048
See application file for complete search history.

(56) References Cited

U.S. PATENT DOCUMENTS

| | | |
|---|---|---|
| 7,193,644 B2 | 3/2007 | Carter |
| 8,139,098 B2 | 3/2012 | Carter |
| 8,144,183 B2 | 3/2012 | Carter |
| 8,154,581 B2 | 4/2012 | Carter |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |

(Continued)

Primary Examiner — Mohammed S Rahaman
(74) Attorney, Agent, or Firm — Lee & Hayes, P.C.

(57) ABSTRACT

The application is directed to an electronic that includes multiple motion sensors, such as passive infrared sensors, that the electronic device uses to detect characteristics of objects. For instance, the motion sensors may be substantially vertically aligned and/or substantially horizontally aligned with one another, where each motion sensor is positioned at a respective angle with respect to a ground plane. When the motion sensors detect an object, the electronic device can then determine a direction at which the object is moving and/or a speed at which the object is moving. In some instances, the direction may include towards the electronic device or away from the electronic device. Additionally, based on the characteristics of the object, the electronic device may perform an action, such as generating image data using a camera and/or sending a user alert.

20 Claims, 26 Drawing Sheets

(56) References Cited

U.S. PATENT DOCUMENTS

| | | |
|---|---|---|
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,255,786 B2 | 2/2016 | Micko |
| 9,301,412 B2 | 3/2016 | Micko et al. |
| 9,304,044 B2 | 4/2016 | Micko |
| 9,342,936 B2 | 5/2016 | Scalisi |
| 9,508,239 B1 | 11/2016 | Harrison et al. |
| 9,569,953 B2 | 2/2017 | Micko |
| 9,611,978 B2 | 4/2017 | Manniche et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 10,055,973 B2 | 8/2018 | Micko |
| 2010/0204953 A1* | 8/2010 | Onishi .................. G06F 3/0304 702/150 |
| 2012/0002056 A1* | 1/2012 | Nam .................. G06T 3/40 348/169 |
| 2014/0319353 A1* | 10/2014 | DeLeeuw .............. G01J 5/0025 250/340 |
| 2015/0022620 A1* | 1/2015 | Siminoff ................ H04N 7/186 348/14.02 |
| 2016/0046308 A1* | 2/2016 | Chung .................. B61L 25/021 701/20 |
| 2016/0084932 A1* | 3/2016 | Ito ...................... G06K 9/00771 348/169 |
| 2016/0330403 A1* | 11/2016 | Siminoff .............. H04N 5/2257 |
| 2017/0163944 A1* | 6/2017 | Jeong .................... G01J 5/0025 |
| 2018/0114420 A1* | 4/2018 | Siminoff .......... G08B 13/19636 |
| 2018/0131449 A1* | 5/2018 | Kare ...................... H01S 5/0085 |
| 2019/0020817 A1* | 1/2019 | Shan ........................ G06T 7/74 |
| 2019/0023277 A1* | 1/2019 | Roger ................ B60R 21/0134 |
| 2019/0104283 A1* | 4/2019 | Wakeyama ...... G08B 13/19608 |

\* cited by examiner

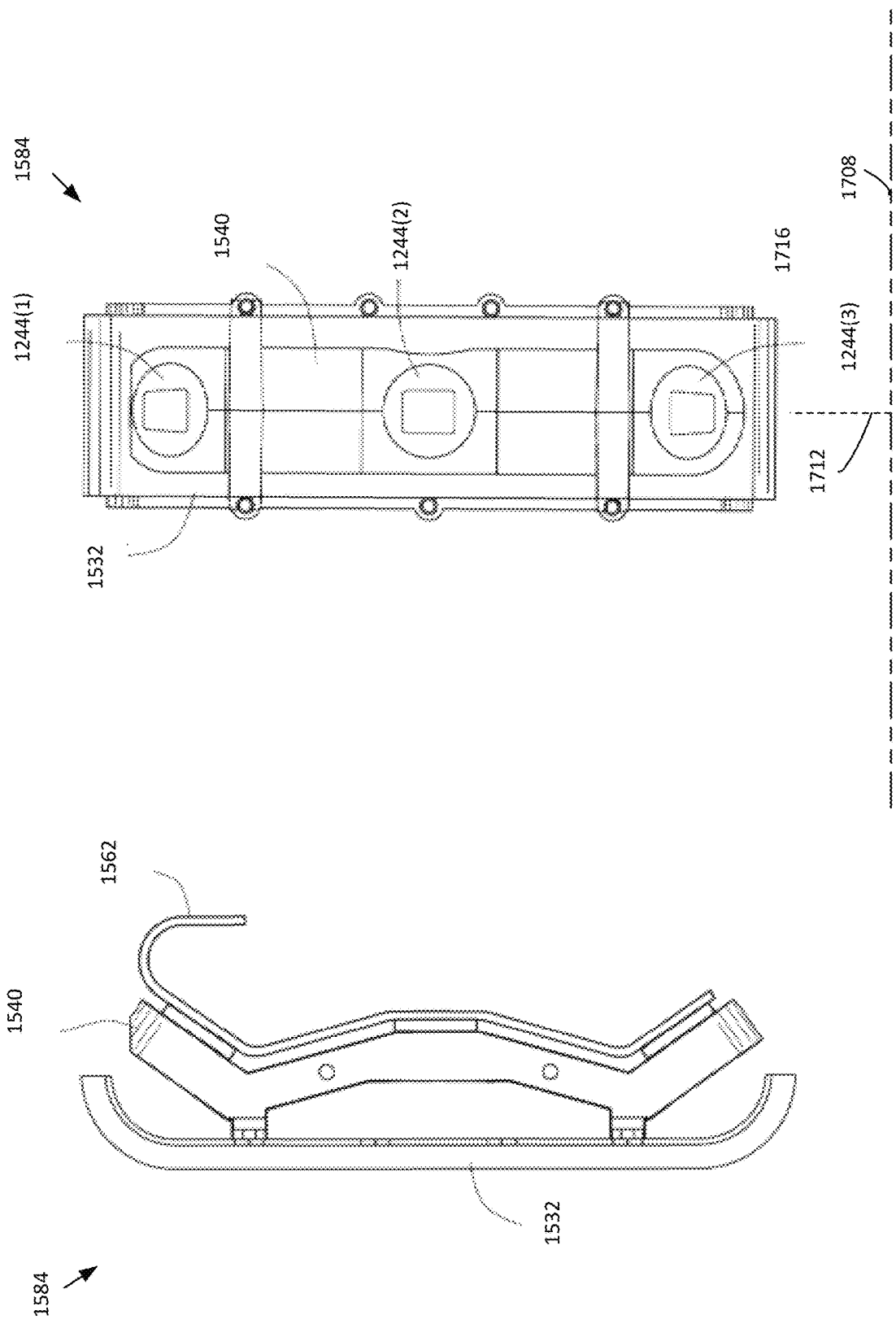

US 11,350,060 B1

USING MOTION SENSORS FOR DIRECTION DETECTION

RELATED APPLICATION

This application claims priority to U.S. Provisional Patent Application Ser. No. 62/638,895, filed on Mar. 5, 2018, titled "USING MOTION SENSORS FOR DIRECTION DETECTION," the entire contents of which are incorporated herein by reference.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and may also aid in crime detection and prevention. For example, audio and/or video captured by an A/V recording and communication device may be uploaded to the cloud and recorded on a remote server. Subsequent review of the A/V footage may aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various example embodiments for using motion sensors for direction detection now will be discussed in detail with an emphasis on highlighting the advantageous features. These embodiments depict novel and non-obvious techniques for using motion sensors for direction detection, as shown in the accompanying drawings, which are for illustrative purposes only. These drawings include the following figures, in which like numerals indicate like parts:

FIGS. 17A-17B are left side and front views, respectively, of a sensor holder assembly of the A/V recording and communication device of FIG. 3;

DETAILED DESCRIPTION

Figure 1:
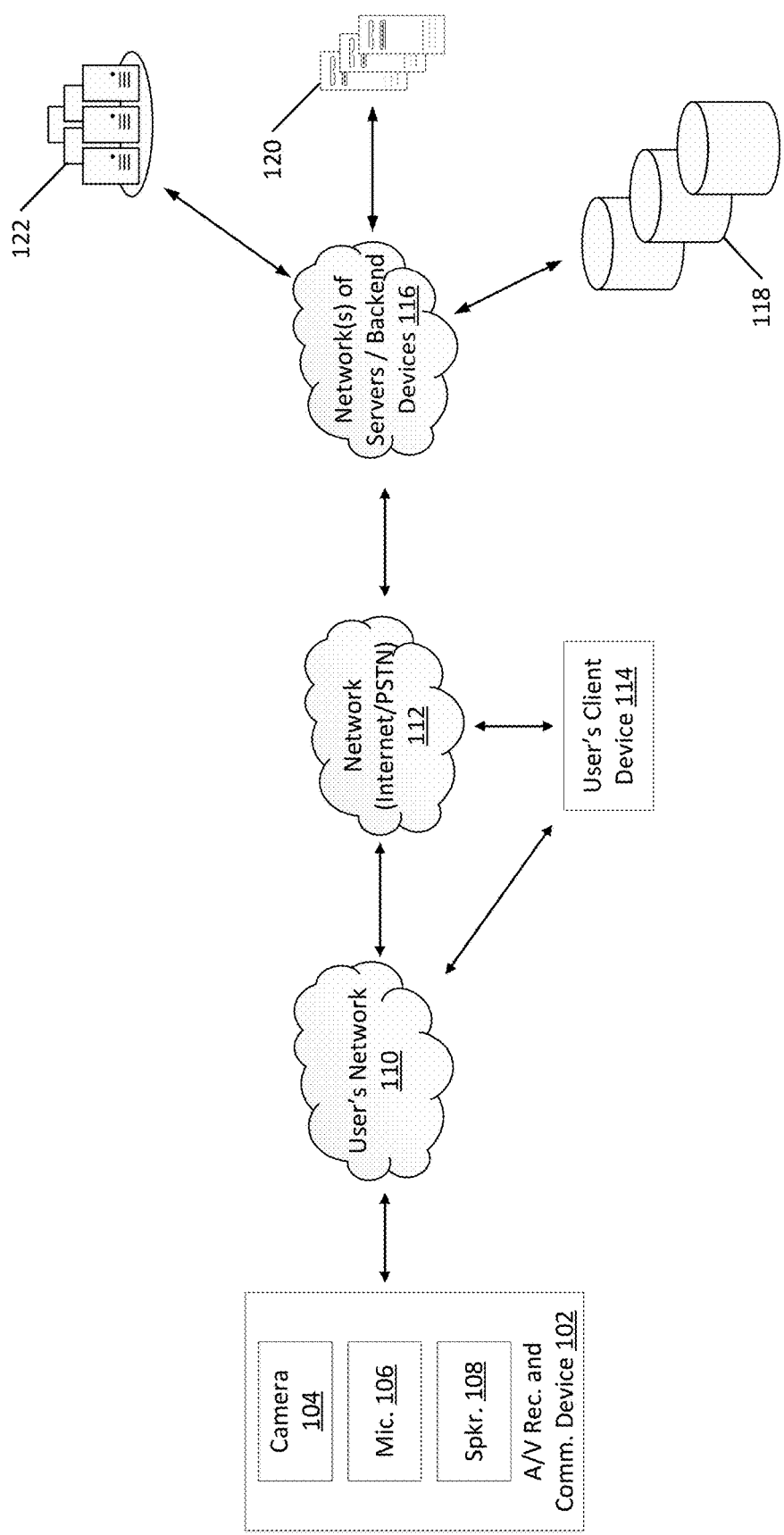
FIG. 1 is a functional block diagram illustrating an example system for streaming and storing A/V content captured by an audio/video (A/V) recording and communication device according to various aspects of the present disclosure.

One aspect of the present embodiments includes the realization that homeowners and property owners may want to know when an entity (e.g., person, animal, object) is on their property or premises, and also may wish to be informed of a direction of movement of the entity. However, devices that use motion sensors for motion detection, other than the devices described herein, may only alert users (e.g., provide notifications to users) when the motion sensors of the devices detect motion, but may not provide any further information related to directionality, such as a direction in which the entity is moving. For example, a user may be alerted by a device that includes a motion sensor (or a motion sensor itself) that there is motion in front of his or her home or business (e.g., an alarm may sound, a light might illuminate, or an alert might be sent to the user), but without information on what direction the entity that caused the motion detection is moving relative to a device (e.g., from left to right or right to left, or from near to farther away from the sensor, or from farther away to nearer the sensor). As a result, a user may be unable to determine whether a moving entity is an unwanted visitor approaching the house or is merely a resident leaving the house. As such, the notifications sent to the user may not allow the user to appreciate the situation as fully, and as a result, the user may not take the actions that the user would desire if armed with this additional information. In addition, because the device may activate one or more additional components (e.g., a camera, a processor, etc.) in response to detecting motion using the motion sensor(s), battery powered devices may experience more significant drains on the battery.

The present embodiments solve this problem by, for example, using at least two motion sensors (e.g., passive infrared (PIR) sensors) of an A/V recording and communication device to determine one or more characteristics associated with motion of entities in a field of view of the motion sensors. For example, each of the at least two motion sensors may be positioned to have different fields of view, though each field of view (FOV) may overlap with the FOV of adjacent sensor(s). In one example, to detect motion that is in a direction toward or away from an A/V recording and communication device, two motion sensors may be positioned in substantially vertical alignment with each other (e.g., with one above the other). A first motion sensor's FOV may be oriented to be angled higher off the ground than a second motion sensor's FOV, such that at a given moment, the first sensor may not detect motion of an object while the second sensor does detect the motion. For instance, a first motion sensor may detect motion in a first FOV, which encompasses an area that captures objects at a certain distance away from the camera. Meanwhile, the second motion sensor may have a second FOV that may be directed more downward than the first motion sensor and, as a result, may detect no motion. At a later time, both the first motion sensor and the second motion sensor may detect motion, or only the second motion sensor may detect motion. In this instance, it may be determined from motion data from these sensors that an object is moving toward the A/V recording and communication device. In response to receiving data from the sensors that indicates movement toward the A/V device, a network device, or the A/V device, may, for example, generate and transmit a user alert, instruct a camera of the A/V device to start recording, and/or the like. As described herein, because the additional components of the A/V device may only be activated in response to entities moving in particular directions, the battery drain on the A/V device may be lessened as compared to an A/V device that activates additional components in response to detection of any motion, regardless of the direction of movement of the object(s) detected.

The ability of the innovation described herein to determine the direction that an object is moving has a number of technological benefits, including the ability to trigger different actions depending on what direction of movement is detected. In this way, the number of alerts may be reduced as a result of alerts being transmitted only for certain directions of detected movement. Additionally, storage is reduced at an A/V recording and communication device, and/or a network device, because image data may be recorded for objects determined to be moving in one direction and not others. Moreover, this technology enables a user to create custom settings so that different actions may be taken for various directions of movement. As a result of the direction detection processes described herein, the user may be better informed about the nature of movement around his or her home or business, and the battery life of the A/V recording and communication device may be increased. With the additional information related to the direction of movement, the user may take various actions to protect the user's family, pets, and/or property. In addition, because of the longer battery life (for battery-powered devices), the A/V recording and communication device may require less frequent charging and, as a result, may be operational more often, thereby also increasing the safety of the user's family, pets, and/or property.

The following detailed description describes the present embodiments with reference to the drawings. In the drawings, reference numbers label elements of the present embodiments. These reference numbers are reproduced below in connection with the discussion of the corresponding drawing features.

In some embodiments, this disclosure may include the language, for example, "at least one of [element A] and [element B]". This language may refer to one or more of the elements. For example, "at least one of A and B" may refer to "A", "B", or "A and B". In other words, "at least one of A and B" may refer to "at least one of A and at least one of B," or "at least of either A or B." Additionally, this disclosure may include the language, for example, "[first element], [second element], and/or [third element]." This language may refer to one or more of the elements. For example, "A, B, and/or C" may refer to "A", "B", "C", "A and B" "A and C", "B and C", or "A, B, and C".

With reference to FIG. 1, the present embodiments include an audio/video (A/V) recording and communication device 102. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components. In another example, the present embodiments may include one or more A/V recording and communication floodlight controllers instead of, or in addition to, one or more A/V recording and communication doorbells.

The A/V recording and communication device 102 may be located near the entrance to a structure (not shown), such as a dwelling, a business, a storage facility, etc. The A/V recording and communication device 102 includes a camera 104, a microphone 106, and a speaker 108. The camera 104 may comprise, for example, a high definition (HD) video camera, such as one capable of capturing video images at an image display resolution of 722p, or 1080p, 4K, or any other image display resolution. While not shown, the A/V recording and communication device 102 may also include other hardware and/or components, such as a housing, a communication module (which may facilitate wired and/or wireless communication with other devices), one or more motion sensors (and/or other types of sensors), a button, etc. The A/V recording and communication device 102 may, in some examples, further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 102 communicates with a user's network 110, which may be for example a wired and/or wireless network. If the user's network 110 is wireless, or includes a wireless component, the network 110 may be, for example, a Wi-Fi network compatible with the IEEE 802.11 standard and/or other wireless communication standard(s). The user's network 110 is connected to another network 112, which may comprise, for example, the Internet and/or a public switched telephone network (PSTN). As described herein, the A/V recording and communication device 102 may communicate with the user's client device 114 via the user's network 110 and/or the network 112 (Internet/PSTN). The user's client device 114 may comprise, for example, a mobile telephone (may also be referred to as a cellular telephone), such as a smartphone, a personal digital assistant (PDA), or another communication device. The user's client device 114 may comprise a display (not shown) and related components capable of displaying streaming and/or recorded video images. The user's client device 114 may also comprise a speaker and related components capable of broadcasting streaming and/or recorded audio, and may also comprise a microphone.

The A/V recording and communication device 102 may also communicate, via the user's network 110 and the network 112 (Internet/PSTN), with a network(s) 116 of servers and/or backend devices, such as (but not limited to) one or more remote storage devices 118 (may be referred to interchangeably as "cloud storage device(s)"), one or more backend servers 120, and one or more backend APIs 122. While FIG. 1 illustrates the storage device 118, the server 120, and the backend API 122 as components separate from the network 116, it is to be understood that the storage device 118, the server 120, and/or the backend API 122 may be considered to be components of the network 116.

The network 116 may be any wireless network or any wired network, or a combination thereof, configured to operatively couple the above-mentioned modules, devices, and systems as shown in FIG. 1. For example, the network 116 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, Global Navigation Satellite System (GNSS) (e.g., the Global Positioning System (GPS)), CDPD (cellular digital packet data), RIM (Research in Motion, Limited) duplex paging network, Bluetooth network, Zig-Bee network, or an IEEE 802.11-based radio frequency network. The network may further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 102, the A/V recording and communication device 102 detects the visitor's presence and begins capturing video images within a field of view (FOV) of the camera 104. The A/V recording and communication device 102 may also capture audio through the microphone 106. The A/V recording and communication device 102 may detect the visitor's presence by, for example, detecting motion using the camera 104 and/or a motion sensor, and/or by detecting that the visitor has pressed a front button of the A/V recording and communication device 102 (if the A/V recording and communication device 102 is a doorbell).

In response to the detection of the visitor, the A/V recording and communication device 102 transmits an alert to the user's client device 114 (FIG. 1) via the user's network 110 and the network 112. The A/V recording and communication device 102 also transmits streaming video, and may also transmit streaming audio, to the user's client device 114. If the user answers the alert, two-way audio communication may then occur between the visitor and the user through the A/V recording and communication device 102 and the user's client device 114. The user may view the visitor throughout the duration of the call, but the visitor may not see the user (unless the A/V recording and communication device 102 includes a display, which it may in some embodiments).

The video images captured by the camera 104 of the A/V recording and communication device 102 (and the audio captured by the microphone 106) may be uploaded to the cloud and recorded on the remote storage device 118 (FIG. 1). In some examples, the video images and/or audio may additionally or alternatively be stored locally by the A/V recording and communication device 102, a client device of the user, or other device in communication with the A/V recording and communication device 102. In some embodiments, the video and/or audio may be recorded on the remote storage device 118 even if the user chooses to ignore the alert sent to his or her client device 114.

With further reference to FIG. 1, the system may further comprise a backend API 122 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 122 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API may ease the work of programming GUI components. For example, an API may facilitate integration of new features into existing applications (a so-called "plug-in API"). An API may also assist otherwise distinct applications with sharing data, which may help to integrate and enhance the functionalities of the applications.

The backend API 122 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components may both be run on the same machine. Clients and servers may have a user interface, and sometimes other hardware associated with them.

Figure 2:
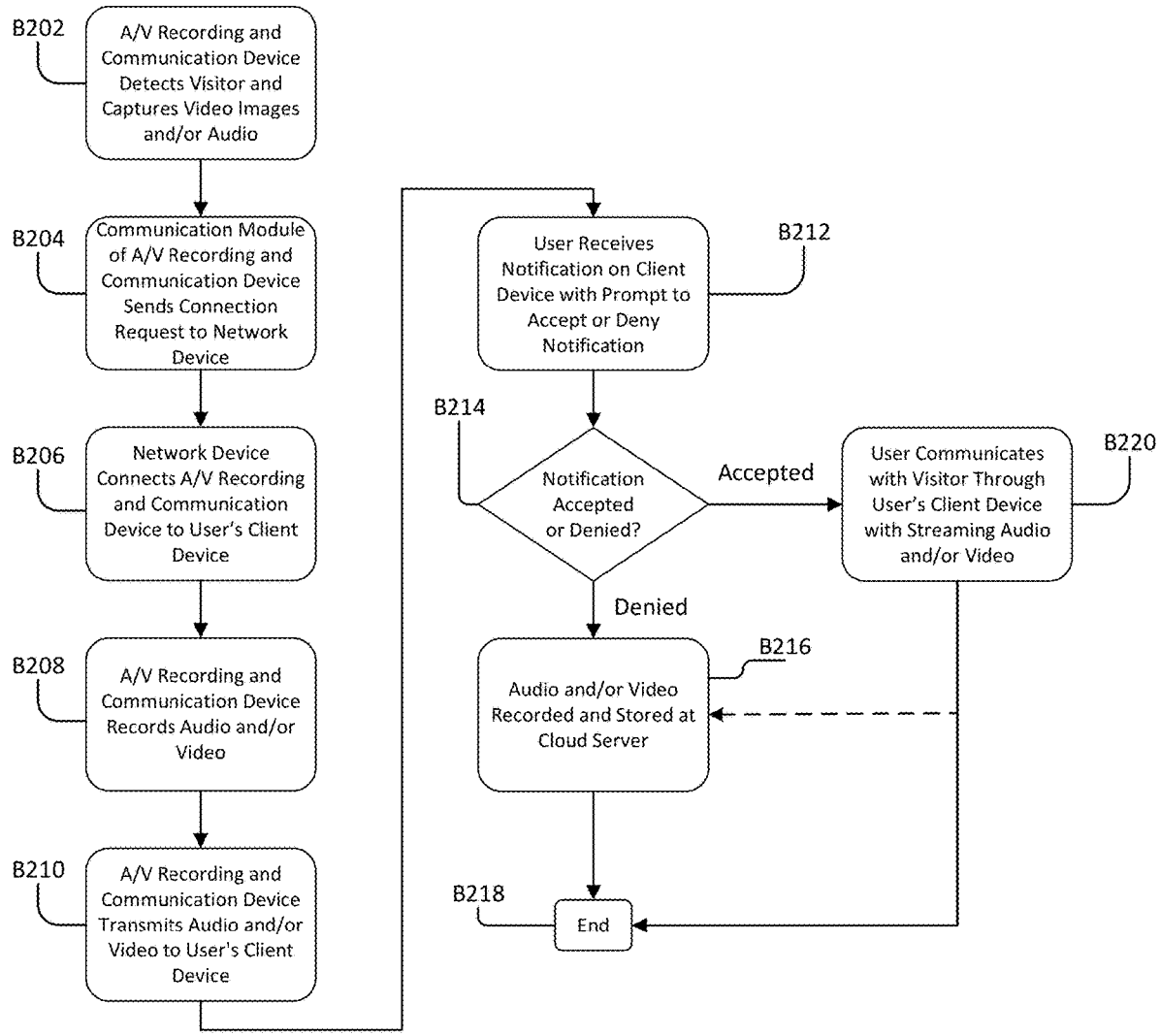
FIG. 2 is a flowchart illustrating an example process for streaming and storing A/V content from an A/V recording and communication device according to various aspects of the present disclosure.

FIG. 2 is a flowchart illustrating a process for streaming and storing A/V content from the A/V recording and communication device 102 according to various aspects of the present disclosure. At block B202, the A/V recording and communication device 102 detects the visitor's presence and captures video images within a field of view of the camera 104. The A/V recording and communication device 102 may also capture audio through the microphone 106. As described above, the A/V recording and communication device 102 may detect the visitor's presence by detecting motion using the camera 104 and/or a motion sensor, and/or by detecting that the visitor has pressed a front button of the A/V recording and communication device 102 (if the A/V recording and communication device 102 is a doorbell). Also, as described above, the video recording/capture may begin when the visitor is detected, or may begin earlier, as described below.

At block B204, a communication module of the A/V recording and communication device 102 transmits a connection request, via the user's network 110 and the network 112, to a device in the network 112. For example, the network device to which the request is sent may be a server such as the server 120. The server 120 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 122, which is described above.

In response to the request, at block B206 the network device may connect the A/V recording and communication device 102 to the user's client device 114 through the user's network 110 and the network 112. At block B208, the A/V recording and communication device 102 may record available audio and/or video data using the camera 104, the microphone 106, and/or any other device/sensor available. At block B208, the audio and/or video data is transmitted (streamed) from the A/V recording and communication device 102 to the user's client device 114 via the user's network 110 and the network 112. At block B212, the user may receive a notification on his or her client device 114 with a prompt to either accept or deny the call.

At block B214, the process determines whether the user has accepted or denied the call. If the user denies the notification, then the process advances to block B216, where the audio and/or video data is recorded and stored at a cloud server. The session then ends at block B218 and the connection between the A/V recording and communication device 102 and the user's client device 114 is terminated. If, however, the user accepts the notification, then at block B220 the user communicates with the visitor through the user's client device 114 while audio and/or video data captured by the camera 104, the microphone 106, and/or other devices/sensors is streamed to the user's client device 114. At the end of the call, the user may terminate the connection between the user's client device 114 and the A/V recording and communication device 102 and the session ends at block B220. In some embodiments, the audio and/or video data may be recorded and stored at a cloud server (block B216) even if the user accepts the notification and communicates with the visitor through the user's client device 114.

Figure 3:
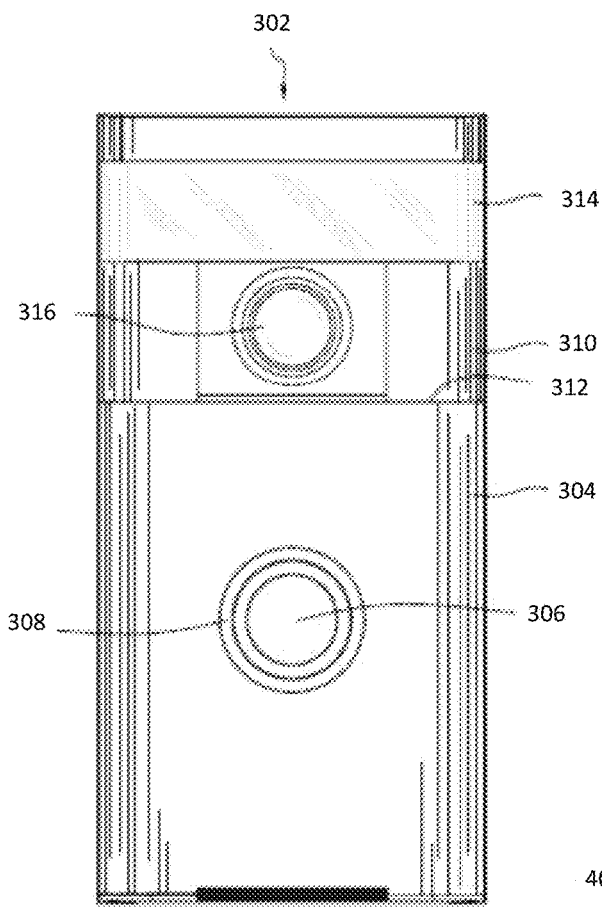
FIG. 3 is a front view of an example A/V recording and communication doorbell according to various aspects of the present disclosure.
Figure 4:
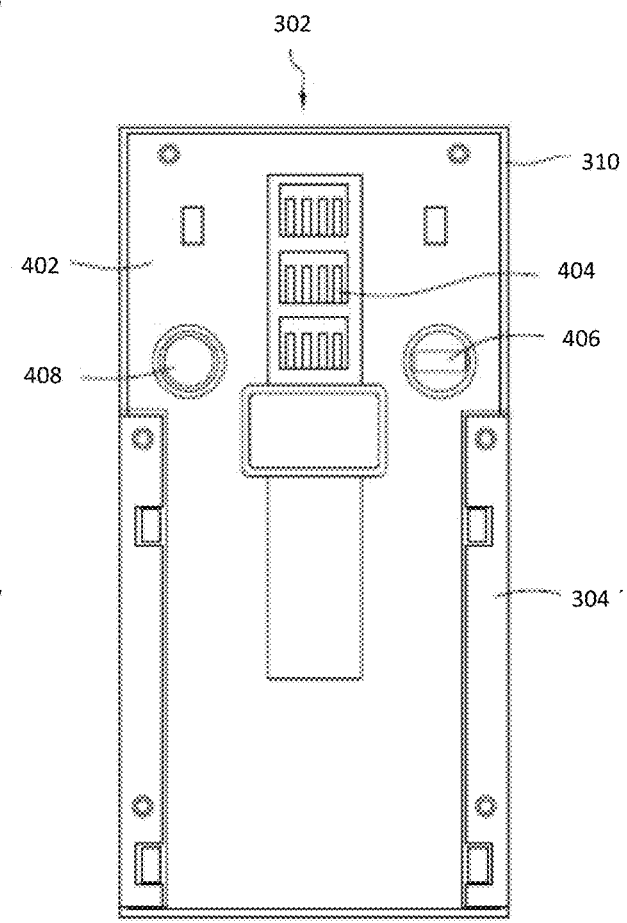
FIG. 4 is a rear view of the example A/V recording and communication doorbell of FIG. 3.
Figure 5:
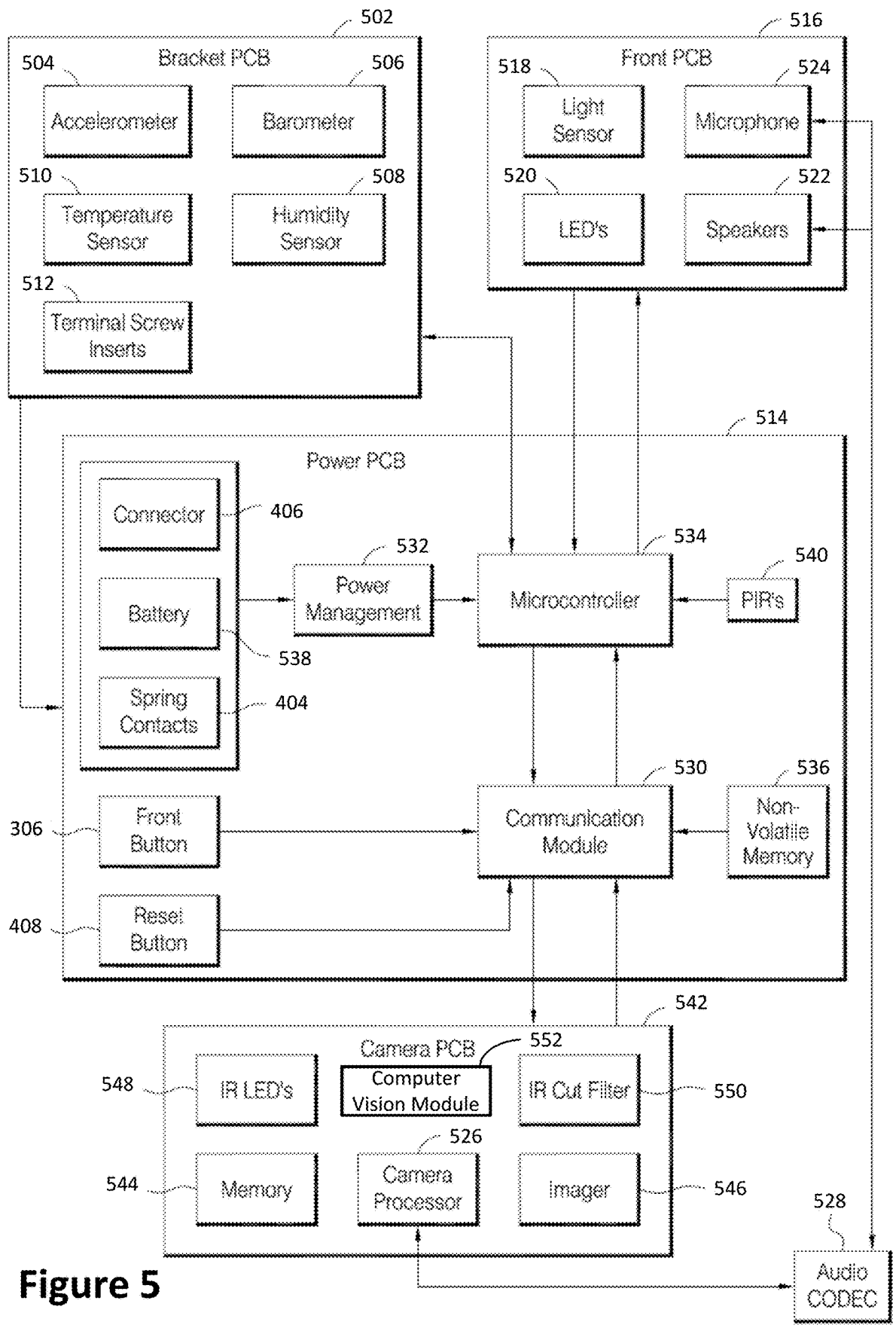
FIG. 5 is a functional block diagram of example components of the A/V recording and communication doorbell of FIGS. 3 and 4.

FIGS. 3-5 illustrate an audio/video (A/V) communication doorbell 302 (also referred to a "doorbell 302" or "video doorbell 302") according to an aspect of present embodiments. FIG. 3 is a front view, FIG. 4 is a rear view, and FIG. 5 is a functional block diagram of the components within or in communication with the doorbell 302. With reference to FIG. 3, the doorbell 302 includes a faceplate 304 mounted to a back plate 402 (FIG. 4). The faceplate 304 may comprise any suitable material, including, without limitation, metals, such as brushed aluminum or stainless steel, metal alloys, or plastics. The faceplate 304 protects the internal contents of the doorbell 302 and serves as an exterior front surface of the doorbell 302.

With reference to FIG. 3, the faceplate 304 includes a button 306 and a light pipe 308. The button 306 and the light pipe 308 may have various profiles that may or may not match the profile of the faceplate 304. The light pipe 308 may comprise any suitable material, including, without limitation, transparent plastic, that is capable of allowing light produced within the doorbell 302 to pass through. The light may be produced by one or more light-emitting components, such as light-emitting diodes (LED's), contained within the doorbell 302, as further described below. The button 306 may make contact with a button actuator (not shown) located within the doorbell 302 when the button 306 is pressed by a visitor. When pressed, the button 306 may trigger one or more functions of the doorbell 302, as further described below.

With further reference to FIG. 3, the doorbell 302 further includes an enclosure 310 that engages the faceplate 304. In the illustrated embodiment, the enclosure 310 abuts an upper edge 312 of the faceplate 304, but in alternative embodiments one or more gaps between the enclosure 310 and the faceplate 304 may facilitate the passage of sound and/or light through the doorbell 302. The enclosure 310 may comprise any suitable material, but in some embodiments the material of the enclosure 310 preferably permits infrared light to pass through from inside the doorbell 302 to the environment and vice versa. The doorbell 302 further includes a lens 314. In some embodiments, the lens 314 may comprise a Fresnel lens, which may be patterned to deflect incoming light into one or more infrared sensors located within the doorbell 302. The doorbell 302 further includes a camera 316, which captures video data when activated, as described below.

FIG. 4 is a rear view of the doorbell 302, according to an aspect of the present embodiments. As illustrated, the enclosure 310 may extend from the front of the doorbell 302 around to the back thereof and may fit snugly around a lip of the back plate 402. The back plate 402 may comprise any suitable material, including, without limitation, metals, such as brushed aluminum or stainless steel, metal alloys, or plastics. The back plate 402 protects the internal contents of the doorbell 302 and serves as an exterior rear surface of the doorbell 302. The faceplate 304 may extend from the front of the doorbell 302 and at least partially wrap around the back plate 402, thereby allowing a coupled connection between the faceplate 304 and the back plate 402. The back plate 402 may have indentations in its structure to facilitate the coupling.

With further reference to FIG. 4, spring contacts 404 may provide power to the doorbell 302 when mated with other conductive contacts connected to a power source. The spring contacts 404 may comprise any suitable conductive material, including, without limitation, copper, and may be capable of deflecting when contacted by an inward force, for example the insertion of a mating element. The doorbell 302 further comprises a connector 406, such as a micro-USB or other connector, whereby power and/or data may be supplied to and from the components within the doorbell 302. A reset button 408 may be located on the back plate 402, and may make contact with a button actuator (not shown) located within the doorbell 302 when the reset button 408 is pressed. When the reset button 408 is pressed, it may trigger one or more functions, as described below.

FIG. 5 is a functional block diagram of the components within or in communication with the doorbell 302, according to an aspect of the present embodiments. A bracket PCB 502 may comprise an accelerometer 504, a barometer 506, a humidity sensor 508, and a temperature sensor 510. The accelerometer 504 may be one or more sensors capable of sensing motion and/or acceleration. The barometer 506 may be one or more sensors capable of determining the atmospheric pressure of the surrounding environment in which the bracket PCB 502 may be located. The humidity sensor 508 may be one or more sensors capable of determining the amount of moisture present in the atmospheric environment in which the bracket PCB 502 may be located. The temperature sensor 510 may be one or more sensors capable of determining the temperature of the ambient environment in which the bracket PCB 502 may be located. The bracket PCB 502 may be located outside the housing of the doorbell 302 so as to reduce interference from heat, pressure, moisture, and/or other stimuli generated by the internal components of the doorbell 302.

With further reference to FIG. 5, the bracket PCB 502 may further comprise terminal screw inserts 512, which may be configured to receive terminal screws (not shown) for transmitting power to electrical contacts on a mounting bracket (not shown). The bracket PCB 502 may be electrically and/or mechanically coupled to the power PCB 514 through the terminal screws, the terminal screw inserts 512, the spring contacts 404, and the electrical contacts. The terminal screws may receive electrical wires located at the surface to which the doorbell 302 is mounted, such as the wall of a building, so that the doorbell may receive electrical power from the building's electrical system. Upon the terminal screws being secured within the terminal screw inserts 512, power may be transferred to the bracket PCB 502, and to all of the components associated therewith, including the electrical contacts. The electrical contacts may transfer electrical power to the power PCB 514 by mating with the spring contacts 404.

With further reference to FIG. 5, the front PCB 516 may comprise a light sensor 518, one or more light-emitting components, such as LED's 520, one or more speakers 522, and a microphone 524. The light sensor 518 may be one or more sensors capable of detecting the level of ambient light of the surrounding environment in which the doorbell 302 may be located. LED's 520 may be one or more light-emitting diodes capable of producing visible light when supplied with power. The speakers 522 may be any electro-mechanical device capable of producing sound in response to an electrical signal input. The microphone 524 may be an acoustic-to-electric transducer or sensor capable of converting sound waves into an electrical signal. When activated, the LED's 520 may illuminate the light pipe 308 (FIG. 3). The front PCB 516 and all components thereof may be electrically coupled to the power PCB 514, thereby allowing data and/or power to be transferred to and from the power PCB 514 and the front PCB 516.

The speakers 522 and the microphone 524 may be coupled to the camera processor 526 through an audio CODEC 528. For example, the transfer of digital audio from the user's client device 114 and the speakers 522 and the microphone 524 may be compressed and decompressed using the audio CODEC 528, coupled to the camera processor 526. Once compressed by audio CODEC 528, digital audio data may be sent through the communication module 530 to the network 112, routed by the one or more servers 120, and delivered to the user's client device 114. When the user speaks, after being transferred through the network 112, digital audio data is decompressed by audio CODEC 528 and emitted to the visitor via the speakers 522.

With further reference to FIG. 5, the power PCB 514 may comprise a power management module 532, a microcontroller 534 (may also be referred to as "processor," "CPU," or "controller"), the communication module 530, and power PCB non-volatile memory 536. In certain embodiments, the power management module 532 may comprise an integrated circuit capable of arbitrating between multiple voltage rails, thereby selecting the source of power for the doorbell 302. The battery 538, the spring contacts 404, and/or the connector 406 may each provide power to the power management module 532. The power management module 532 may have separate power rails dedicated to the battery 538, the spring contacts 404, and the connector 406. In one aspect of the present disclosure, the power management module 532 may continuously draw power from the battery 538 to power the doorbell 302, while at the same time routing power from the spring contacts 404 and/or the connector 406 to the battery 538, thereby allowing the battery 538 to maintain a substantially constant level of charge. Alternatively, the power management module 532 may continuously draw power from the spring contacts 404 and/or the connector 406 to power the doorbell 302, while only drawing from the battery 538 when the power from the spring contacts 404 and/or the connector 406 is low or insufficient. Still further, the battery 538 may comprise the sole source of power for the doorbell 302. In such embodiments, the spring contacts 404 may not be connected to a source of power. When the battery 538 is depleted of its charge, it may be recharged, such as by connecting a power source to the connector 406. The power management module 532 may also serve as a conduit for data between the connector 406 and the microcontroller 534.

With further reference to FIG. 5, in certain embodiments the microcontroller 534 may comprise an integrated circuit including a processor core, memory, and programmable input/output peripherals. The microcontroller 534 may receive input signals, such as data and/or power, from the PIR sensors 540, the bracket PCB 502, the power management module 532, the light sensor 518, the microphone 524, and/or the communication module 530, and may perform various functions as further described below. When the microcontroller 534 is triggered by the PIR sensors 540, the microcontroller 534 may be triggered to perform one or more functions. When the light sensor 518 detects a low level of ambient light, the light sensor 518 may trigger the microcontroller 534 to enable "night vision," as further described below. The microcontroller 534 may also act as a conduit for data communicated between various components and the communication module 530.

With further reference to FIG. 5, the communication module 530 may comprise an integrated circuit including a processor core, memory, and programmable input/output peripherals. The communication module 530 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 530 may receive inputs, such as power and/or data, from the camera PCB 542, the microcontroller 534, the button 306, the reset button 408, and/or the power PCB non-volatile memory 536. When the button 306 is pressed, the communication module 530 may be triggered to perform one or more functions. When the reset button 408 is pressed, the communication module 530 may be triggered to erase any data stored at the power PCB non-volatile memory 536 and/or at the camera PCB memory 544. The communication module 530 may also act as a conduit for data communicated between various components and the microcontroller 534. The power PCB non-volatile memory 536 may comprise flash memory configured to store and/or transmit data. For example, in certain embodiments the power PCB non-volatile memory 536 may comprise serial peripheral interface (SPI) flash memory.

With further reference to FIG. 5, the camera PCB 542 may comprise components that facilitate the operation of the camera 316. For example, an imager 546 may comprise a video recording sensor and/or a camera chip. In one aspect of the present disclosure, the imager 546 may comprise a complementary metal-oxide semiconductor (CMOS) array, and may be capable of recording high definition (e.g., 722p, 1080p, 4K, etc.) video files. A camera processor 526 may comprise an encoding and compression chip. In some embodiments, the camera processor 526 may comprise a bridge processor. The camera processor 526 may process video recorded by the imager 546 and audio recorded by the microphone 524, and may transform this data into a form suitable for wireless transfer by the communication module 530 to a network. The camera PCB memory 544 may comprise volatile memory that may be used when data is being buffered or encoded by the camera processor 526. For example, in certain embodiments the camera PCB memory 544 may comprise synchronous dynamic random-access memory (SD RAM). IR LED's 548 may comprise light-emitting diodes capable of radiating infrared light. IR cut filter 550 may comprise a system that, when triggered, configures the imager 546 to see primarily infrared light as opposed to visible light. When the light sensor 518 detects a low level of ambient light (which may comprise a level that impedes the performance of the imager 546 in the visible spectrum), the IR LED's 548 may shine infrared light through the doorbell 302 enclosure out to the environment, and the IR cut filter 550 may enable the imager 546 to see this infrared light as it is reflected or refracted off of objects within the field of view (FOV) of the doorbell. This process may provide the doorbell 302 with the "night vision" function mentioned above. As also shown in FIG. 5, the camera PCB 542 includes a computer vision module 552, which is described in greater detail below.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 302, but without the front button 306 and its associated components. An example A/V recording and communication security camera may further omit other components, such as, for example, the bracket PCB 502 and its associated components.

Figure 6:
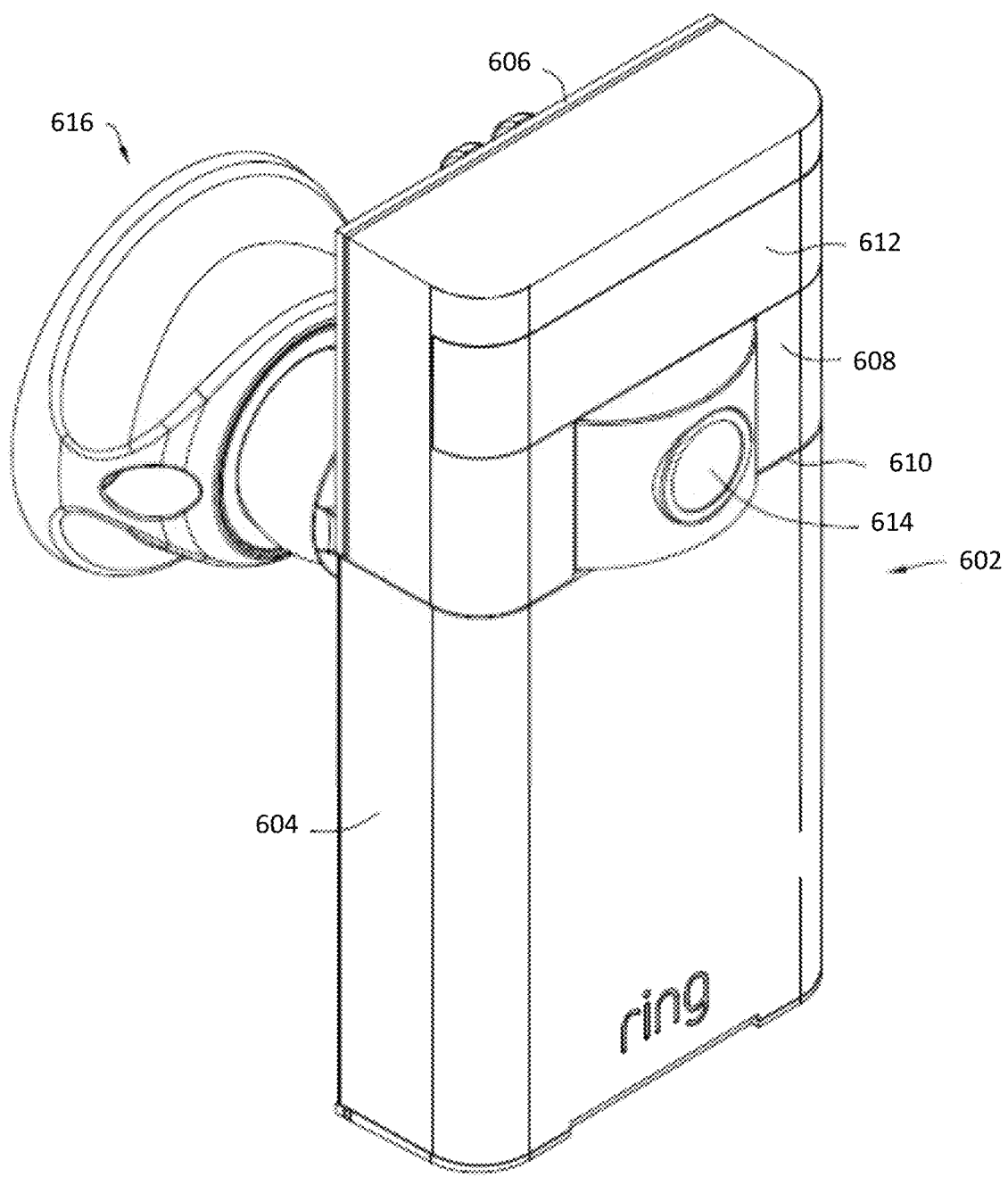
FIG. 6 is an upper front perspective view of an example A/V recording and communication security camera according to various aspects of the present disclosure.
Figure 7:
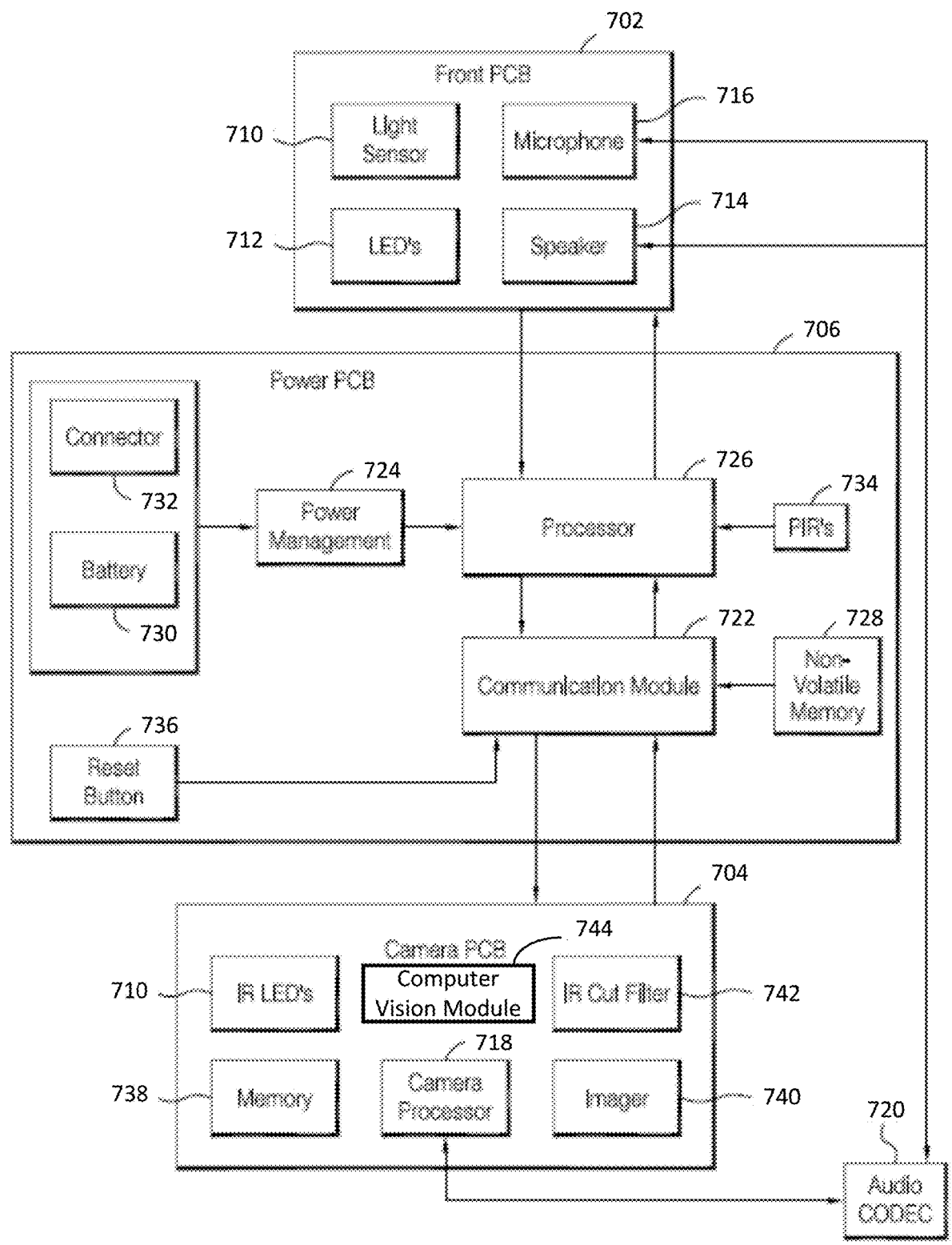
FIG. 7 is a functional block diagram of example components of the A/V recording and communication security camera of FIG. 6.

FIGS. 6 and 7 illustrate an example A/V recording and communication security camera according to various aspects of the present embodiments. With reference to FIG. 6, the security camera 602, similar to the video doorbell 302, includes a faceplate 604 that is mounted to a back plate 606 and an enclosure 608 that engages the faceplate 604. Collectively, the faceplate 304, the back plate 402, and the enclosure 310 form a housing that contains and protects the inner components of the security camera 602. However, unlike the video doorbell 302, the security camera 602 does not include any front button 306 for activating the doorbell. The faceplate 604 may comprise any suitable material, including, without limitation, metals, such as brushed aluminum or stainless steel, metal alloys, or plastics. The faceplate 604 protects the internal contents of the security camera 602 and serves as an exterior front surface of the security camera 602.

With continued reference to FIG. 6, the enclosure 608 engages the faceplate 604 and abuts an upper edge 610 of the faceplate 604. As discussed above with reference to FIG. 3, in alternative embodiments, one or more gaps between the enclosure 608 and the faceplate 604 may facilitate the passage of sound and/or light through the security camera 602. The enclosure 608 may comprise any suitable material, but in some embodiments the material of the enclosure 608 preferably permits infrared light to pass through from inside the security camera 602 to the environment and vice versa. The security camera 602 further includes a lens 612. Again, similar to the video doorbell 302, in some embodiments, the lens may comprise a Fresnel lens, which may be patterned to deflect incoming light into one or more infrared sensors located within the security camera 602. The security camera 602 further includes a camera 614, which captures video data when activated, as described above and below.

With further reference to FIG. 6, the enclosure 608 may extend from the front of the security camera 602 around to the back thereof and may fit snugly around a lip (not shown) of the back plate 606. The back plate 606 may comprise any suitable material, including, without limitation, metals, such as brushed aluminum or stainless steel, metal alloys, or plastics. The back plate 606 protects the internal contents of the security camera 602 and serves as an exterior rear surface of the security camera 602. The faceplate 604 may extend from the front of the security camera 602 and at least partially wrap around the back plate 606, thereby allowing a coupled connection between the faceplate 604 and the back plate 606. The back plate 606 may have indentations (not shown) in its structure to facilitate the coupling.

With continued reference to FIG. 6, the security camera 602 further comprises a mounting apparatus 616. The mounting apparatus 616 facilitates mounting the security camera 602 to a surface, such as an interior or exterior wall of a building, such as a home or office. The faceplate 604 may extend from the bottom of the security camera 602 up to just below the camera 614, and connect to the back plate 606 as described above. The lens 612 may extend and curl partially around the side of the security camera 602. The enclosure 608 may extend and curl around the side and top of the security camera 602, and may be coupled to the back plate 606 as described above. The camera 614 may protrude from the enclosure 608, thereby giving it a wider field of view. The mounting apparatus 616 may couple with the back plate 606, thereby creating an assembly including the security camera 602 and the mounting apparatus 616. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

FIG. 7 is a functional block diagram of the components of the A/V recording and communication security camera of FIG. 6. With reference to FIG. 7, the interior of the wireless security camera 602 comprises a plurality of printed circuit boards, including a front PCB 702, a camera PCB 704, and a power PCB 706, each of which is described below. The camera PCB 704 comprises various components that enable the functionality of the camera 614 of the security camera 602, as described below. Infrared light-emitting components, such as infrared LED's 708, are coupled to the camera PCB 704 and may be triggered to activate when a light sensor detects a low level of ambient light. When activated, the infrared LED's 708 may emit infrared light through the enclosure 608 and/or the camera 614 out into the ambient environment. The camera 614, which may be configured to detect infrared light, may then capture the light emitted by the infrared LED's 708 as it reflects off objects within the camera's 614 field of view, so that the security camera 602 may clearly capture images at night (may be referred to as "night vision").

The front PCB 702 comprises various components that enable the functionality of the audio and light components, including a light sensor 710, LED's 712, one or more speakers 714, and a microphone 716. The light sensor 710 may be one or more sensors capable of detecting the level of ambient light of the surrounding environment in which the security camera 602 may be located. The speakers 714 may be any electromechanical device capable of producing sound in response to an electrical signal input. The microphone 716 may be an acoustic-to-electric transducer or sensor capable of converting sound waves into an electrical signal. The front PCB 702 and all components thereof may be electrically coupled to the power PCB 706, thereby allowing data and/or power to be transferred to and from the power PCB 706 and the front PCB 702.

The speakers 714 and the microphone 716 may be coupled to a camera processor 718 on the camera PCB 704 through an audio CODEC 720. For example, the transfer of digital audio from the user's client device 114 and the speakers 714 and the microphone 716 may be compressed and decompressed using the audio CODEC 720, coupled to the camera processor 718. Once compressed by audio CODEC 720, digital audio data may be sent through the communication module 722 to the network 112, routed by one or more servers 120, and delivered to the user's client device 114. When the user speaks, after being transferred through the network 112, digital audio data is decompressed by audio CODEC 720 and emitted to the visitor via the speakers 714.

With continued reference to FIG. 7, the power PCB 706 comprises various components that enable the functionality of the power and device-control components, including a power management module 724, a processor 726 a communication module 722, and power PCB non-volatile memory 728. In certain embodiments, the power management module 724 may comprise an integrated circuit capable of arbitrating between multiple voltage rails, thereby selecting the source of power for the security camera 602. The battery 730 and/or the connector 406 may each provide power to the power management module 532. The power management module 724 (which may be similar to connector 406) may have separate power rails dedicated to the battery 730 and the connector 732. The power management module 724 may control charging of the battery 730 when the connector 732 is connected to an external source of power, and may also serve as a conduit for data between the connector 732 and the processor 726.

With further reference to FIG. 7, in certain embodiments the processor 726 may comprise an integrated circuit including a processor core, memory, and programmable input/output peripherals. The processor 726 may receive input signals, such as data and/or power, from the passive infrared (PIR) sensors 734, the power management module 724, the light sensor 710, the microphone 716, and/or the communication module 722, and may perform various functions as further described below. When the processor 726 is triggered by the PIR sensors 734, the processor 726 may be triggered to perform one or more functions, such as initiating recording of video images via the camera 614. When the light sensor 710 detects a low level of ambient light, the light sensor 710 may trigger the processor 726 to enable "night vision," as further described below. The processor 726 may also act as a conduit for data communicated between various components and the communication module 722.

With further reference to FIG. 7, the security camera 602 further comprises a communication module 722 coupled to the power PCB 706. The communication module 722 facilitates communication with devices in one or more remote locations, as further described below. The communication module 722 may comprise an integrated circuit including a processor core, memory, and programmable input/output peripherals. The communication module 722 may also be configured to transmit data wirelessly to a remote network device, such as the user's client device 114, the remote storage device 118, and/or the remote server 120, and may include one or more transceivers (not shown). The wireless communication may comprise one or more wireless networks, such as, without limitation, Wi-Fi, cellular, Bluetooth, and/or satellite networks. The communication module 722 may receive inputs, such as power and/or data, from the camera PCB 704, the processor 726, the reset button 736 (which may be similar to the reset button 408), and/or the power PCB non-volatile memory 728. When the reset button 736 is pressed, the communication module 722 may be triggered to erase any data stored at the power PCB non-volatile memory 728 and/or at the camera PCB memory 738. The communication module 722 may also act as a conduit for data communicated between various components and the processor 726. The power PCB non-volatile memory 728 may comprise flash memory configured to store and/or transmit data. For example, in certain embodiments the power PCB non-volatile memory 728 may comprise serial peripheral interface (SPI) flash memory.

With continued reference to FIG. 7, the power PCB 514 further comprises the connector 406 described above and a battery 538. The connector 406 may protrude outward from the power PCB 514 and extend through a hole in the back plate 402. The battery 538, which may be a rechargeable battery, may provide power to the components of the security camera 602.

With continued reference to FIG. 7, the power PCB 706 further comprises passive infrared (PIR) sensors 734, which may be secured on or within a PIR sensor holder (not shown) that resides behind the lens 612 (FIG. 6). The PIR sensors 734 may be any type of sensor capable of detecting and communicating the presence of a heat source within their field of view. Further, alternative embodiments may comprise one or more motion sensors either in place of or in addition to the PIR sensors 734. The motion sensors may be configured to detect motion using any methodology, such as a methodology that does not rely on detecting the presence of a heat source within a field of view.

With further reference to FIG. 7, the camera PCB 704 may comprise components that facilitate the operation of the camera 614. For example, an imager 740 may comprise a video recording sensor and/or a camera chip. In one aspect of the present disclosure, the imager 740 may comprise a complementary metal-oxide semiconductor (CMOS) array, and may be capable of recording high definition (e.g., 722p or better) video files. A camera processor 718 may comprise an encoding and compression chip. In some embodiments, the camera processor 718 may comprise a bridge processor. The camera processor 718 may process video recorded by the imager 740 and audio recorded by the microphone 716, and may transform this data into a form suitable for wireless transfer by the communication module 722 to a network. The camera PCB memory 738 may comprise volatile memory that may be used when data is being buffered or encoded by the camera processor 718. For example, in certain embodiments the camera PCB memory 738 may comprise synchronous dynamic random-access memory (SD RAM). IR LED's 708 may comprise light-emitting diodes capable of radiating infrared light. IR cut filter 742 may comprise a system that, when triggered, configures the imager 740 to see primarily infrared light as opposed to visible light. When the light sensor 710 detects a low level of ambient light (which may comprise a level that impedes the performance of the imager 740 in the visible spectrum), the IR LED's 708 may shine infrared light through the security camera 602 enclosure out to the environment, and the IR cut filter 742 may enable the imager 740 to see this infrared light as it is reflected or refracted off of objects within the field of view of the doorbell. This process may provide the security camera 602 with the "night vision" function mentioned above.

The camera PCB 704 further includes a computer vision module 744. Functionality of the computer vision module 744 is described in greater detail below.

Figure 8:
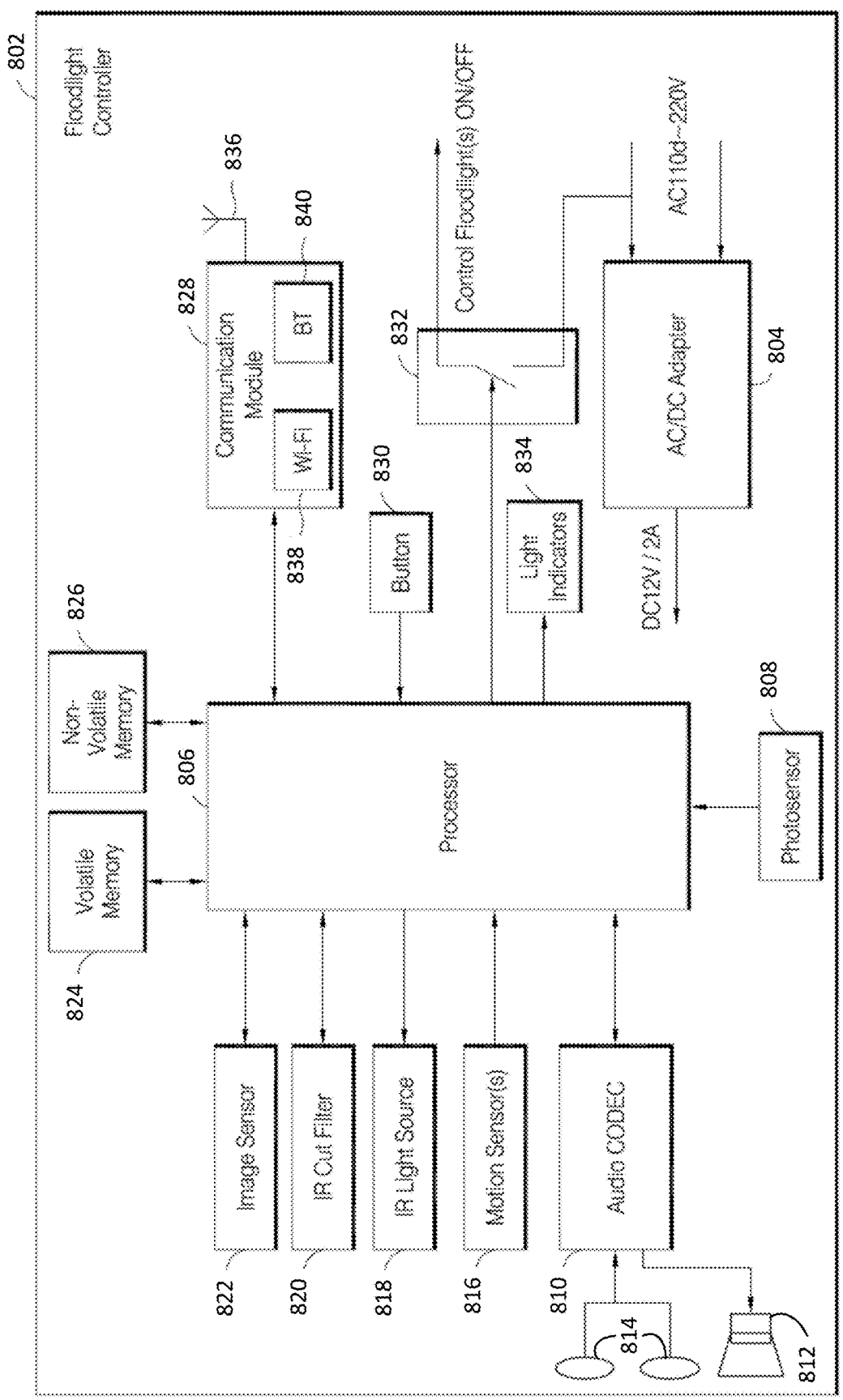
FIG. 8 is a functional block diagram of example components of a floodlight controller with A/V recording and communication features according to various aspects of the present disclosure.
Figure 9:
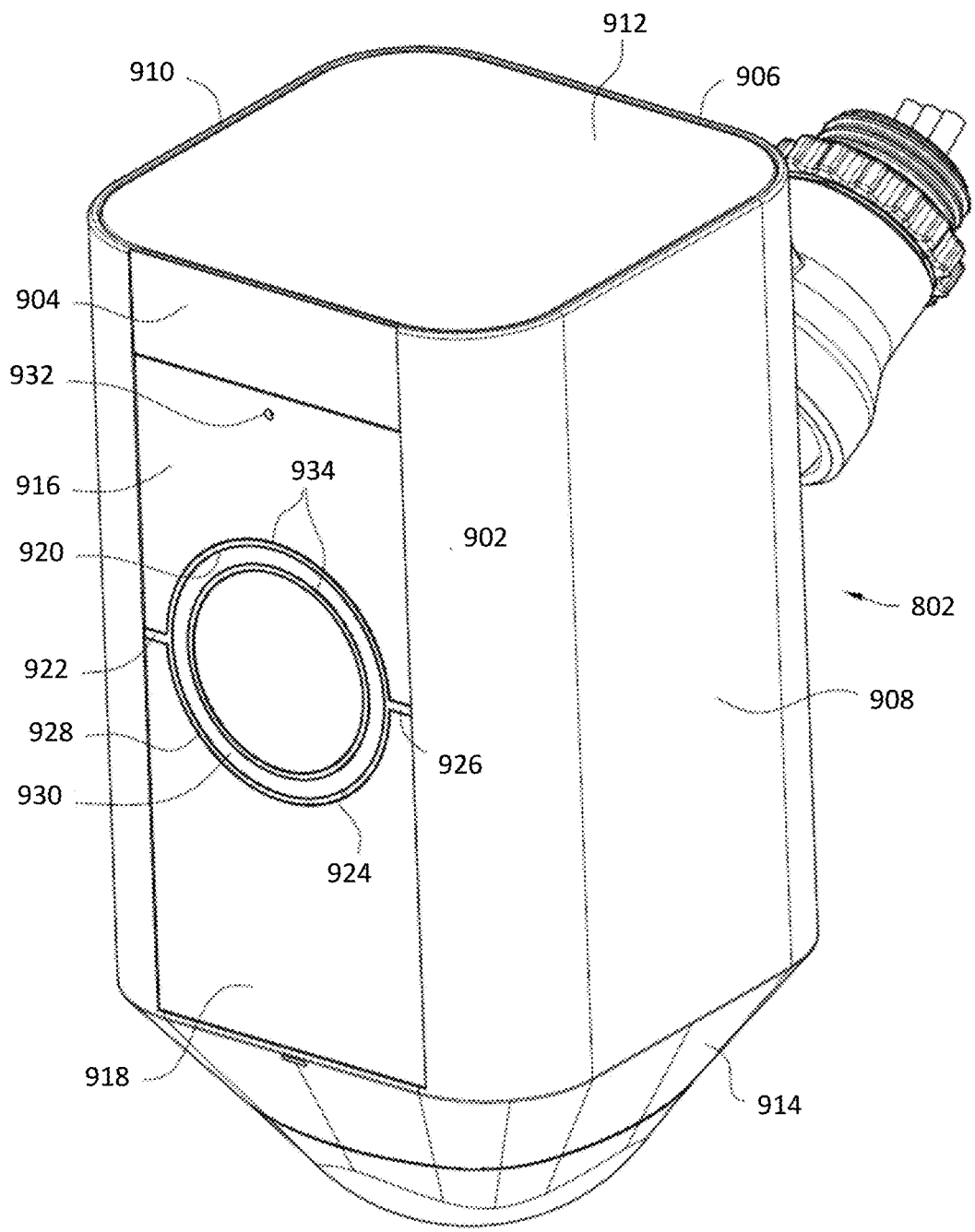
FIG. 9 is an upper front perspective view of an example floodlight controller with A/V recording and communication features according to various aspects of the present disclosure.
Figure 10:
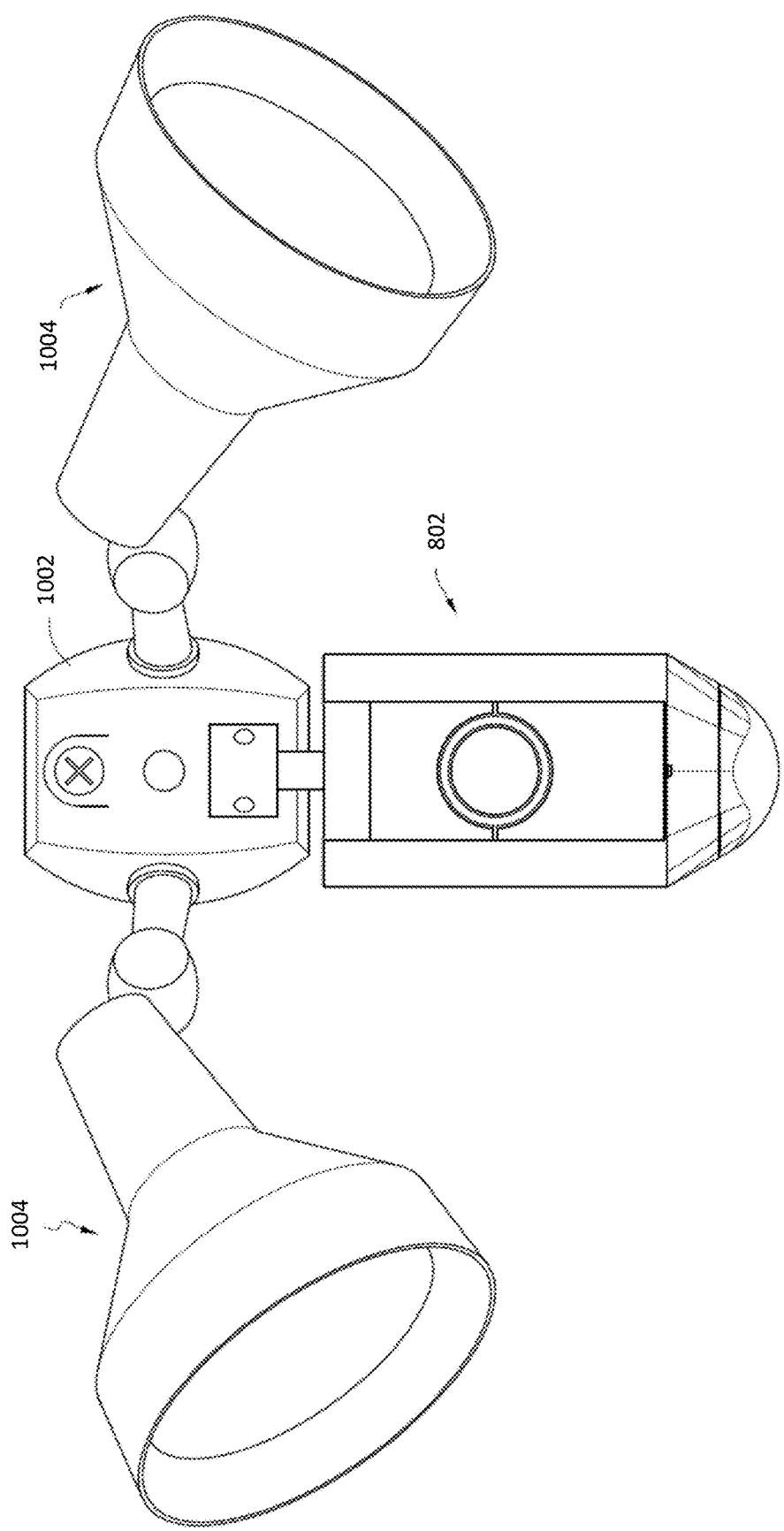
FIG. 10 is a front elevation view of the example floodlight controller with A/V recording and communication features of FIG. 9 in combination with a floodlight device according to various aspects of the present disclosure.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication floodlight controllers instead of, or in addition to, one or more A/V recording and communication doorbells. FIGS. 8-10 illustrate an example A/V recording and communication floodlight controller according to various aspects of the present embodiments. FIG. 8 is a functional block diagram illustrating various components of the floodlight controller 802 and their relationships to one another. For example, the floodlight controller 802 comprises an AC/DC adapter 804. The floodlight controller 802 is thus configured to be connected to a source of external AC (alternating-current) power, such as a household AC power supply (may also be referred to as AC mains). The AC power may have a voltage in the range of 110-220 VAC, for example. The incoming AC power may be received by the AC/DC adapter 804, which may convert the incoming AC power to DC (direct-current) and may step down the voltage from 110-220 VAC to a lower output voltage of about 12 VDC and an output current of about 2 A, for example. In various embodiments, the output of the AC/DC adapter 804 may be in a range of from about 9 V to about 15 V, for example, and in a range of from about 0.5 A to about 5 A, for example. These voltages and currents are only examples provided for illustration and are not limiting in any way.

With further reference to FIG. 8, the floodlight controller 802 further comprises other components, including a processor 806 (may also be referred to as a controller), a photosensor 808, an audio CODEC (coder-decoder) 810, at least one speaker 812 (which may be similar to speaker 108), the at least one microphone 814 (which may be similar to microphone 106), at least one motion sensor 816, an infrared (IR) light source 818, an IR cut filter 820, an image sensor 822 (may be a component of the camera 104, and may be referred to interchangeably as the camera 104), volatile memory 824, non-volatile memory 826, a communication module 828, a button 830, a switch 832 for controlling one or more floodlights, and a plurality of light indicators 834. Each of these components is described in detail below.

With further reference to FIG. 8, the processor 806 may perform data processing and various other functions, as described below. The processor 806 may comprise an integrated circuit including a processor core, the volatile memory 824, the non-volatile memory 826, and/or programmable input/output peripherals (not shown). The volatile memory 824 may comprise, for example, DDR3 SDRAM (double data rate type three synchronous dynamic random-access memory). The non-volatile memory 826 may comprise, for example, NAND flash memory. In the embodiment illustrated in FIG. 8, the volatile memory 824 and the non-volatile memory 826 are illustrated outside the box representing the processor 806. The embodiment illustrated in FIG. 8 is, however, merely an example, and in some embodiments the volatile memory 824 and/or the non-volatile memory 826 may be physically incorporated with the processor 806, such as on the same chip. The volatile memory 824 and/or the non-volatile memory 826, regardless of their physical location, may be shared by one or more other components (in addition to the processor 806) of the present floodlight controller 802.

With further reference to FIG. 8, the image sensor 822 (camera 104), the IR light source 818, the IR cut filter 820, and the photosensor 808 are all operatively coupled to the processor 806. As described in detail below, the IR light source 818 and the IR cut filter 820 facilitate "night vision" functionality of the image sensor 822. For example, the photosensor 808 is configured to detect the level of ambient light about the floodlight controller 802. The processor 806 uses the input from the photosensor 808 to control the states of the IR light source 818 and the IR cut filter 820 to activate and deactivate night vision, as described below. In some embodiments, the image sensor 822 may comprise a video recording sensor or a camera chip. In some embodiments, the IR light source 818 may comprise one or more IR light-emitting diodes (LEDs).

With further reference to FIG. 8, the at least one speaker 812 and the at least one microphone 814 are operatively coupled to the audio CODEC 810, which is operatively coupled to the processor 806. The transfer of digital audio between the user and a visitor (or intruder) may be compressed and decompressed using the audio CODEC 810, as described below. The motion sensor(s) 816 is also operatively coupled to the processor 806. The motion sensor(s) 816 may comprise, for example, passive infrared (PIR) sensors, or any other type of sensor capable of detecting and communicating to the processor 806 the presence and/or motion of an object within its field of view (FOV). When the processor 806 is triggered by the motion sensor(s) 816, the processor 806 may perform one or more functions, as described below.

With further reference to FIG. 8, the communication module 828 is operatively coupled to the processor 806. The communication module 828, which includes at least one antenna 836, is configured to handle communication links between the floodlight controller 802 and other, external devices or receivers, and to route incoming/outgoing data appropriately. For example, inbound data from the antenna(s) 836 may be routed through the communication module 828 before being directed to the processor 806, and outbound data from the processor 806 may be routed through the communication module 828 before being directed to the antenna(s) 836. The communication module 828 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, Bluetooth, or any other protocol and/or technology. In the illustrated embodiment, the communication module 828 includes a Wi-Fi chip 838 and a Bluetooth chip 840, but these components are merely examples and are not limiting. Further, while the Wi-Fi chip 838 and the Bluetooth chip 840 are illustrated within the box representing the communication module 828, the embodiment illustrated in FIG. 8 is merely an example, and in some embodiments the Wi-Fi chip 838 and/or the Bluetooth chip 840 are not necessarily physically incorporated with the communication module 828.

In some embodiments, the communication module 828 may further comprise a wireless repeater (not shown, may also be referred to as a wireless range extender). The wireless repeater is configured to receive a wireless signal from a wireless router (or another network device) in the user's network 110 and rebroadcast the signal. Wireless devices that are not within the broadcast range of the wireless router, or that only weakly receive the wireless signal from the wireless router, may receive the rebroadcast signal from the wireless repeater of the communication module 828, and may thus connect to the user's network 110 through the floodlight controller 802. In some embodiments, the wireless repeater may include one or more transceiver modules (not shown) capable of transmitting and receiving data, and using, for example, one or more protocols and/or technologies, such as Wi-Fi (IEEE 802.11), WiMAX (IEEE 802.16), or any other protocol and/or technology.

With further reference to FIG. 8, when a visitor (or intruder) who is present in the area about the floodlight controller 802 speaks, audio from the visitor (or intruder) is received by the microphones 814 and compressed by the audio CODEC 810. Digital audio data is then sent through the communication module 828 to the network 112 (FIG. 1) via the user's network 110, routed by the server 120 and/or the backend API 122, and delivered to the user's client device 114. When the user speaks, after being transferred through the network 112, the user's network 110, and the communication module 828, the digital audio data from the user is decompressed by the audio CODEC 810 and emitted to the visitor through the speaker 812, which may be driven by a speaker driver (not shown).

With further reference to FIG. 8, the button 830 is operatively coupled to the processor 806. The button 830 may have one or more functions, such as changing an operating mode of the floodlight controller 802 and/or triggering a reset of the floodlight controller 802. For example, when the button 830 is pressed and released, it may cause the communication module 828 of the floodlight controller 802 to enter access point (AP) mode, which may facilitate connecting the floodlight controller 802 to the user's network 110. Alternatively, or in addition, when the button 830 is pressed and held down for at least a threshold amount of time, it may trigger the erasing of any data stored at the volatile memory 824 and/or at the non-volatile memory 826, and/or may trigger a reboot of the processor 806.

With reference to FIG. 9, the floodlight controller 802 comprises a housing 902 for containing and protecting the interior components of the floodlight controller 802. The housing 902 includes a front wall 904, a rear wall 906, opposing side walls 908, 910, an upper wall 912, and a tapered lower portion 914. The front wall 904 includes a central opening that receives an upper shield 916 and a lower grill 918. In the illustrated embodiment, front surfaces of the upper shield 916 and the lower grill 918 are substantially flush with a front surface of the front wall 904, but in alternative embodiments these surfaces may not be flush with one another. The upper shield 916 is substantially rectangular, and includes a semicircular indentation 920 along its lower edge 922. The lower grill 918 is substantially rectangular, and includes a semicircular indentation 924 along its upper edge 926. Together, the semicircular indentations 920, 924 in the upper shield 916 and the lower grill 918 form a circular opening 928 that accommodates a light pipe 930. A cover extends across and closes an outer open end of the light pipe 930. The upper shield 916, the lower grill 918, the light pipe 930, and the cover are all described in further detail below. The camera (not shown) is located in the circular opening 928 formed by the upper shield 916 and the lower grill 918, behind the cover, and is surrounded by the light pipe 930.

With reference to FIG. 8, the floodlight controller 802 further comprises the microphones 814. In the illustrated embodiment, a first one of the microphones 814 is located along the front of the floodlight controller 802 behind the upper shield 916 (FIG. 9) and a second one of the microphones 814 is located along the left side of the floodlight controller 802 behind the left-side wall 910 (FIG. 9) of the housing 902. Including two microphones that are spaced from one another and located on different sides of the floodlight controller 802 provides the illustrated embodiment of the floodlight controller 802 with advantageous noise cancelling and/or echo cancelling for clearer audio. The illustrated embodiment is, however, just one example and is not limiting. Alternative embodiments may only include one microphone 814, or include two microphones 814 in different locations than as illustrated in FIG. 8.

With reference to FIG. 9, the upper shield 916 may include a first microphone opening 932 located in front of the first microphone 814 to facilitate the passage of sound through the upper shield 916 so that sounds from the area about the floodlight controller 802 may reach the first microphone 814. The left-side wall 910 of the housing 902 may include a second microphone opening (not shown) located in front of the second microphone 814 that facilitates the passage of sound through the left-side wall 910 of the housing 902 so that sounds from the area about the floodlight controller 802 may reach the second microphone 814.

With further reference to FIG. 9, the floodlight controller 802 may further comprise a light barrier 934 surrounding inner and outer surfaces of the light pipe 930. The light barrier 934 may comprise a substantially opaque material that prevents the light generated by the light indicators 834 from bleeding into the interior spaces of the floodlight controller 802 around the light pipe 930. The light barrier 934 may comprise a resilient material, such as a plastic, which may also advantageously provide moisture sealing at the junctures between the light pipe 930 and the upper shield 916 and the lower grill 918. Portions of the light barrier 934 may also extend between the junctures between the upper shield 916 and the lower grill 918.

With further reference to FIG. 9, the floodlight controller 802 further comprises connecting hardware configured for connecting the floodlight controller 802 to a floodlight device 1002 (FIG. 10) and a power source (not shown). The floodlight controller 802 further comprises a plurality of wires for connecting the floodlight controller 802 to the power supply and to the floodlight(s) 1004 (FIG. 10) of the floodlight device 1002 (for enabling the floodlight controller 802 to turn the floodlight(s) 1004 on and off). In the illustrated embodiment, three wires may be used, but the illustrated embodiment is merely one example and is not limiting. In alternative embodiments, any number of wires may be provided.

Some of the present embodiments may comprise computer vision for one or more aspects, such as object and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that may interface with other thought processes and elicit appropriate action. This image understanding may be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data may take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes may be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that may be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Typical functions and components (e.g., hardware) found in many computer vision systems are described in the following paragraphs. The present embodiments may include at least some of these aspects. For example, with reference to FIGS. 3-5, embodiments of the present A/V recording and communication doorbell 302 may include a computer vision module 552. In addition, with reference to FIGS. 6-7, embodiments of the present security camera 602 may include a computer vision module 744. The computer vision module 552 may include any of the components (e.g., hardware) and/or functionality described herein with respect to computer vision, including, without limitation, one or more cameras, sensors, and/or processors. In some of the present embodiments, with reference to FIGS. 3-5, the microphone 524, the camera 316, and/or the imager 546 may be components of the computer vision module 552.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but may also be related to various physical measures, such as depth, absorption or reflectance of sonic or electromagnetic waves, or nuclear magnetic resonance.

Pre-processing—Before a computer vision method may be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information may be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 552). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition identifies facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms may be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It may also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors may be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital images or scanned images, for example. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that may be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers may be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIGS. 6-7, the computer vision module 744, and/or the camera 614 and/or the processor 726 may receive information about the person using any one, or any combination of more than one, of the foregoing biometrics.

As described above, one aspect of the present embodiments includes the realization that homeowners and property owners may want to know when an entity (e.g., person, animal, object) is on their property or premises, and also may wish to be informed of a direction of movement of the entity. However, devices that use motion sensors for motion detection, other than the devices described herein, may only alert users (e.g., provide notifications to users) when the motion sensors of the devices detect motion, but may not provide any further information related to directionality, such as a direction in which the entity is moving. For example, a user may be alerted by a device that includes a motion sensor (or a motion sensor itself) that there is motion in front of their home or business (e.g., an alarm may sound, a light might illuminate, or an alert might be sent to the user), but without information on what direction the entity that caused the motion detection is moving relative to a device (e.g., from left to right or right to left, or from near to further away from the sensor or further away to nearer the sensor). As a result, a user may be unable to determine whether a moving entity is an unwanted visitor approaching the house or is merely a resident leaving the house. As such, the notifications sent to the user may not allow the user to appreciate the situation as fully, and as a result, the user may not take the actions that the user would desire if armed with this additional information. In addition, because the device may activate one or more additional components (e.g., a camera, a processor, etc.) in response to detecting motion using the motion sensors, battery powered devices may experience more significant drains on the battery.

The present embodiments solve this problem by, for example, using at least two passive infrared (PIR) sensors mounted on a PIR sensor holder assembly within an A/V recording and communication device to determine one or more characteristics associated with a motion of entities in a field of view of the motion sensors. For example, each of the at least two PIR sensors may be positioned to have different fields of view, though each field of view (FOV) may overlap with the field of view of adjacent sensor(s). In one example, to detect motion that is in a direction of toward or away from an A/V recording and communication device, two PIR sensors may be positioned in substantial vertical alignment with each other (e.g., with one above the other). A first PIR sensor's field of view may be oriented to be angled higher off the ground than a second PIR sensor's field of view, such that at a given moment, one sensor may not detect motion of an object while the second sensor does detect the motion. For instance, a first PIR sensor may detect motion in a first field of view, which encompasses an area that captures objects at a certain distance away from the camera. Meanwhile, the second PIR sensor may have a second field of view that may be directed more downward than the first PIR sensor and, as a result, may detect no motion. At a later time, both the first PIR sensor and the second PIR sensor may detect motion, or only the second PIR sensor may detect motion. In this instance, it may be determined from motion data from these sensors that an object is moving toward the PIR sensors (e.g., toward the A/V recording and communication device). In response to receiving data from the sensors that indicates movement toward the camera, a network device or the A/V recording and communication device may, for example, generate and transmit a user alert, instruct a camera in the A/V recording and communication device to start recording, and/or the like. As described herein, because the additional components of the A/V recording and communication device may only be activated in response to entities moving in particular directions, the battery drain on the A/V recording and communication device may be lessened as compared to an A/V recording and communication device that activates additional components in response to motion in all directions being detected.

The ability of the innovation described herein to determine the direction that an object is moving has a number of technological benefits, including the ability to trigger different actions depending on what direction is detected. In this way, the number of alerts may be reduced as a result of alerts being transmitted only for certain directions of detected movement. Additionally, storage is reduced at an A/V recording and communication device and/or network device because image data may be recorded for objects determined to be moving in one direction and not others. Moreover, this technology enables a user to create custom settings so that different actions may be taken for various directions of movement. As a result of the direction detection processes described herein, the user may be better informed about the nature of movement around their home or business, and the battery life of the A/V recording and communication device may be increased. With the additional information related to the direction of the entities, the user may take various actions to protect the user's family, pets, and/or property. In addition, because of the longer battery life (for battery powered devices), the A/V recording and communication device may require less frequent charging and, as a result, may be in action (e.g., operational) more often, thereby also increasing the safety of the user's family, pets, and/or property.

Figure 11:
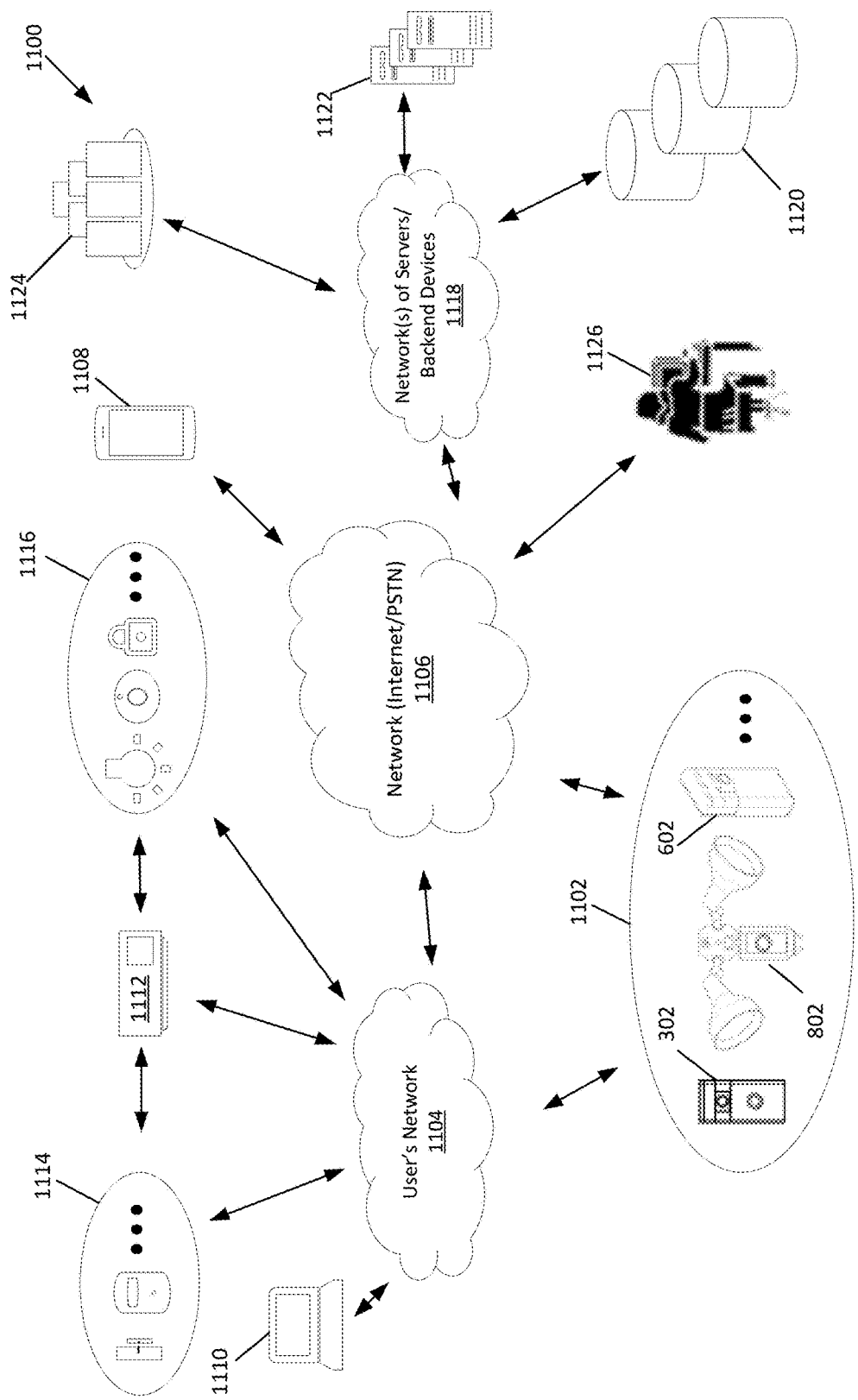
FIG. 11 is a functional block diagram illustrating an example system for communicating in a network according to various aspects of the present disclosure.

FIG. 11 is a functional block diagram illustrating a system 1100 for communicating in a network according to various aspects of the present disclosure. The system 1100 may include one or more A/V recording and communication devices 1102 configured to access a user's network 1104 (which may correspond to the user's network 110) to connect to a network (Internet/PSTN) 1106 (in some embodiments, the devices 1102 may be configured to connect directly to the network (Internet/PSTN) 1106, such as over a cellular connection). The one or more A/V recording and communication devices 1102 may include any or all of the components and/or functionality of the A/V recording and communication device 102 (FIGS. 1-2), the A/V recording and communication doorbell 302 (FIGS. 3-5), the security camera 602 (FIGS. 6-7), and/or the floodlight controller 802 (FIGS. 8-10).

The user's network 1104 may include any or all of the components and/or functionality of the user's network 110 described herein.

The system 1100 may also include one or more client devices 1108, 1110 (alternatively referred to herein as a "client device 1108, 1110"), which in various embodiments may be configured to be in network communication with and/or associated with the A/V recording and communication device 1102, the smart-home hub device 1112 (which may alternatively be referred to herein as the hub device 1112), the automation devices 1116, and/or the sensors 1114. The client devices 1108, 1110 may comprise, for example, a mobile phone such as a smartphone, or a computing device such as a tablet computer, a laptop computer, a desktop computer, etc. In some embodiments, the client device 1108, 1110 may include a connected device, such as a smart watch, Bluetooth headphones, another wearable device, or the like. In such embodiments, the client device 1108, 1110 may include a combination of the smartphone or other device and a connected device (e.g., a wearable device), such that alerts, data, and/or information received by the smartphone or other device are forwarded to the connected device, and one or more controls of the smartphone or other device may be input using the connected device (e.g., by touch, voice, etc.). The client devices 1108, 1110 may include any or all of the components and/or functionality of the client device 114 (FIG. 1) and/or the client device 2302 (FIG. 23) described herein. In some embodiments, one or more of the client devices 1108, 1110 may not be associated with the A/V recording and communication device 1102.

The one or more sensors 1114 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

The one or more automation devices 1116 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.), a doorbell chime, a barrier control device (e.g., an automated door hinge), a smart doormat, and/or other automation devices.

The system 1100 may further include a smart-home hub device 1112 (which may alternatively be referred to herein as the hub device 1112) connected to the user's network 1104. The smart-home hub device 1112 (also known as a home automation hub, gateway device, etc.), may comprise any device that facilitates communication with and control of the sensors 1114, automation devices 1116, and/or the one or more A/V recording and communication devices 1102. For example, the smart-home hub device 1112 may be a component of a home automation system installed at a property. In some embodiments, the A/V recording and communication devices 1102, the sensors 1114, and/or the automation devices 1116 may communicate with the smart-home hub device 1112 directly and/or indirectly via the user's network 1104 and/or the network (Internet/PSTN) 1106. In some of the present embodiments, the A/V recording and communication devices 1102, the sensors 1114, and/or the automation devices 1116 may, in addition to or in lieu of communicating with the smart-home hub device 1112, communicate with the client devices 1108, 1110 and/or one or more of the components of the network of servers/backend devices 1118 directly and/or indirectly via the user's network 1104 and/or the network (Internet/PSTN) 1106.

Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. Smart home devices (e.g., the hub device 1112, the sensors 1114, the automation devices 1116, the A/V recording and communication devices 1102, etc.), when remotely monitored and controlled via the network (Internet/PSTN) 1106, may be considered to be components of the Internet of Things. Smart home systems may include switches and/or sensors (e.g., the sensors 1114) connected to a central hub such as the smart-home hub device 1112, sometimes called a gateway, from which the system may be controlled with a user interface. The user interface may include any or all of a wall-mounted terminal (e.g., a keypad, a touchscreen, etc.), software installed on the client devices 1108, 1110 (e.g., a mobile application), a tablet computer or a web interface, often but not always via Internet cloud services. The home automation system may use one or more communication protocols, including either or both of wired and wireless protocols, including but not limited to Wi-Fi, X10, Ethernet, RS-485, 6LoWPAN, Bluetooth LE (BTLE), ZigBee, and Z-Wave.

As described herein, in some of the present embodiments, some or all of the user's network 1104, the client devices 1108, 1110, the A/V recording and communication device 1102, the smart-home hub device 1112, the sensors 1114, and the automation devices 1116 may be referred to as a security system, which may be installed at a property or premises.

With further reference to FIG. 11, the system 1100 may also include various backend devices such as (but not limited to) storage devices 1120, backend servers 1122, and backend APIs 1124 that may be in network communication (e.g., over the user's network 1104 and/or the network (Internet/PSTN) 1106) with the A/V recording and communication devices 1102, the hub device 1112, the client devices 1108, 1110, the sensors 1114, and/or the automation devices 1116. In some embodiments, the storage devices 1120 may be a separate device from the backend servers 1122 (as illustrated) or may be an integral component of the backend servers 1122. The storage devices 1120 may be similar in structure and/or function to the storage device 118 (FIG. 1). In addition, in some embodiments, the backend servers 1122 and backend APIs 1124 may be similar in structure and/or function to the server 120 and the backend API 122 (FIG. 1), respectively. The hub device 1112 and/or the backend server 1122 (and/or one or more additional or alternative devices of the network(s) of servers/backend devices 1118) may alternatively be referred to herein as "network devices."

With further reference to FIG. 11, the system 1100 may also include a security monitoring service 1126. The security monitoring service 1126 may be operated by the same company that manufactures, sells, and/or distributes the A/V recording and communication devices 1102, the hub device 1112, the sensors 1114, and/or the automation devices 1116. In other embodiments, the security monitoring service 1126 may be operated by a third-party company (e.g., a different company than the one that manufactured, sold, and/or distributed the A/V recording and communication devices 1102, the hub device 1112, the sensors 1114, and/or the automation devices 1116). In any of the present embodiments, the security monitoring service 1126 may have control of at least some of the features and components of the security system (e.g., the security monitoring service 1126 may be able to arm and/or disarm the security system, lock and/or unlock doors, activate and/or deactivate one or more of the sensors 1114 and/or the automation devices 1116, etc.). For example, the security monitoring service 1126 may operate and control their own client devices and/or network of servers/backend devices for monitoring and/or controlling security systems. In such an example, the A/V recording and communication devices 1102, the hub device 1112, the sensors 1114, and/or the automation devices 1116 may communicate with the client devices and/or one or more components of the network of servers/backend devices of the security monitoring service 1126 over the network (Internet/PSTN) 1106 (in some embodiments, via one or more of the components of the network of backend servers/backend devices 1118).

Figure 12:
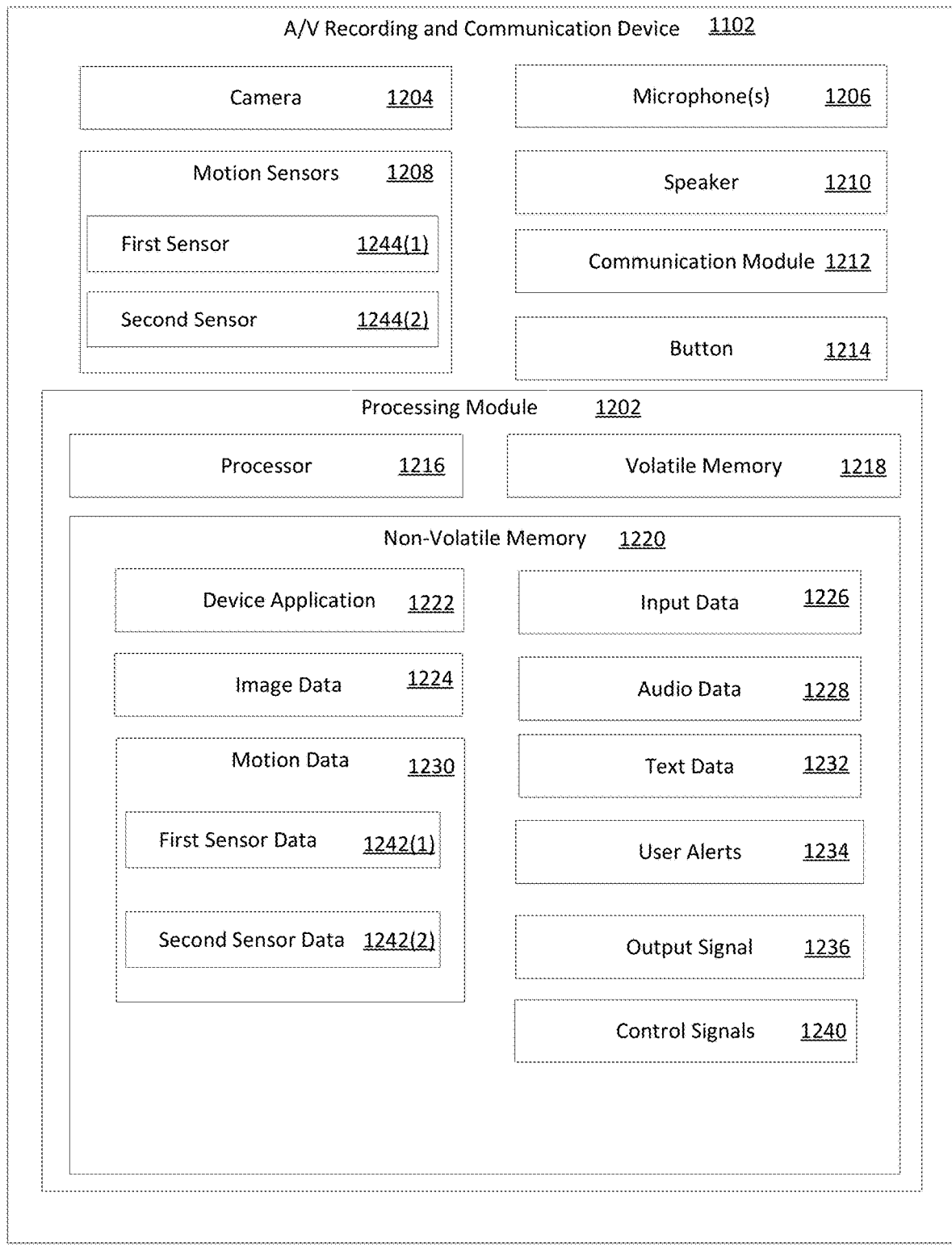
FIG. 12 is a functional block diagram illustrating one example embodiment of an A/V recording and communication device according to various aspects of the present disclosure.

FIG. 12 is a functional block diagram illustrating one example embodiment of an A/V recording and communication device according to various aspects of the present disclosure. In some embodiments, the A/V recording and communication device 1102 may represent, and further include one or more of the components from, the A/V recording and communication doorbell 302, the A/V recording and communication security camera 602, and/or the floodlight controller 802. Additionally, in some embodiments, the A/V recording and communication device 1102 may omit one or more of the components shown in FIG. 12 and/or may include one or more additional components not shown in FIG. 12.

The A/V recording and communication device 1102 may comprise a processing module 1202 that is operatively connected to a camera 1204, microphone(s) 1206, a motion sensor 1208, a speaker 1210, a communication module 1212, and a button 1214 (in embodiments where the A/V recording and communication device 1102 is a doorbell, such as the A/V recording and communication doorbell 302). In some embodiments, the motion sensor 1208 may comprise at least a first sensor 1244(1) and a second sensor 1244(2). In some embodiments, the motion sensor 1208 may include more than two sensors. The processing module 1202 may comprise a processor 1216, volatile memory 1218, and non-volatile memory 1220, which includes a device application 1222. In various embodiments, the device application 1222 may configure the processor 1216 to capture image data 1224 using the camera 1204, audio data 1226 using the microphone(s) 1206, input data 1228 using the button 1214 (and/or the camera 1204 and/or the motion sensor 1208, depending on the embodiment), and/or motion data 1230 using the camera 1204 and/or the motion sensor 1208. In some embodiments, the device application 1222 may also configure the processor 1216 to generate text data 1232 describing the image data 1224, the audio data 1226, the motion data, and/or the input data 1228, such as in the form of metadata, for example.

In addition, the device application 1222 may configure the processor 1216 to transmit the image data 1224, the audio data 1226, the motion data 1230, the input data 1228, the text data 1232, and/or a user alert 1234 to the client devices 1108, 1110, the hub device 1112, and/or the backend server 1122 using the communication module 1212. In various embodiments, the device application 1222 may also configure the processor 1216 to generate and transmit an output signal 1236 that may include the image data 1224, the audio data 1226, the text data 1232, the input data 1228, and/or the motion data 1230. In some of the present embodiments, the output signal 1236 may be transmitted to the backend server 1122 and/or the hub device 1112 using the communication module 1212, and the backend server 1122 and/or the hub device 1112 may transmit (or forward) the output signal 1236 to the client devices 1108, 1110 and/or the backend server 1122 may transmit the output signal 1236 to the hub device 1112. In other embodiments, the output signal 1236 may be transmitted directly to the client devices 1108, 1110 and/or the hub device 1112.

In further reference to FIG. 12, the image data 1224 may comprise image sensor data such as (but not limited to) exposure values and data regarding pixel values for a particular sized grid. The image data 1224 may include still images, live video, and/or pre-recorded images and/or video. The image data 1224 may be recorded by the camera 1204 in a field of view (FOV) of the camera 1204. The camera 1204 may have a different field of view than the sensors 1244.

In further reference to FIG. 12, the motion data 1230 may comprise motion sensor data generated in response to motion events. For example, the motion data 1230 may include first sensor data 1242(1) and/or second sensor data 1242(2) comprising an amount or level of a data type generated by sensors 1244. Motion data 1230 may also be generated by the camera 1204. In such embodiments, based on a frame by frame comparison of changes in the pixels from the image data 1224, it may be determined that motion is present.

The input data 1228 may include that data generated in response to an input to the button 1214. The button 1214 (which may include similar design and functionality to that of the front button 306 (FIG. 3)) may receive an input (e.g., a press, a touch, a series of touches and/or presses, etc.) and may generate the input data 1228 in response that is indicative of the type of input. In embodiments where the A/V recording and communication device 1102 is not a doorbell, the A/V recording and communication device 1102 may not include the button 1214, and in such embodiments, the A/V recording and communication device 1102 may not generate the input data 1228 and/or the input data 1228 may be generated by another component of the A/V recording and communication device 1102 (e.g., the camera 1204).

With further reference to FIG. 12, a user alert 1234 may be generated by the processor 1216 and transmitted, using the communication module 1212, to the client devices 1108, 1110, the hub device 1112, and/or the backend server 1122. For example, in response to detecting motion using the camera 1204 and/or the motion sensor 1208, the A/V recording and communication device 1102 may generate and transmit the user alert 1234. In some of the present embodiments, the user alert 1234 may include at least the image data 1224, the audio data 1226, the text data 1232, and/or the motion data 1230. Upon receiving the user alert 1234, the user of the client device 1108, 1110 may be able to share the user alert 1234 (or at least some of the contents of the user alert 1234, such as the image data 1224) with a geographic area network.

With further reference to FIG. 12, the motion sensor 1208 of the A/V recording and communication device 1102 may include at least a first sensor 1244(1) and a second sensor 1244(2). In some examples, the first sensor 1244(1) and the second sensor 1244(2) may each include PIR sensors, such as PIR sensors 540 and 734. In some examples, each of the first sensor 1244(1) and the second sensor 1244(2) may be any type of sensor capable of detecting and communicating the presence of a heat source within the respective field of view of each of the first sensor 1244(1) and the second sensor 1244(2). More specifically, each of the first sensor 1244(1) and the second sensor 1244(2) may include an electronic sensor that measures infrared light radiating from an object (that is, any object with a temperature above absolute zero such as a human or an animal), when the object is in the respective field of view of the respective motion sensor 1244(1), 1244(2). For example, a first output signal from the first sensor 1244(1), which may be included in the first sensor data 1242(1), may indicate an increase in voltage when an object passes in the field of view of the first sensor 1244(1). Additionally, a second output signal from the second sensor 1244(2), which may be included in the second sensor data 1242(2), may indicate an increase in voltage when the object passes in the field of view of the second sensor 1244(2). In other words, each of the first sensor data 1242(1) and the second sensor data 1242(2) respectively includes voltage measurements over time for the first sensor 1244(1) and the second sensor 1244(2).

Further, in some embodiments, the motion sensor 1208 may include more than two sensors. Additionally, in some embodiments, the motion sensors may be configured to detect motion using any methodology, such as a methodology that does not rely on detecting the presence of a heat source within a field of view. For example, the motion sensors 1208 may include additional, or alternate, types of motion sensors 1208, such as, without limitation, microwave, ultrasonic, vibration, area reflective, dual technology, or a combination thereof.

As described herein, at least some of the processes of the hub device 1112, the backend server 1122, and/or the client device 1108, 1110 may be executed by the A/V recording and communication device 1102. For example, the device application 1222 may configure the processor 1216 to analyze the motion data 1230 in order to determine one or more characteristics associated with motion of an object. For example, the processor 1216 of the A/V recording and communication device 1102 may analyze the first sensor data 1242(1) and the second sensor data 1242(2) to determine the direction of movement of an object (e.g., a characteristic associated with motion of an object) detected by the first sensor 1244(1) and the second sensor 1244(2). In some examples, to determine the direction of movement, the processor 1216 of the A/V recording and communication device 1102 may first determine, based on analyzing the first motion data 1242(1) and the second motion data 1242(2), the specific times that the respective first sensor 1244(1) and the second sensor 1244(2) detected motion. The specific times are indicated by change in the voltages measured by the first sensor 1244(1) and the second sensor 1244(2). That is, as discussed above, the first sensor data 1242(1) and the second sensor data 1242(2) may include voltage-over-time measurements for the respective first sensor 1244(1) and the second sensor 1244(2), and the processor 1216 of the A/V recording and communication device 1102 may determine the time periods based on the analyzing.

The processor 1216 of the A/V recording and communication device 1102 may then determine a direction of movement of a detected object by comparing the time(s) an object was detected by at least the first sensor 1244(1) and the second sensor 1244(2). For example, the processor 1216 of the A/V recording and communication device 1102 may determine that the first sensor 1244(1) detected motion at a first time and that the second sensor 1244(2) detected motion at second time, where the second time is later in time than the first time. In this example, the second sensor 1244(2) has a field of view directed more downward than the first sensor 1244(1) (that is, a field of view that encompasses an area closer to the A/V recording and communication device 1102 than the first sensor 1244(1), which detects motion further away from the A/V recording and communication device 1102). The processor 1216 of the A/V recording and communication device 1102 may then determine that the two detections were of the same the object (for example, by both being within a threshold span of time), and then determine that the detected object was at a further point from the A/V recording and communication device 1102 at the first time and at the nearer point from the A/V recording and communication device at the second time (e.g., based on the voltage change over time as detected by the first sensor 1244(1) and the second sensor 1244(2)). Based on the determination, the processor 1216 of the A/V recording and communication device 1102 may determine that the object was moving toward the A/V recording and communication device 1102.

In some examples, the processor 1216 of the A/V recording and communication device 1102 may determine that an object was moving from nearer to farther from the A/V recording and communication device 1102. For example, the processor 1216 of the A/V recording and communication device 1102 may analyze the first motion data 1242(1) and the second motion data 1242(2) generated respectively by the first sensor 1244(1) and the second sensor 1244(2) (wherein the second sensor 1244(2) has a field of view directed more downward than the first sensor 1244(1)). Based on the analysis, the processor 1216 of the A/V recording and communication device 1102 may determine that motion was detected by the second sensor 1244(2) at a first time and by the first sensor 1244(1) at a second, later time. Based on the determination, the processor 1216 of the A/V recording and communication device 1102 may determine that the direction of the object was away from the A/V recording and communication device 1102.

In some examples, "near" means relatively closer to the A/V recording and communication device 1102 in radial distance, and "far" means relatively further away than the A/V recording and communication device 1102 in radial distance. In some examples, a direction of travel or movement that is described as "toward," "nearer" or "closer" the A/V recording and communication device 1102 is a direction from one radial distance measurement to a decreased radial distance measurement from the A/V recording and communication device 1102. For example, an object that is at a 20-foot radial distance from the A/V recording and communication device 1102 at a first time and is at a 15-foot radial distance from the A/V recording and communication device 1102 at a second, later time, is moving toward, nearer, and/or closer the A/V recording and communication device 1102. Direction of travel that is described as "away from," "away," "further," "farther" is a direction that is toward an increased radial distance from the A/V recording and communication device 1102.

In other examples, the device application 1222 may also configure the processor 1216 to determine, additionally to, or alternatively from, the near-far motion detection, horizontal (e.g., side-to-side) movement of the detected object as a characteristic of the motion of the object. In this configuration, sensors may be aligned horizontally instead of vertically.

For example, the first sensor 1244(1) may be positioned to have a field of view 1714 left of center (e.g., a negative angle with respect to a plane 1712 perpendicular to ground plane 1710), the second sensor 1244(2) may be centered and has a field of view (not shown) that extends directly out from the sensor assembly 1702, and a third sensor 1244(3) (e.g., illustrated in the example embodiments of FIG. 17C) may be positioned to have a field of view 1716 right of center (e.g., a positive angle with respect to a plane 1712 perpendicular to ground plane 1710). The first sensor data 1242(1) of the first sensor 1244(1), the second sensor data 1242(2) of the second sensor 1244(2), and third sensor data of the third sensor 1244(3) includes voltage-over-time measurements for the first sensor 144(1), the second sensor 144(2) and the third sensor 144(3), respectively. The processor 1216 of the A/V recording and communication device 1102 may determine a direction of movement of a detected object by comparing the time(s) an object was detected by any two or three of the three sensors 1244(1), 1244(2), 1244(3). In one example, the processor 1216 of the A/V recording and communication device 1102 may determine that first sensor 1244(1) detected motion at a first time. The processor 1216 of the A/V recording and communication device 1102 may also determine that the second sensor 1244(2) detected motion at a second time, where the second time is later in time than the first time. Additionally, the processor 1216 of the A/V recording and communication device 1102 may determine that the third sensor 1244(3) did not detect motion in a given time period that includes the first time and the second time. In this example, the second sensor 1244(2) has a field of view directed more to the right (from behind the A/V recording and communication device looking out into the field of view) than the first sensor 1244(1). Therefore, the processor 1216 of the A/V recording and communication device 1102 may determine that the object was moving from right to left.

In some examples, the device application 1222 may also configure the processor 1216 to determine the speed of the detected object as a characteristic of the motion of the object. For example, the speed of the object may be determined by taking the difference between the time of detection by the first sensor 1244(1) and time of detection by the second sensor 1244(2). For example, and using the fields of view of the first sensor 1244(1) and the second sensor 1244(2), the processor 1216 of the A/V recording and communication device 1102 may determine the speed by determining the distance between geographic points (as estimated based on voltage levels output by the motion sensors 1208, for example) within each field of view and dividing the distance by the times of detection.

In some examples, depending on the determined one or more characteristics, the processor 1216 of the A/V recording and communication device 1102 may cause at least one action to occur. For a first example, in response to determining that the object is moving toward the A/V recording and communication device 1102, the processor 1216 of the A/V recording and communication device 1102 may generate a user alert 1234 indicating that the motion was detected and/or that the object is moving toward the A/V recording and communication device. The processor 1216 of the A/V recording and communication device 1102 may then transmit, using the communication module 1212, the user alert 1234 to the client devices 1108, 1110, the hub device 1112, the backend server 1122, and/or the security monitoring service 1126.

For a second example, in response to determining that the object is moving toward the A/V recording and communication device, the processor 1216 of the A/V recording and communication device 1102 may generate an output signal 1236 that includes the image data 1224, the audio data 1226, the text data 1232, the input data 1228, and/or the motion data 1230 (e.g., first sensor data 1242(1) and second sensor data 1242(2)). The processor 1216 of the A/V recording and communication device 1102 may then transmit, using the communication module 1212, the output signal 1236 (and/or just the image data 1224, the audio data 1226, the text data 1232, the input data 1228, and/or the motion data 1230) to the client device 1108, 1110, backend server 1122 and/or the hub device 1112.

For a third example, in response to determining that the object is moving toward the A/V recording and communication device, the processor 1216 of the A/V recording and communication device 1102 may generate a control signal 1240 that is configured to cause a security system to activate an alarm. The processor 1216 of the A/V recording and communication device 1102 may then transmit, using the communication module 1212, the control signal 1240 to the hub device 1112 and/or the backend server 1122. Still, for a fourth example, in response to determining that the object is moving toward the A/V recording and communication device 1102, the processor 1216 of the A/V recording and communication device 1102 may generate a control signal 1240 that is configured to cause an additional A/V recording and communication device to record image data using a camera. The processor 1216 of the A/V recording and communication device 1102 may then transmit, using the communication module 1212, the control signal 1240 to the additional A/V recording and communication device.

For a fifth example, in response to determining that the object is moving in a direction that is right to the left of the A/V recording and communication device 1102, the processor 1216 of the A/V recording and communication device 1102 may perform one or more of the actions above. This may be because the A/V recording and communication device 1102 is positioned on a property such that an entrance of the property is located to the left of the A/V recording and communication device 1102. As such, the user may configure the A/V recording and communication device 1102 to perform at least one of the actions above when an object is detected as moving toward the entrance.

Additionally, or alternatively, in some examples, depending on the determined one or more characteristics, the processor 1216 of the A/V recording and communication device 1102 may refrain from causing the at least one action to occur. For a first example, if the direction of movement is away from A/V recording and communication device 1102, the processor 1216 of the A/V recording and communication device 1102 may refrain from performing any actions. For a second example, and using the example above where the entrance is to the left of the A/V recording and communication device 1102, if the detected motion of the object is from the left to the right of the A/V recording and communication device 1102, the processor 1216 of the A/V recording and communication device 1102 may refrain from causing the at least one action to occur.

Figure 13:
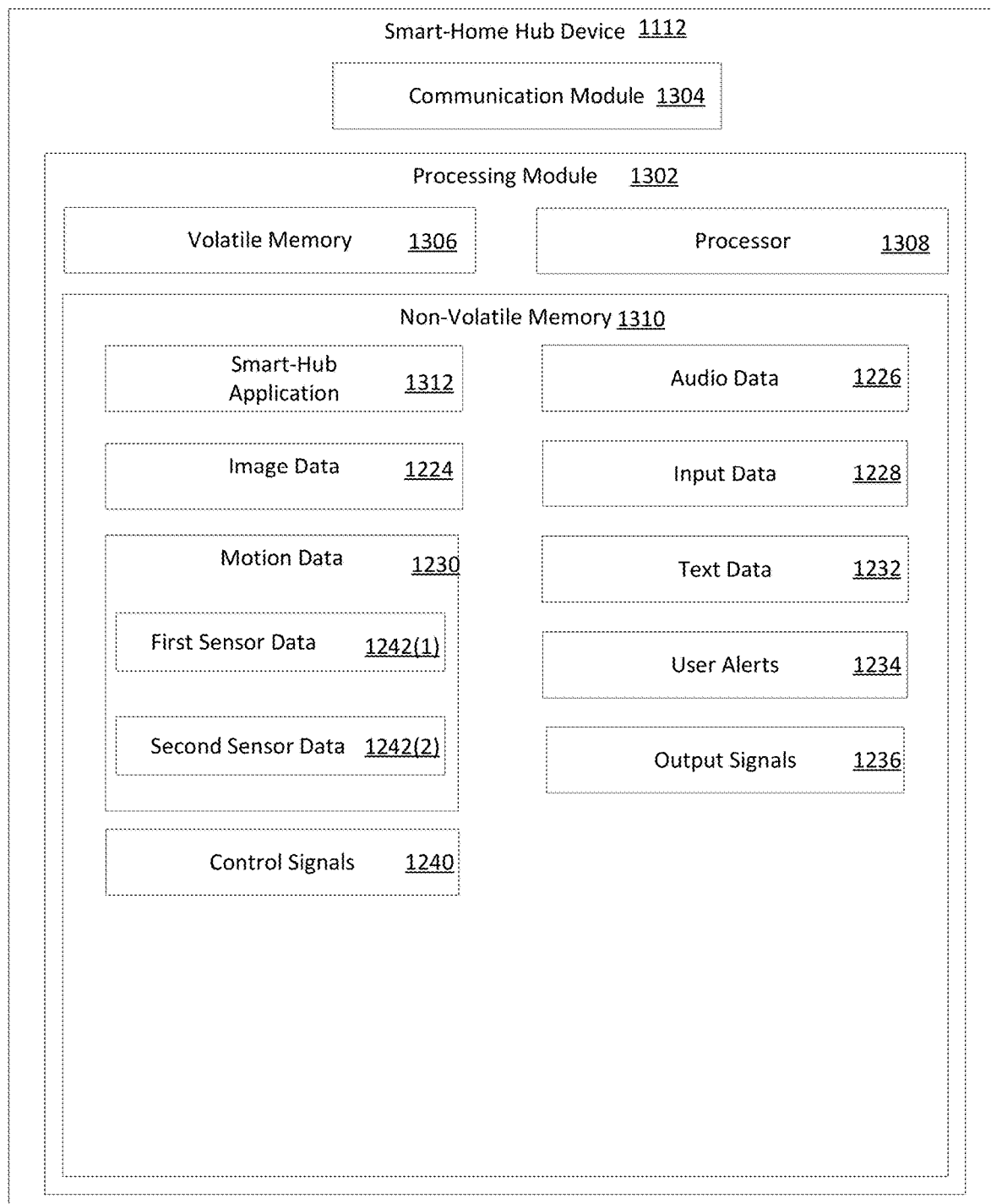
FIG. 13 is a functional block diagram illustrating one example embodiment of a hub device according to various aspects of the present disclosure.

FIG. 13 is a functional block diagram illustrating an example of the smart-home hub device 1112 (alternatively referred to herein as the hub device 1112) according to various aspects of the present disclosure. The hub device 1112 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 1106 for enabling remote control of the hub device 1112), and/or another similar device. The hub device 1112 may comprise a processing module 1302 that is operatively connected to a communication module 1304. In examples, the hub device 1112 may comprise one or more of a camera (not shown), a microphone (not shown), and a speaker (not shown). The processing module 1302 may comprise volatile memory 1306, a processor 1308, and non-volatile memory 1310, which includes a smart-home hub application 1312.

In various embodiments, the smart-home hub application 1312 may configure the processor 1308 to receive sensor data from the sensors 1114 and/or the automation devices 1116. For example, the sensor data may include a current state (e.g., opened/closed for door and window sensors, motion detected for motion sensors, living room lights on/off for a lighting automation system, etc.) of the motion sensor 1208 and/or the automation devices 1116. In some examples, the sensor data may be received in response to sensor triggers. The sensor triggers may be a door opening/closing, a window opening/closing, lights being turned on/off, blinds being opened/closed, detected motion of an object, etc. As such, the sensor data may include the current state of the sensors 1114 and/or the automation devices 1116 as well as any updates to the current state based on sensor triggers.

With further reference to FIG. 13, the smart-home hub application 1312 may configure the processor 1308 to receive the audio data 1226, the text data 1232, the image data 1224, the motion data 1230, the input data 1228, and/or the user alerts 1234 from the A/V recording and communication device 1102 (in some embodiments, via the backend server 1122 and/or the client devices 1108, 1110) using the communication module 1304. For example, the hub device 1112 may receive and/or retrieve (e.g., after receiving a signal from the A/V recording and communication device 1102 that the A/V recording and communication device 1102 has been activated) the image data 1224, the input data 1228, and/or the motion data 1230 from the A/V recording and communication device 1102 and/or the backend server 1122 in response to motion being detected by the A/V recording and communication device 1102.

As described herein, at least some of the processes of the A/V recording and communication device 1102, the backend server 1122, and/or the client device 1108, 1110 may be executed by the hub device 1112. For example, the smart-home hub application 1312 may configure the processor 1308 to analyze the motion data 1230 (e.g., the first sensor data 1242(1) second sensor data 1242(2), etc.) to determine the one or more characteristics associated with the motion detected by the A/V recording and communication device 1102. Based on the one or more characteristics, the smart-home hub application 1312 may configure the processor 1308 to perform one or more actions and/or refrain from performing the one or more actions. For a first example, based on the one or more characteristics, the processor 1308 of the hub device 1112 may generate a user alert 1234 indicating that motion was detected by the A/V recording and communication device 1102 and/or indicating the one or more characteristics associated with the motion. The processor 1308 of the hub device 1112 may then transmit, using the communication module 1304, the user alert 1234 to the client device 1108, 1110 and/or the backend server 1122.

For a second example, based on the one or more characteristics, the processor 1308 of the hub device 1112 may generate one or more control signals 1240 that are configured to cause the A/V recording and communication device 1102 to record image data 1224 and/or an additional A/V recording and communication device to record additional image data. The processor 1308 of the hub device 1112 may then transmit, using the communication module 1304, the one or more control signals 1240 to the A/V recording and communication device 1102 and/or the additional A/V recording and communication device. For a third example, based on the one or more characteristics, the processor 1308 of the hub device 1112 may generate one or more control signals 1240 that are configured to cause the A/V recording and communication device 1102 and/or an additional A/V recording and communication device to output a sound (e.g., activate a siren). The processor 1308 of the hub device 1112 may then transmit, using the communication module 1304, the one or more control signals 1240 to the A/V recording and communication device 1102 and/or the additional A/V recording and communication device. Still, for a fourth example, based on the one or more characteristics, the processor 1308 of the hub device 1112 may cause the security system to activate an alarm.

Still, in some examples, the smart-home hub application 1312 may configure the processor 1308 to perform the one or more actions based on receiving, using the communication module 1304, data (e.g., a user alert 1234, control signal 1240, etc.) from the A/V recording and communication device 1102 and/or the backend server 1122, where the data indicates the one or more characteristics associated with the motion. For a first example, the smart-home hub application 1312 may configure the processor 1308 to activate the alarm of the security system based on receiving, using the communication module 1304, a control signal 1240 from the A/V recording and communication device 1102 and/or the backend server 1122, where the control signal 1240 is configured to cause the hub device 1112 to activate the alarm. For a second example, the smart-home hub application 1312 may configure the processor 1308 to activate the alarm of the security system based on receiving, using the communication module 1304, a user alert 1234 from the A/V recording and communication device 1102 and/or the backend server 1122, where the user alert 1234 indicates that the A/V recording and communication device 1102 detected motion in a direction that is toward the A/V recording and communication device 1102.

Figure 14:
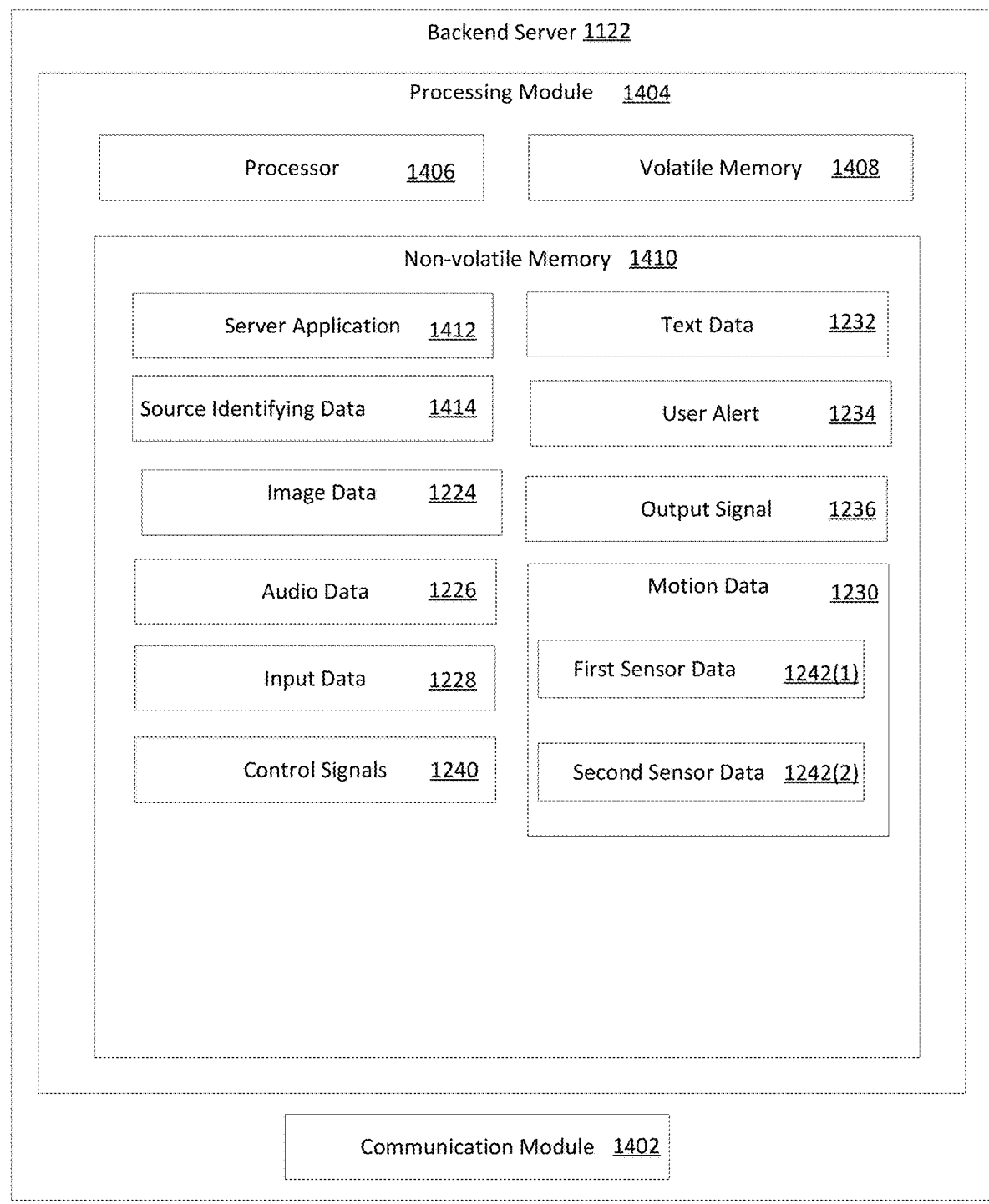
FIG. 14 is a functional block diagram illustrating one example embodiment of a backend server according to various aspects of the present disclosure.

FIG. 14 is a functional block diagram illustrating one embodiment of the backend server 1122 according to various aspects of the present disclosure. The backend server 1122 may comprise a communication module 1402 and a processing module 1404, which includes a processor 1406, volatile memory 1408, and non-volatile memory 1410. The communication module 1402 may allow the backend server 1122 to access and communicate with devices connected to the network (Internet/PSTN) 1106 (e.g., the A/V recording and communication device 1102, the hub device 1112, the client devices 1108, 1110, a device controlled by the security monitoring service 1126, and/or the third-party services). The non-volatile memory 1410 may include a server application 1412 that configures the processor 1406 to receive and/or retrieve (e.g., obtain), using the communication module 1402, the audio data 1226, the text data 1232, the input data 1228, the user alerts 1234, the image data 1224, and/or the motion data 1230 from the A/V recording and communication device 1102 (e.g., in the output signal 1236) and/or the hub device 1112. The server application 1412 may also configure the processor 1406 to transmit (and/or forward) the audio data 1226, the text data 1232, the input data 1228, the user alerts 1234, the image data 1224, and/or the motion data 1230 to the client devices 1108, 1110 and/or the hub device 1112 using the communication module 1402.

In further reference to FIG. 14, the non-volatile memory 1410 may also include source identifying data 1414 that may be used to identify the A/V recording and communication device 1102, the hub device 1112, and/or the client devices 1108, 1110. In addition, the source identifying data 1414 may be used by the processor 1406 of the backend server 1122 to determine whether the client devices 1108, 1110 are associated with the A/V recording and communication device 1102 and/or the hub device 1112.

In some embodiments, the server application 1412 may further configure the processor 1406 to generate and transmit a report signal (not shown) to a third-party client device (not shown) using the communication module 1402, which may be associated with a law enforcement agency or the security monitoring service, for example. The report signal, which may be the user alert 1234, in some examples, may include the image data 1224, the audio data 1226, and/or the text data 1232. In such embodiments, an operator of the third-party client device may be able to view the image data 1224 and/or the text data 1232 to help in making a determination of whether a person in the field of view of the A/V recording and communication device 1102 is suspicious and/or performing suspicious activities.

As described herein, at least some of the processes of the A/V recording and communication device 1102, the hub device 1112, and/or the client device 1108, 1110 may be executed by the backend server 1122. For example, the server application 1412 may configure the processor 1406 to analyze the motion data 1230 (e.g., the first sensor data 1242(1) the second sensor data 1242(2), etc.) to determine the one or more characteristics associated with the motion detected by the A/V recording and communication device 1102. Based on the one or more characteristics, the server application 1412 may configure the processor 1406 to perform one or more actions and/or refrain from performing the one or more actions. For a first example, based on the one or more characteristics, the processor 1406 of the backend server 1122 may generate a user alert 1234 indicating that motion was detected by the A/V recording and communication device 1102 and/or indicating the one or more characteristics associated with the motion. The processor 1406 of the backend server 1122 may then transmit, using the communication module 1402, the user alert 1234 to the client device 1108, 1110 and/or the hub device 1112.

For a second example, based on the one or more characteristics, the processor 1406 of the backend server 1122 may generate one or more control signals 1240 that are configured to cause the A/V recording and communication device 1102 to record image data 1224 and/or an additional A/V recording and communication device to record additional image data. The processor 1406 of the backend server 1122 may then transmit, using the communication module 1402, the one or more control signals 1240 to the A/V recording and communication device 1102 and/or the additional A/V recording and communication device. For a third example, based on the one or more characteristics, the processor 1406 of the backend server 1122 may generate one or more control signals 1240 that are configured to cause the A/V recording and communication device 1102 and/or an additional A/V recording and communication device to output a sound (e.g., activate a siren). The processor 1406 of the backend server 1122 may then transmit, using the communication module 1402, the one or more control signals 1240 to the A/V recording and communication device 1102 and/or the additional A/V recording and communication device.

For a fourth example, based on the one or more characteristics, the processor 1406 of the backend server 1122 may cause the security system to activate an alarm. For instance, the processor 1406 of the backend server 1122 may generate a control signal 1240 that is configured to cause the hub device 1112 to activate the alarm of the security system. The processor 1406 of the backend server 1122 may then transmit, using the communication module 1402, the control signal 1240 to the hub device 1112.

Still, in some examples, the server application 1412 may configure the processor 1406 to perform the one or more actions based on receiving, using the communication module 1402, data (e.g., a user alert 1234, control signal 1240, etc.) from the A/V recording and communication device 1102 and/or the hub device 1112, where the data indicates the one or more characteristics associated with the motion.

Although referred to as the backend server 1122 with reference to the processes described herein, the backend server 1122 may additionally, or alternatively, include one or more of the devices from the network(s) of servers/backend devices 1118. For example, the processes described herein with respect to the backend server 1122 may additionally, or alternatively, at least in part, be performed by one or more backend APIs 1124.

In the illustrated embodiment of FIGS. 12-14, the various components including (but not limited to) the processing modules 1202, 1302, and 1404 and the communication modules 1212, 1304, and 1402 are represented by separate boxes. The graphical representations depicted in each of FIGS. 12-14 are, however, merely examples, and are not intended to indicate that any of the various components of the A/V recording and communication device 1102, the hub device 1112, the backend server 1122, and the client devices 1108, 1110 are necessarily physically separate from one another, although in some embodiments they might be. In other embodiments, however, the structure and/or functionality of any or all of the components of the A/V recording and communication device 1102 may be combined. In addition, in some embodiments the communication module 1212 may include its own processor, volatile memory, and/or non-volatile memory. Likewise, the structure and/or functionality of any or all of the components of the hub device 1112 may be combined. In addition, in some embodiments the communication module 1304 may include its own processor, volatile memory, and/or non-volatile memory. Moreover, the structure and/or functionality of any or all of the components of the backend server 1122 may be combined. In addition, in some embodiments the communication module 1402 may include its own processor, volatile memory, and/or non-volatile memory. Furthermore, the structure and/or functionality of any or all of the components of the client device 1108, 1110 may be combined.

Figure 15:
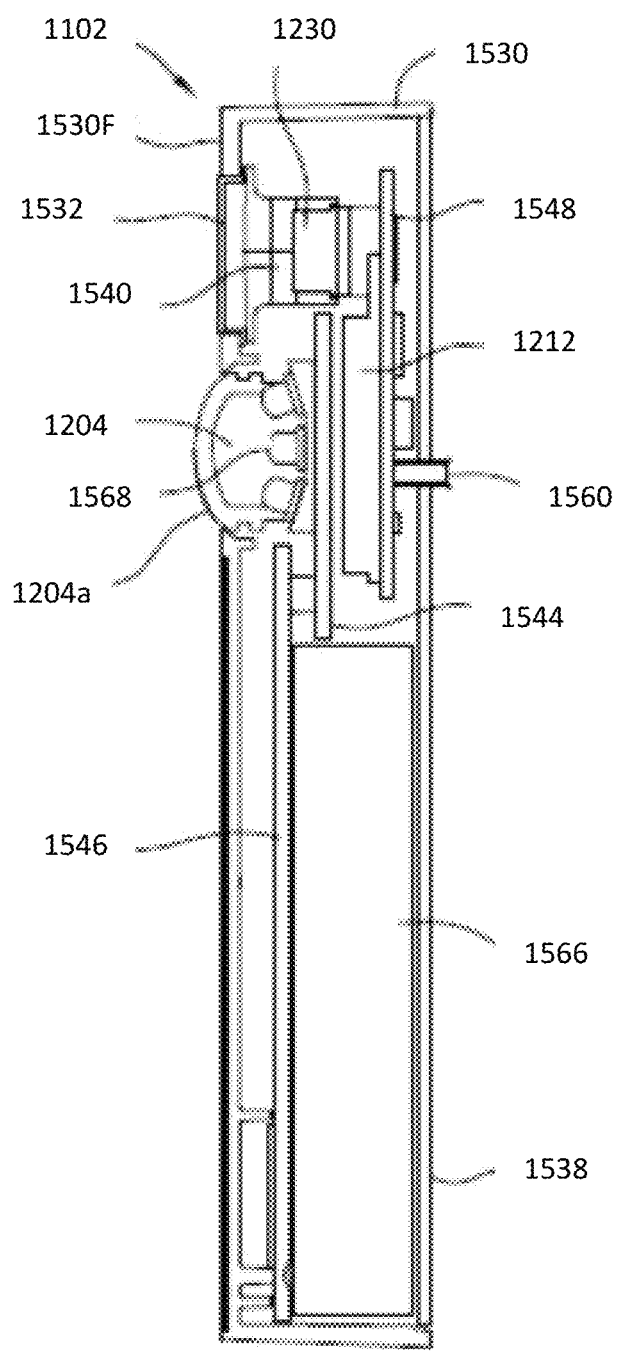
FIG. 15 is cross-sectional left side view of an example A/V recording and communication device of FIG. 3.

FIG. 15 is a cross-sectional left side view of an example A/V recording and communication device 1102, according to some of the embodiments described herein. In the illustrated embodiment, the lens 1532 (such as lens 314) is substantially coplanar with the front surface 1530F of the enclosure 1530 (such as enclosure 310). In alternative embodiments, the lens 1532 may be recessed within the enclosure 1530 or may protrude outward from the enclosure 1530. The camera 1204 is coupled to a camera printed circuit board (PCB) 1544 (such as camera PCB 542), and a camera lens 1204a of the camera 1204 protrudes through an opening in the enclosure 1530. The camera lens 1204a may be a lens capable of focusing light into the camera 1204 so that clear images may be taken. As used herein, the front surface of the A/V recording and communication device 1102 is a vertical plane (e.g., perpendicular to a ground plane) that extends through the front-most point of the camera lens 1204a.

The camera PCB 1544 may be secured within the A/V recording and communication device 1102 with any suitable fasteners, such as screws, or interference connections, adhesives, etc. The camera PCB 1544 comprises various components that enable the functionality of the camera 1204 of the A/V recording and communication device 1102, as described below. Infrared light-emitting components, such as infrared LED's 1568 (such as LED's 520), are coupled to the camera PCB 1544 and may be triggered to activate when a light sensor (such as light sensor 518 and/or 710) detects a low level of ambient light. When activated, the infrared LED's 1568 may emit infrared light through the enclosure 1530 and/or the camera 1204 out into the ambient environment. The camera 1204, which may be configured to detect infrared light, may then capture the light emitted by the infrared LED's 1568 as it reflects off objects within the camera's 1204 field of view, so that the A/V recording and communication device 1102 may clearly capture images at night (may be referred to as "night vision").

With continued reference to FIG. 15, the A/V recording and communication device 1102 further comprises a front PCB 1546 (such as front PCB 516), which in the illustrated embodiment resides in a lower portion of the A/V recording and communication device 1102 adjacent a battery 1566 (such as battery 538 and/or 730). The front PCB 1546 may be secured within the A/V recording and communication device 1102 with any suitable fasteners, such as screws, or interference connections, adhesives, etc. The front PCB 1546 comprises various components that enable the functionality of the audio and light components, as further described below. The battery 1566 may provide power to the A/V recording and communication device 1102 components while receiving power from the spring contacts (not shown) (such as spring contacts 404), thereby engaging in a trickle-charge method of power consumption and supply. Alternatively, the A/V recording and communication device 1102 may draw power directly from the spring contacts (not shown) while relying on the battery 1566 only when the spring contacts (not shown) are not providing the power necessary for all functions. Still further, the battery 1566 may comprise the sole source of power for the A/V recording and communication device 1102. In such embodiments, the spring contacts (not shown) may not be connected to a source of power. When the battery 1566 is depleted of its charge, it may be recharged, such as by connecting a power source to the connector 1560 (such as connector 406 and/or 732).

With continued reference to FIG. 15, the A/V recording and communication device 1102 further comprises a power PCB 1548 (such as power PCB 514), which in the illustrated embodiment resides behind the camera PCB 1544. The power PCB 1548 may be secured within the A/V recording and communication device 1102 with any suitable fasteners, such as screws, or interference connections, adhesives, etc. The power PCB 1548 comprises various components that enable the functionality of the power and device-control components, as further described below.

With continued reference to FIG. 15, the A/V recording and communication device 1102 further comprises the communication module 1212 coupled to the power PCB 1548. The communication module 1212 facilitates communication with client devices in one or more remote locations, as further described below. The connector 1560 may protrude outward from the power PCB 1548 and extend through a hole in the back plate 1538 (such as back plate 402). The A/V recording and communication device 1102 further comprises motion sensors 1208, which are secured on or within a sensor holder 1540, and the assembly resides behind the lens 1532. In some embodiments, the A/V recording and communication device 1102 may comprise two sensors, as further described below, or three sensors, and in other embodiments four or more sensors may be provided. The sensor holder 1540 may be secured to the A/V recording and communication device 1102 with any suitable fasteners, such as screws, or interference connections, adhesives, etc. Further, alternative embodiments may comprise one or more motion sensors in addition to the sensors.

Figure 16B:
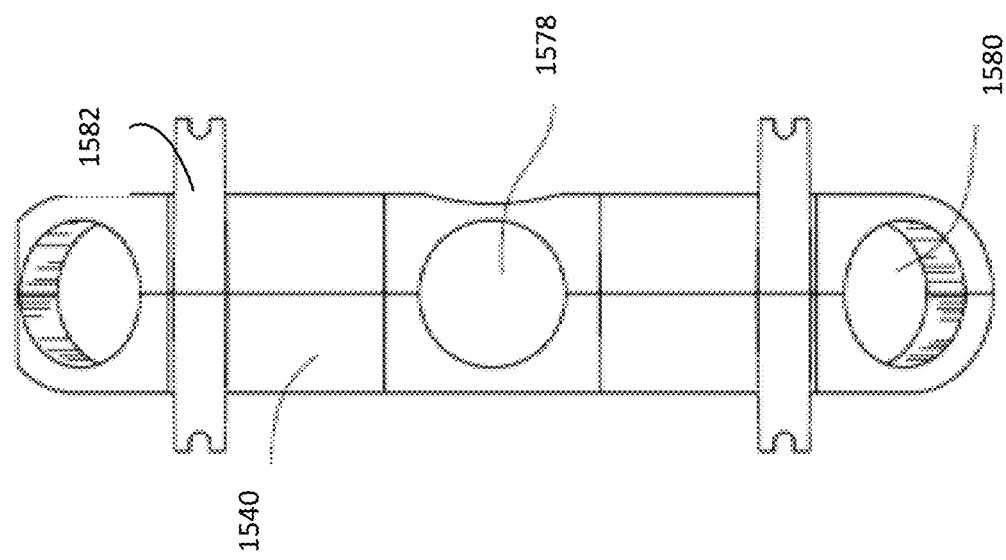
FIGS. 16A-16B are left side and front views, respectively, of a sensor holder assembly of the A/V recording and communication device of FIG. 3.
Figure 16A:
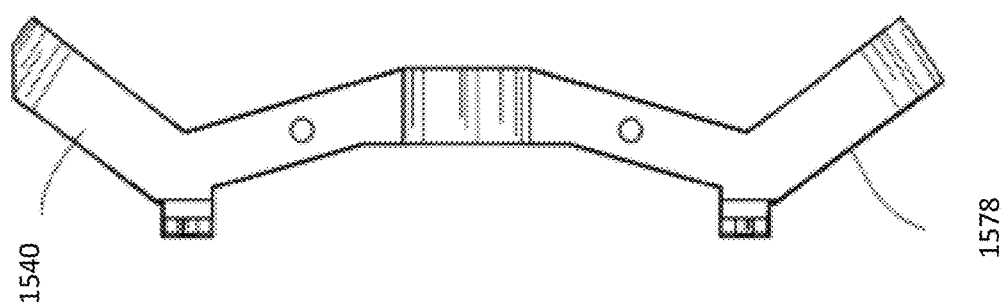

FIG. 16A is a left side view of the sensor holder 1540. The sensor holder 1540 may comprise any suitable material, including, without limitation, metals, metal alloys, or plastics. The sensor holder 1540 is configured to mount the motion sensors 1208 behind the lens 1532 such that the motion sensors 1208 face out through the lens 1532 at varying angles, thereby creating a wide field of view for the motion sensors 1208, and dividing the field of view into zones and/or individual fields of view for each of the motion sensors 1208, as further described below and illustrated in FIG. 19. With further reference to FIG. 16A, the sensor holder 1540 includes one or more faces 1578 within or on which the motion sensors 1208 may be mounted. In the illustrated embodiment, the sensor holder 1540 includes three faces 1578, with each of two outer faces 1578 angled at 55° with respect to a center one of the faces 1578. In alternative embodiments, the angle formed by adjacent ones of the faces 1578 may be increased or decreased as desired to alter the field of view of the motion sensors 1208.

FIG. 16B is a front view of the sensor holder 1540. In the illustrated embodiment, each of the faces 1578 includes a through hole 1580 in which the motion sensors 1208 may be mounted. First and second brackets 1582, spaced from one another, extend transversely across the sensor holder 1540. Each of the brackets 1582 includes notches at either end. The brackets 1582 may be used to secure the sensor holder 1540 within the A/V recording and communication device 1102. In alternative embodiments, the through holes 1580 in the faces 1578 may be omitted. For example, the motion sensors 1208 may be mounted directly to the faces 1578 without the through holes 1580. Generally, the faces 1578 may comprise any structure configured to locate and secure the motion sensors 1208 in place.

FIGS. 17A and 17B are left side and front views, respectively, of an example of a sensor assembly 1584 (e.g., a vertical sensor assembly), including the sensor holder 1540, the lens 1532, and a flexible power circuit 1562. The sensor holder 1540 may be secured to a rear face of the lens 1532. FIG. 17B illustrates a plane 1712 extending through the center of the motion sensors 1208 and vertical to a ground plane 1710). The sensor holder holds the first sensor 1244(1) (e.g., a first PIR sensor), the second sensor 1244(2) (e.g., a second PIR sensor), and a third sensor 1244(3) (e.g., a third PIR sensor), in this example, each with a different field of view. The flexible power circuit 1562, which may be any material or component capable of delivering power and/or data to and from the first sensor 1244(1), the second sensor 1244(2) and/or the third sensor 1244(3), is secured to a rear face of the sensor holder 1540, and may be contoured to match the angular shape of the sensor holder 1540. The flexible power circuit 1562 may connect to, draw power from, and/or transmit data to and/or from, the power PCB 1548. In some examples, and using the sensor assembly 1584, the processor 1216 of the A/V recording and communication device 1102 may be able to analyze motion data 1230, which is generated by the first sensor 1244(1), the second sensor 1244(2), and the third sensor 1244(3), to determine whether an object is moving toward the A/V recording and communication device 1102 and/or away from the A/V recording and communication device 1102.

Figure 17C:
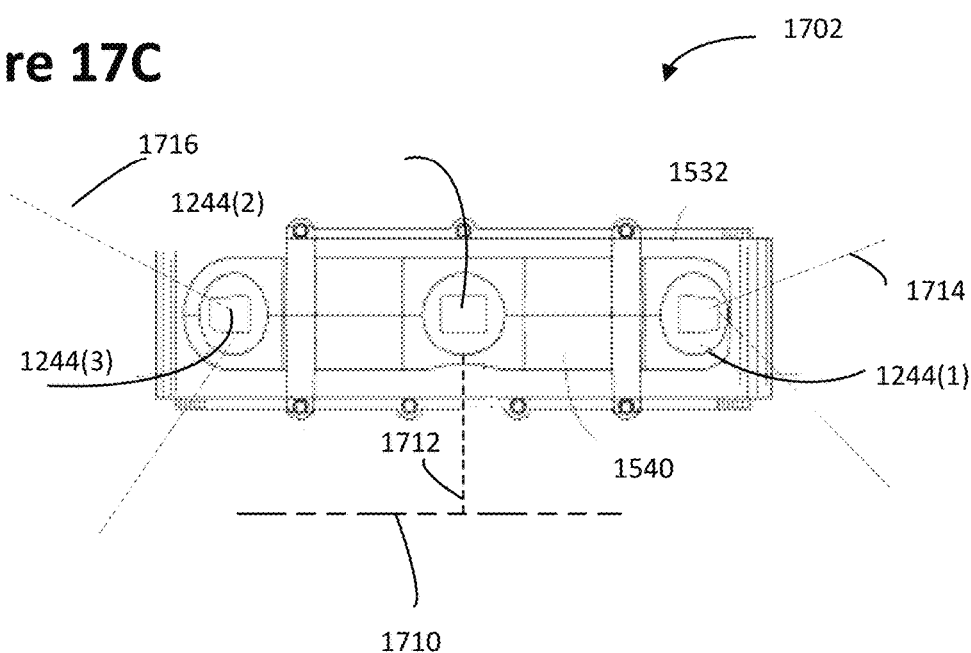
FIG. 17C is a front view of a sensor holder assembly of the A/V recording and communication device of FIG. 3, with three sensors horizontally aligned.

FIG. 17C is a front view of an example of a sensor assembly 1702 (e.g., a horizontal sensor assembly), including the sensor holder 1540, the lens 1532, and a flexible power circuit, that holds three horizontally aligned motion sensors 1244. FIG. 17C illustrates the sensor assembly 1702 that is substantially similar to sensor assembly 1584 shown in FIG. 17B, but rotated 90 degrees clockwise. For example, the first sensor 1244(1), the second sensor 1244(2), and the third sensor 1244(3) are aligned horizontally in FIG. 17C, rather than vertically as FIG. 17B depicts. In some examples, and using the sensor assembly 1702, the processor 1216 of the A/V recording and communication device 1102 may be able to analyze motion data 1230, which is generated by the first sensor 1244(1), the second sensor 1244(2), and the third sensor 1244(3), to determine whether an object is moving from the left to the right of the A/V recording and communication device 1102 and/or is moving from the right to the left of the A/V recording and communication device 1102.

Figure 17D:
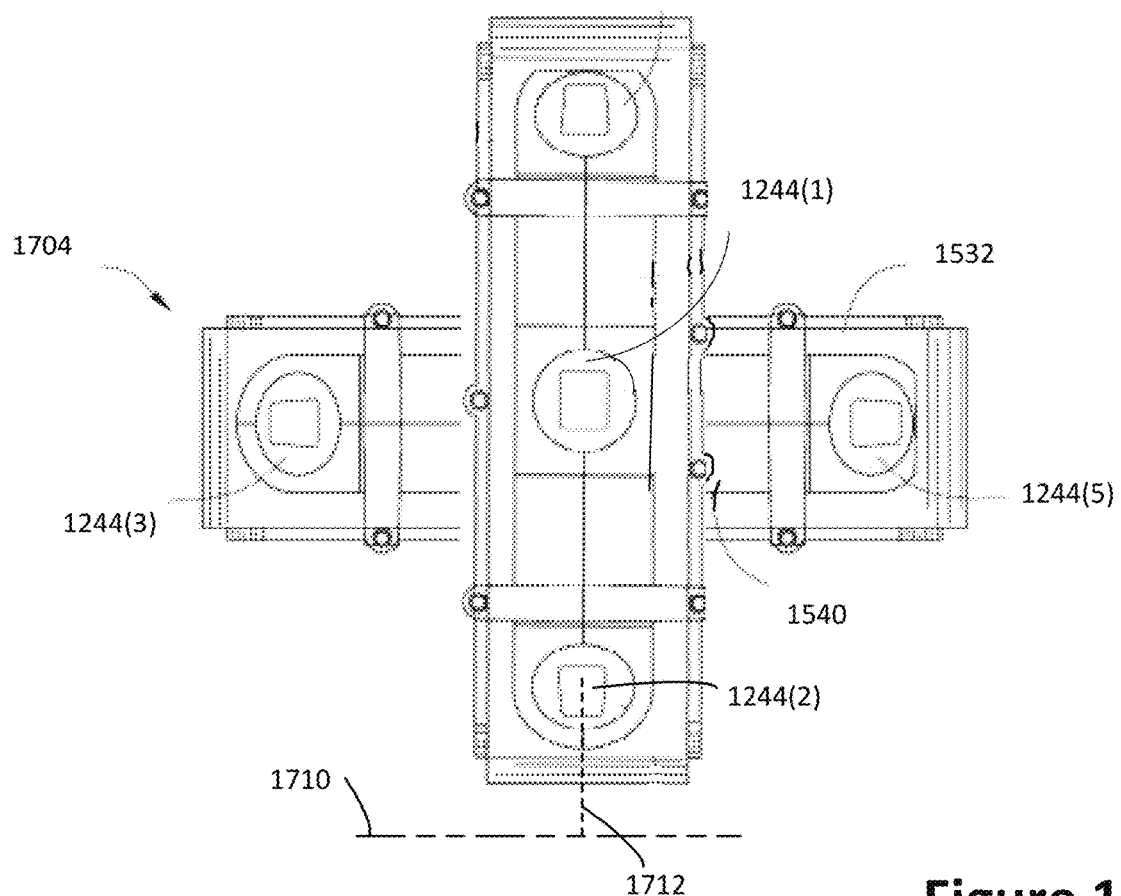
FIG. 17D is a front view of a sensor assembly of the A/V recording and communication device of FIG. 3 that holds five sensors.

FIG. 17D is a front view of an example of a sensor assembly 1704 that holds five sensors 1244, in this example: the first sensor 1244(1) (e.g., a middle sensor), the second sensor 1244(2) below the first sensor 1244(1), and a fourth sensor 1244(4) above the first sensor 1244(1) in substantial vertical alignment (e.g., aligned along a plane 1712 extending through the center of the motion sensors 1208 and vertical to the ground plane 1710). The sensor assembly 1704 also includes a third sensor 1244(3) to the right of first sensor 1244(1) (from behind the A/V recording and communication device 1102 looking out into the field of view) and a fifth sensor 1244(5) to the left of first sensor 1244(1) (from behind the A/V recording and communication device 1102 looking out into the field of view) in substantial horizontal alignment. The horizontally-aligned sensors 1244(3), 1244(1), 1244(5) produce sensor data (not shown) that may be used in combination by the processor 1216 to determine whether an object moved from right to left or from left to right, using the process such as that described herein for FIG. 17C, applied in a horizontal direction rather than a vertical direction. The substantially vertically-aligned sensors 1244(4), 1244(1), 1244(2) produce sensor data (not shown) that may be used in combination by the processor 1216 to determine whether an object moved toward or away from the A/V recording and communication device 1102, using a process such as that described herein for FIGS. 12, 13, 14, 15, 16A, 16B, 17A, 17B, and 17C. As such, the processor 1216 of the A/V recording and communication device 1102 is able to use the sensor assembly 1704 to determine whether an object moved forward and to the left, for example. In another example, the processor 1216 of the A/V recording and communication device 1102 may determine that the object moved toward the sensor without any movement left to right or right to left. In another example, the processor 1216 of the A/V recording and communication device 1102 may determine that an object moved toward the A/V recording and communication device 1102 both horizontally and vertically (e.g., from left to center, and from far to near).

Figure 18A:
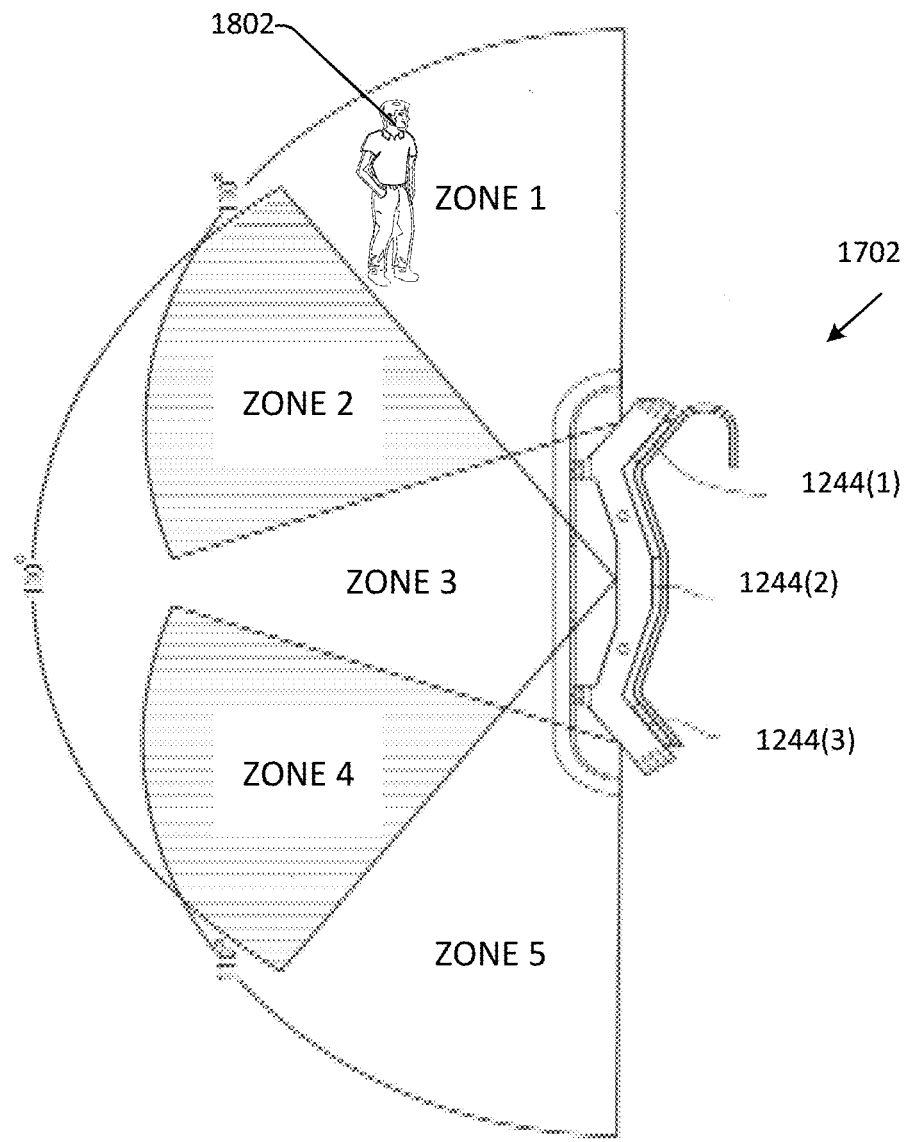
FIG. 18A-18B are top views of the sensor assembly of FIG. 17C, depicting fields of view of three sensors according to an aspect of the present disclosure and a person approaching the sensor assembly.

FIG. 18A is a top view of the sensor assembly 1702 illustrating the fields of view of three sensors 1244(1), 1244(2), 1244(3) positioned in substantial horizontal alignment. Each sensor 1244(1), 1244(2), 1244(3) is associated with a field of view that traces an angle extending outward from the respective sensor 1244(1), 1244(2), 1244(3). In the illustrated embodiment, the field of view of each sensor 1244(1), 1244(2), 1244(3) extends across an angle of 110°. In alternative embodiments, each zone may extend across a different angle, such as one greater than or less than 110°.

FIG. 18A illustrates an example in which sensor 1244(1) is associated with a field of view comprising Zone 1 and Zone 2. Second sensor 1244(2) is associated with a field of view comprising Zone 2, Zone 3, and Zone 4. Third sensor 1244(3) is associated with a field of view comprising Zone 4 and Zone 5. In the example of 18A, a location of an object 1802 at a first time is in Zone 1.

Figure 18B:
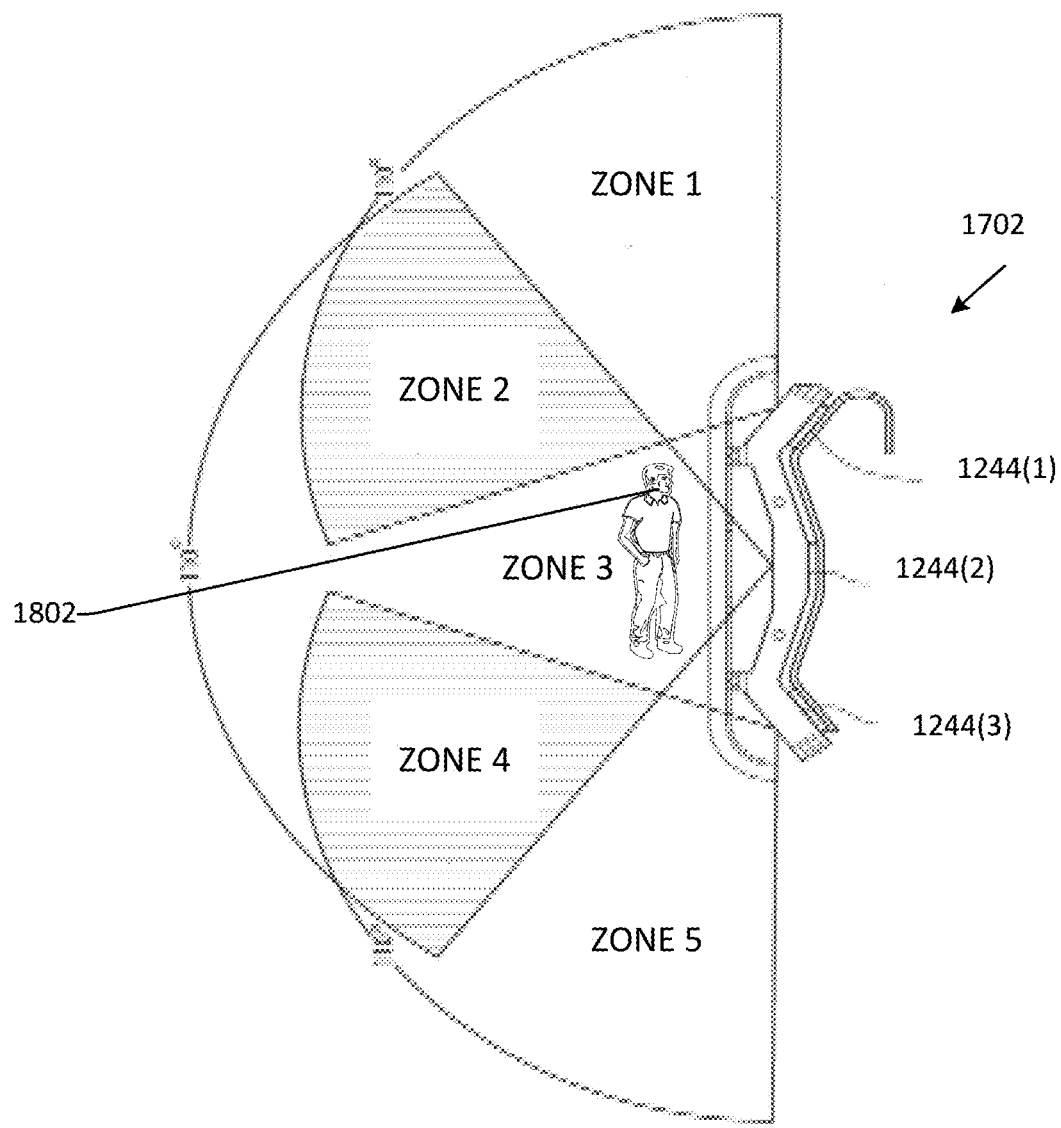

FIG. 18B illustrates the object 1802 at a second time, which is later than the first time of FIG. 18A. (Note that FIG. 18B is not to scale.) This movement pattern would yield first sensor data 1242(1) from the first sensor 1244(1) that indicates a voltage change at the first time and second sensor data 1242(2) from the second sensor 1244(2) that indicates a voltage change at the second time. By analyzing the first sensor data 1242(1) and the second sensor data 1242(2), the processor 1216 of the A/V recording and communication device 1102 may determine that the object 1802 is moving from the right of the A/V recording and communication device 1102 to the left of the A/V recording and communication device 1102.

Figure 18C:
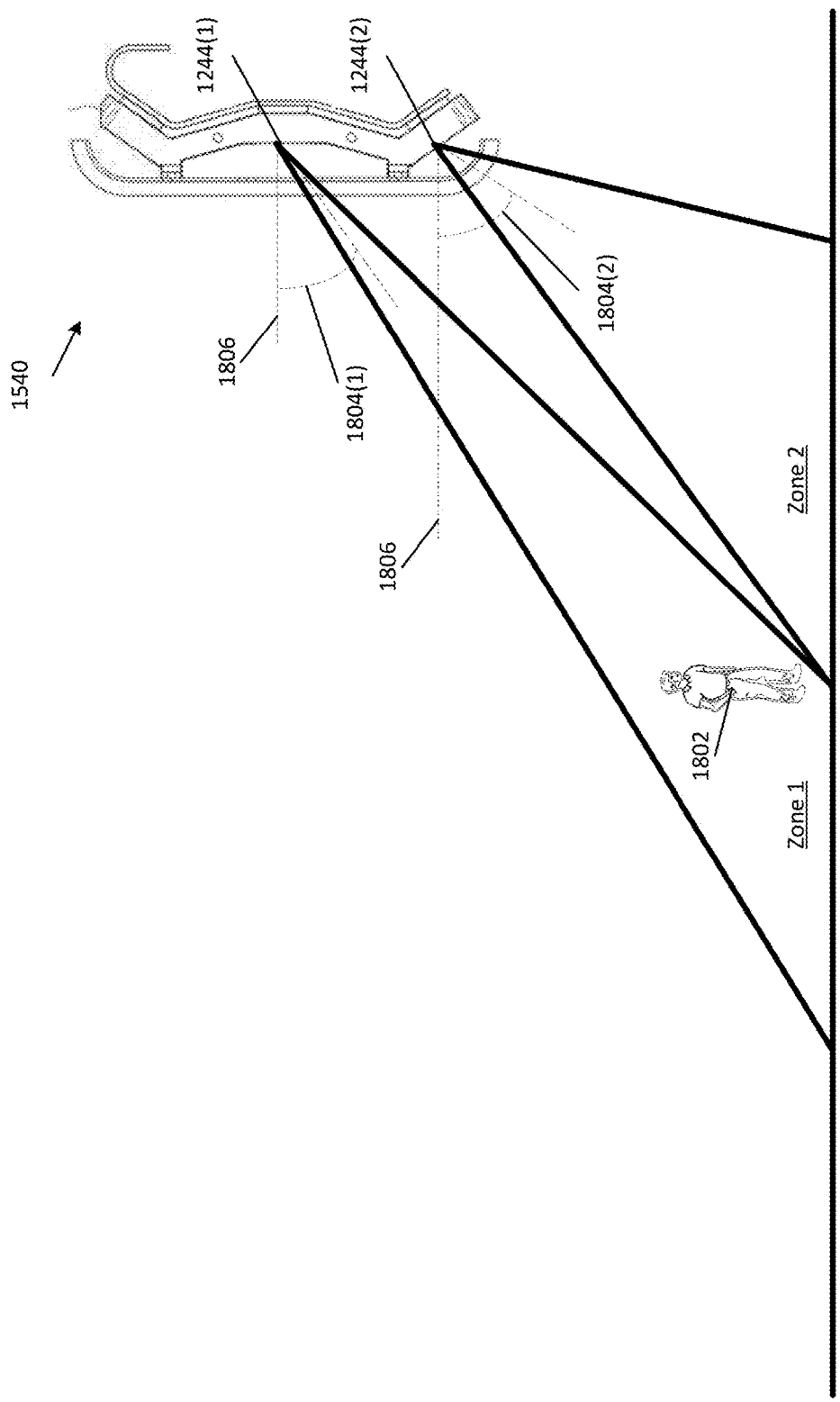
FIGS. 18C-18D are left side views of the sensor assembly of FIG. 17B, depicting fields of view of two sensors according to an aspect of the present disclosure and a person approaching the sensor assembly.

FIG. 18C is a side view of the sensor assembly 1540 illustrating the fields of view of the first sensor 1244(1) and the second sensor 1244(2) positioned in substantial vertical alignment. As shown, the first sensor 1244(1) is associated with a first field of view (represented by the Zone 1) that extends outward from the first sensor 1244(1). Additionally, the sensor 1244(2) is associated with a second field of view (represented by Zone 2) that extends outward from second sensor 1244(2). In the example of FIG. 18C, the first field of view of the first sensor 1224(1) extends further from the A/V recording and communication device 1102 (e.g., further from the sensor assembly 1540) than the second field of view of the second sensor 1244(2). For example, as illustrated, the first sensor 1244(1) is positioned such that the first sensor 1244(1) includes a first angle 1804(1) with respect to a ground plane 1806. Additionally, the second sensor 1244(2) is positioned such that the second sensor 1244(2) includes a second angle 1804(2) with respect to the ground plane 1806. In some examples, and as illustrated in FIG. 18C, the second angle 1804(2) is greater than the first angle 1804(1). By orienting the first sensor 1244(1) and the second sensor 1244(2) in this way, the first sensor 1244(1) has a field of view that extends beyond the field of view of the second sensor 1244(2) with respect to the front surface of the A/V recording and communication device 1102. As a result, determining a near-to-far and far-to-near direction of motion of the object 1802 (e.g., the person in the illustration of FIG. 18C) is more accurate because not only is the first sensor 1244(1) mounted higher off of the ground plane, but by using the first angle 1804(1) and the second angle 1804(2) the first sensor 1244(1) has a field of view that begins further from the A/V recording and communication device 1102 and ends further from the A/V recording and communication device 1102 as compared to the field of view of the second sensor 1244(2). Although the illustration of FIG. 18C includes the first angle 1804(1) being less than the second angle 1804(2), this orientation is not intended to be limiting. In some examples, the first angle 1804(1) may be greater than the second angle 1804(2). Still, in some examples, the first angle 1804(1) may be equal to the second angle 1804(2).

Figure 18D:
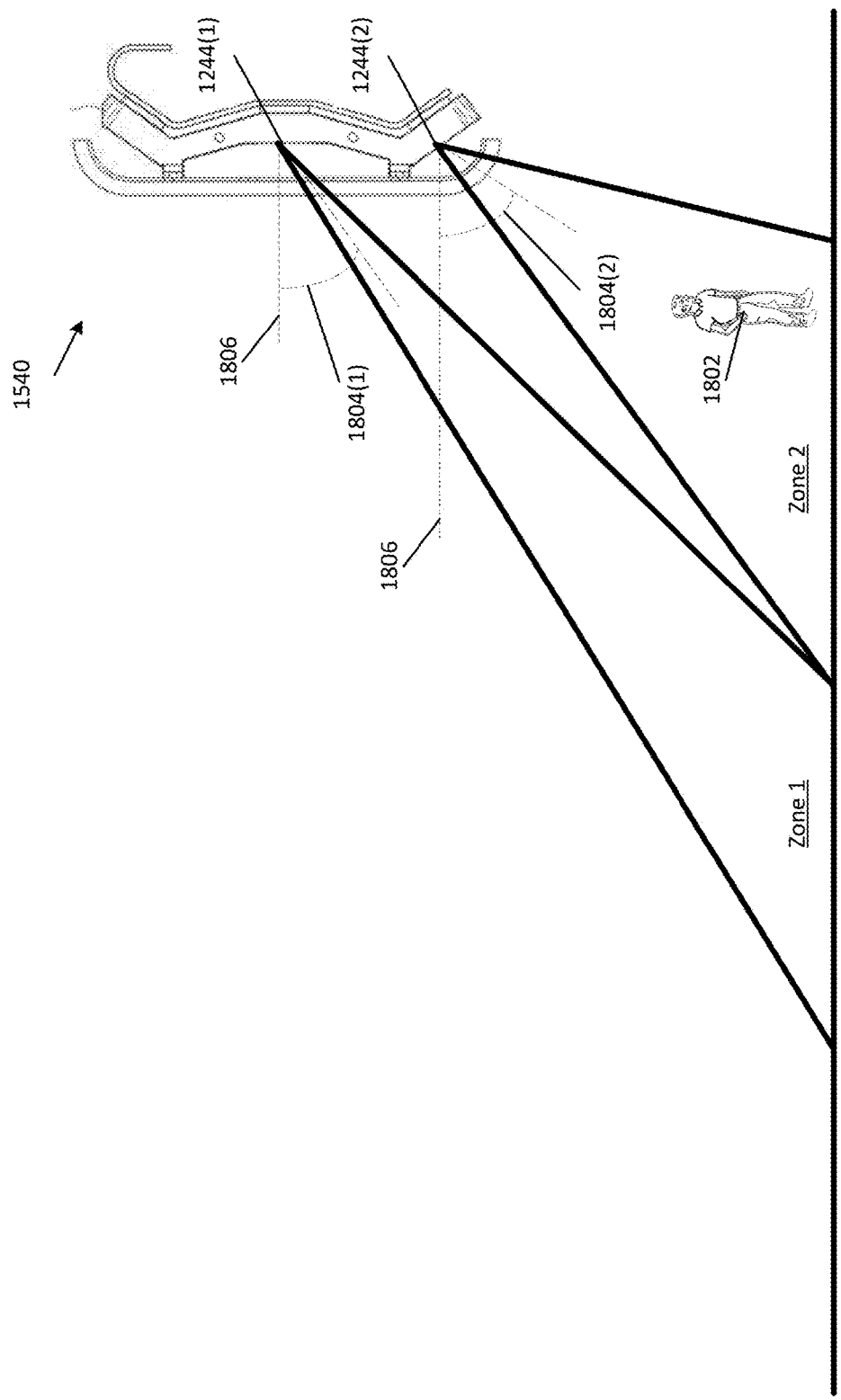

At a first time, and as illustrated in FIG. 18C, the object 1802 may be detected by the first sensor 1244(1) (e.g., the object 1802 may be detected in the Zone 1). Later, at a second time, and as illustrated in FIG. 18D, the object 1802 may be detected by the second sensor 1244(2) (e.g., the object 1802 may be detected in the Zone 2). As such, based on the location and/or the first angle 1804(1) of the first sensor 1244(1), and based on the location and/or the angle 1804(2) of the second sensor 1244(2), the processor 1216 of the A/V recording and communication device 1102 may determine that the direction of movement of the object 1802 is towards the A/V recording and communication device 1102.

Although the examples of FIGS. 18C-18D illustrate the first sensor 1244(1) being substantially vertically aligned with the second sensor 1244(2), in other examples the first sensor 1244(1) may not be substantially vertically aligned with the second sensor 1244(2). In such instances, the field of view of the first sensor 1244(1) may still extend farther from the A/V recording and communication device 1102 than the field of view of the second sensor 1244(2). As such, Zone 1 is still farther from the A/V recording and communication device 1102 than Zone 2.

Each of the processes described herein, including the processes 1900, 2000, 2100, and 2200 are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 19:
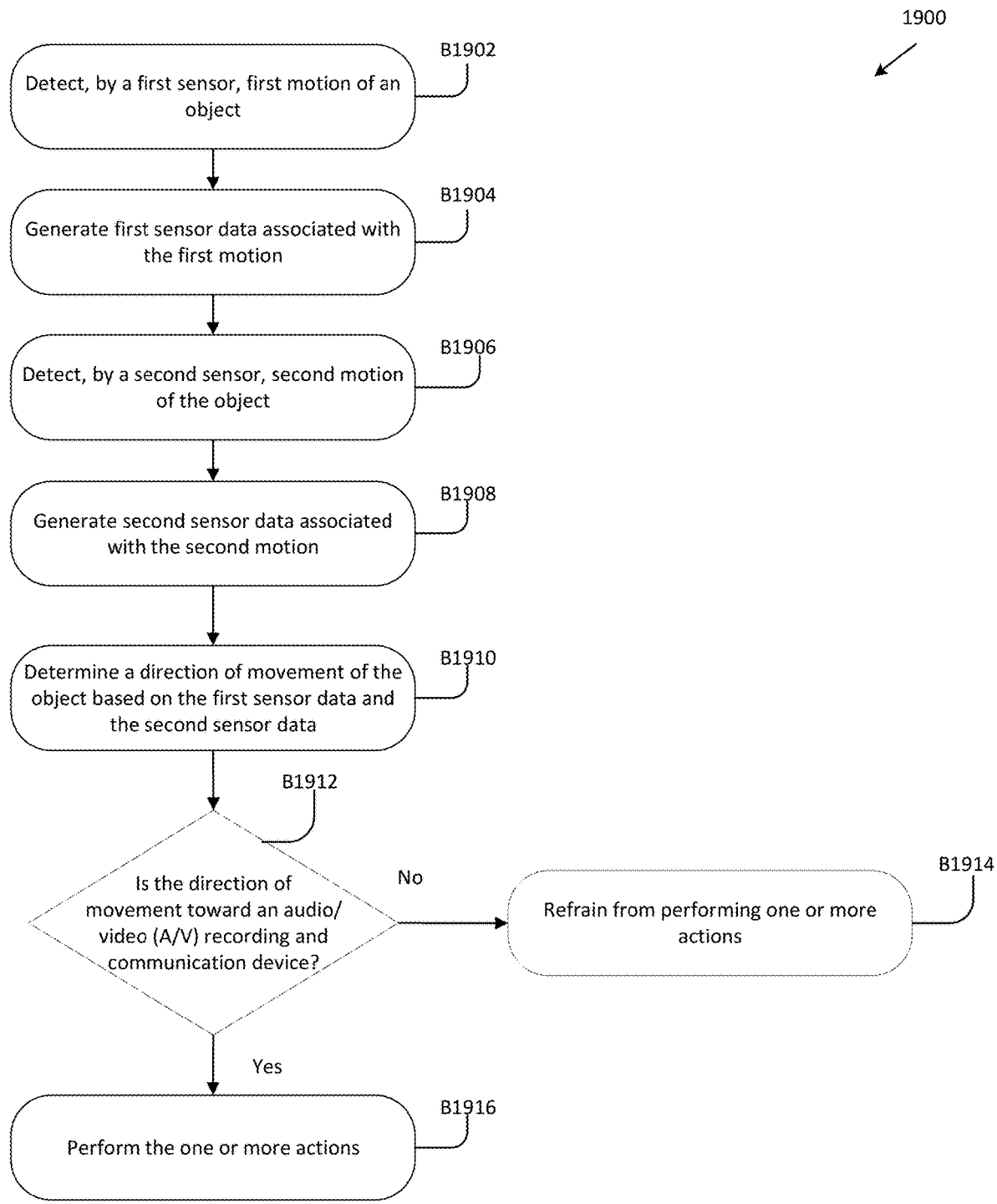
FIGS. 19-22 are flowcharts illustrating example processes for using motion sensors for direction detection according to various aspects of the present disclosure.

FIG. 19 is a flowchart illustrating an example process 1900 for using motion sensors for direction detection, according to various aspects of the present disclosure. The process 1900, at block B1902, detects, by a first sensor, first motion of an object. For example, the A/V recording and communication device 1102 may detect, using the first sensor 1244(1), the first motion of the object. In some examples, the first sensor 1244(1) may include a first PIR sensor and detect the presence of a heat source within the field of view of the first sensor 1244(1). In other examples, the first sensor 1244(1) may include any electronic device that is capable of detection motion of an object. In some instances, the processor 1214 of the A/V recording and communication device 1102 may receive, from the first senor 1244(1), a first signal in response to the first sensor 1244(1) detecting the object.

The process 1900, at block B1904, generates first sensor data associated with the first motion. For example, the A/V recording and communication device 1102 may generate, using the first sensor 1244(1), the first sensor data 1242(1) associated with the first motion of the object. In some examples, the first sensor data 1242(1) includes at least data showing voltage over a period of time encompassing the time that the first sensor 1244(1) detected the first motion. For example, a first output signal from the first sensor 1244(1) may indicate an increase in voltage that indicates that an object passes in the field of view of the first sensor 1244(1). The output signal may be included in the first sensor data 1242(1).

The process 1900, at block B1906, detects, by a second sensor, second motion of the object. For example, the A/V recording and communication device 1102 may detect, using the second sensor 1244(2), the second motion of the object. In some examples, the second sensor 1244(1) may include a second PIR sensor, which detects the presence of a heat source within the field of view of the second sensor 1244(2). In other examples, the second sensor 1244(2) may include any electronic device that is capable of detection motion of an object. In some instances, the processor 1214 of the A/V recording and communication device 1102 may receive, from the second senor 1244(2), a second signal in response to the second sensor 1244(2) detecting the object.

In some examples, the first sensor 1244(1) may be in substantial vertical alignment with the second sensor 1244(2). In some examples, the first sensor 1244(1) and the second sensor 1244(2) are vertically aligned, where the field of view of the first sensor 1244(1) extends farther from the A/V recording and communication device than the field of view of the second sensor 1244(2). In some examples, the first sensor 1244(1) and the second sensor 1244(2) may not be in vertical alignment, but the first sensor 1244(1) may be positioned higher than the second sensor 1244(2) and/or at a particular angle that extends the field of view of the first sensor 1244(1) beyond the field of view of the second sensor 1244(2) with respect to a front surface of the A/V recording and communication device 1102 (e.g., with respect to a vertical plane (e.g., perpendicular to the ground plane) of a surface that the A/V recording and communication is mounted to).

The process 1900, at block B1908, generates second sensor data associated with the second motion detected. For example, the A/V recording and communication device 1102 may generate, using the second sensor 1244(2), the second sensor data 1242(2) associated with the second motion of the object. In some examples, the second sensor data 1242(1) includes at least data showing voltage over a period of time encompassing the time that the second sensor 1244(2) detected the second motion. For example, a second output signal from the second sensor 1244(2) may indicate an increase in voltage that indicates that an object passes in the field of view of the second sensor 1244(2). The output signal may be included in the second sensor data 1242(2).

The process 1900, at block B1910, determines a direction of movement of the object based on first sensor data and second sensor data. For example, the processor 1216 of the A/V recording and communication device 1102 may determine a direction of movement of the object based on the first sensor data 1242(1) and the second sensor data 1242(2). In some examples, the processor 1216 of the A/V recording and communication device 1102 may determine the direction of motion by comparing the time at which the object was detected by the first sensor 1244(1) and the time at which the object was detected by the second sensor 1244(2).

For a first example, the processor 1216 of the A/V recording and communication device 1102 may determine that the first sensor 1244(1) detected the first motion of the object at a first time and that the second sensor 1244(2) detected the second motion of the object at second time, where the second time is later in time than the first time. In this first example, the processor 1216 of the A/V recording and communication device 1102 may determine that the second sensor 1244(2) has a field of view directed more downward than the first sensor 1244(1) (that is, a field of view that encompasses an area closer to the A/V recording and communication device 1102 than the first sensor 1244 (1), which detects motion further away from the A/V recording and communication device 1102). Based on the processor 1216 of the A/V recording and communication device 1102 determining that the first sensor 1244(1) detecting the object at the first time, at a further point from the A/V recording and communication device 1102, and the second sensor 1244(2) detected the object at the second time, at the nearer point from the A/V recording and communication device 1102, the processor 1216 of the A/V recording and communication device 1102 may determine that the object was moving toward the A/V recording and communication device 1102.

For a second example, the processor 1216 of the A/V recording and communication device 1102 may determine that the first sensor 1244(1) detected the first motion of the object at a first time and that the second sensor 1244(2) detected the second motion of the object at second time, where the second time is later in time than the first time. In this second example, the processor 1216 of the A/V recording and communication device 1102 may determine that the first sensor 1244(1) has a field of view directed more downward than the second sensor 1244(2) (that is, a field of view that encompasses an area closer to the A/V recording and communication device 1102 than the second sensor 1244(2), which detects motion further away from the A/V recording and communication device 1102). Based on the processor 1216 of the A/V recording and communication device 1102 determining that the first sensor 1244(1) detecting the object at the first time, at a nearer point from the A/V recording and communication device 1102, and the second sensor 1244(2) detected the object at the second time, at the farther point from the A/V recording and communication device 1102, the processor 1216 of the A/V recording and communication device 1102 may determine that the object was moving away the A/V recording and communication device 1102.

The process 1900, at block B1912, determines whether the direction of movement is toward an audio/video (A/V) recording and communication device. For example, the processor 1216 of the A/V recording and communication device 1102 may determine whether the direction of movement is toward the A/V recording and communication device 1102 and/or away from the A/V recording and communication device 1102, using similar processes as the examples above.

If it is determined that the direction of movement is away from the A/V recording and communication device, then the process 1900, at block B1914, refrains from performing one or more actions. For example, based on determining that the direction of movement is away from the A/V recording and communication device 1102, the processor 1216 of the A/V recording and communication device 1102 may refrain from performing one or more actions, which are described below.

However, if it is determined that the direction of movement is toward the A/V recording and communication device, then the process 1900, at block B1916, performs the one or more actions. For example, based on determining that the direction of movement is toward the A/V recording and communication device 1102, the processor 1216 of the A/V recording and communication device 1102 may perform one or more actions. For a first example, the processor 1216 of the A/V recording and communication device 1102 may record, using the camera 1204, image data 1224 depicting a field of view of the camera 1204. For a second example, the processor 1216 of the A/V recording and communication device 1102 may transmit, using the communication module 1212, a user alert 1234 to the hub device 1112, the backend server 1122, and/or the client device 1108, 1110, where the user alert 1234 indicates at least that the A/V recording and communication device 1102 detected the motion. For a third example, the processor 1216 of the A/V recording and communication device 1102 may transmit, using the communication module 1212, a control signal 1240 to the hub device 1112 and/or the backend server 1112, where the control signal 1240 is configured to cause the security system to activate an alarm.

The process 1900 of FIG. 19 may be implemented in a variety of embodiments, including those discussed above. However, the below-detailed embodiments are not intended to be limiting, and are provided merely as example embodiments of the present disclosure. Other embodiments similar to those outlined herein may also fall within the scope of the present disclosure.

For example, a person may be approaching the front door of a house that has an A/V recording and communication device 1102 installed with a sensor assembly 1584 holding two PIR sensors in substantial vertical alignment. As the person steps onto the walkway from the street to the house, the person enters the field of view of the first sensor 1244(1). As such, the A/V recording and communication device 1102 may detect, using the first sensor 1244(1), the first motion of the person (e.g., block B1902). In response, the A/V recording and communication device 1102 may generate, using the first sensor 1244(1), the first sensor data 1242(1) indicating that the first sensor 1244(1) detected the first motion of the person (e.g., block B1904).

Next, the person may continue to walk towards the A/V recording and communication device 1102. As such, the A/V recording and communication device 1102 may detect, using the second sensor 1244(2), the second motion of the person (e.g., block B1906). In response, the A/V recording and communication device 1102 may generate, using the second sensor 1244(2), the second sensor data 1242(2) indicating that the second sensor 1244(2) detected the second motion of the person (e.g., block B1908). The processor 1216 of the A/V recording and communication device 1102 may then analyze the first sensor data 1242(1) and the second sensor data 1242(2) to determine that the first sensor 1244(1) detected the person before the second sensor 1244(2). As such, the processor 1216 of the A/V recording and communication device 1102 may determine that the direction of movement of the person is towards the A/V recording and communication device 1102 (e.g., block B1912). In response, the processor 1216 of the A/V recording and communication device 1102 may perform one or more actions, such as record image data 1224 using the camera 1204 (e.g., block B1916).

Figure 20:
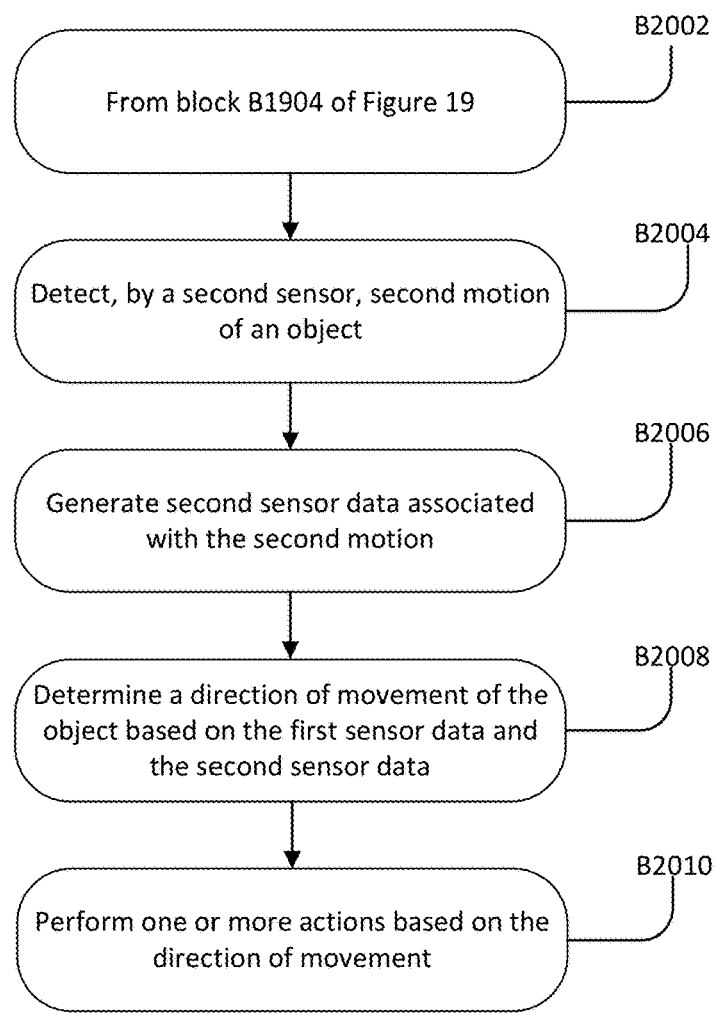

FIG. 20 is a flowchart illustrating an example process 2000 for using motion sensors for direction detection, according to various aspects of the present disclosure. The process 2000, at block B2002, proceeds from block B1904 of the example process 1900 of FIG. 19.

The process 2000, at block B2004, detects, by a second sensor, second motion of an object. For example, the A/V recording and communication device 1102 may detect, using the second sensor 1244(2), the second motion of the object. In some examples, the second sensor 1244(1) may include a second PIR sensor, and detect the presence of a heat source within the field of view of the second sensor 1244(2). In other examples, the second sensor 1244(2) may include any electronic device that is capable of detection motion of an object. In some examples, the first sensor 1244(1) may be in substantial horizontal alignment with the second sensor 1244(2) and/or may be spaced laterally (e.g., side by side, offset laterally, etc.). In some examples, the first sensor 1244(1) may not be in substantial horizontal alignment with the second sensor 1244(2).

The process 2000, at block B2006, generates second sensor data associated with the second motion. For example, the A/V recording and communication device 1102 may generate, using the second sensor 1244(2), the second sensor data 1242(2) associated with the second motion of the object. In some examples, the second sensor data 1242(1) includes at least data showing voltage over a period of time encompassing the time that the second sensor 1244(2) detected the second motion. For example, a second output signal from the second sensor 1244(2) may indicate an increase in voltage that indicates that an object passes in the field of view of the second sensor 1244(2). The output signal may be included in the second sensor data 1242(2).

The process 2000, at block B2008, determines a direction of movement of the object based on the first sensor data and the second sensor data. For example, the processor 1216 of the A/V recording and communication device 1102 may determine a direction of movement of the object based on the first sensor data 1242(1) and the second sensor data 1242(2). In some examples, the processor 1216 of the A/V recording and communication device 1102 may determine the direction of motion by comparing the time at which the object was detected by the first sensor 1244(1) and the time at which the object was detected by the second sensor 1244(2).

For a first example, the processor 1216 of the A/V recording and communication device 1102 may determine that the first sensor 1244(1) detected the first motion of the object at a first time and that the second sensor 1244(2) detected the second motion of the object at second time, where the second time is later in time than the first time. In this first example, the processor 1216 of the A/V recording and communication device 1102 may determine that the second sensor 1244(2) has a field of view directed more to the left than the first sensor 1244(1) relative to the A/V recording and communication device 1102 (facing out from behind the sensor assembly). Based on the processor 1216 of the A/V recording and communication device 1102 determining that the first sensor 1244(1) (pointing more to the right than second sensor 1244(2)) detected the object at the first time, and the second sensor 1244(2) (pointing relatively to the left compared to first sensor 1244(1)) detected the object at the second time, the processor 1216 of the A/V recording and communication device 1102 may determine that the object was moving from right to left in front of the A/V recording and communication device 1102.

For a second example, the processor 1216 of the A/V recording and communication device 1102 may determine that the first sensor 1244(1) detected the first motion of the object at a first time and that the second sensor 1244(2) detected the second motion of the object at second time, where the second time is later in time than the first time. In this second example, the processor 1216 of the A/V recording and communication device 1102 may determine that the first sensor 1244(1) has a field of view directed more to the left than the second sensor 1244(2). Based on the processor 1216 of the A/V recording and communication device 1102 determining that the first sensor 1244(1) detecting the object at the first time, and the second sensor 1244(2) detected the object at the second time, the processor 1216 of the A/V recording and communication device 1102 may determine that the object was moving from left to right in front of the A/V recording and communication device 1102.

The process 2000, at block B2010, performs the one or more actions based on the direction of movement. For example, based on determining that the direction of movement is from a first side of the A/V recording and communication device 1102 to a second side of the A/V recording and communication device 1102, the processor 1216 of the A/V recording and communication device 1102 may perform one or more actions. For example, the A/V recording and communication device 1102 may be positioned such that an entrance of a property is located to the left of the A/V recording and communication device 1102. As such, the processor 1216 of the A/V recording and communication device 1102 may determine that an object is approaching the entrance when the direction of movement is from the right side of the A/V recording and communication device 1102 to the left side of the A/V recording and communication device 1102 (e.g., the object is moving towards the entrance of the property). Based on determining that the direction of movement of the object is towards the entrance of the property, the processor 1216 of the A/V recording and communication device 1102 may perform the one or more actions. In the alternative, when the direction of movement is determined to be from the left to the right (e.g., exiting the property), the processor 1216 of the A/V recording and communication device 1102 may determine to refrain from one or more actions.

For a first example, the processor 1216 of the A/V recording and communication device 1102 may record, using the camera 1204, image data 1224 depicting a field of view of the camera 1204. For a second example, the processor 1216 of the A/V recording and communication device 1102 may transmit, using the communication module 1212, a user alert 1234 to the hub device 1112, the backend server 1122, and/or the client device 1108, 1110, where the user alert 1234 indicates at least that the A/V recording and communication device 1102 detected the motion. For a third example, the processor 1216 of the A/V recording and communication device 1102 may transmit, using the communication module 1212, a control signal 1240 to the hub device 1112 and/or the backend server 1112, where the control signal 1240 is configured to cause the security system to activate an alarm.

Figure 21:
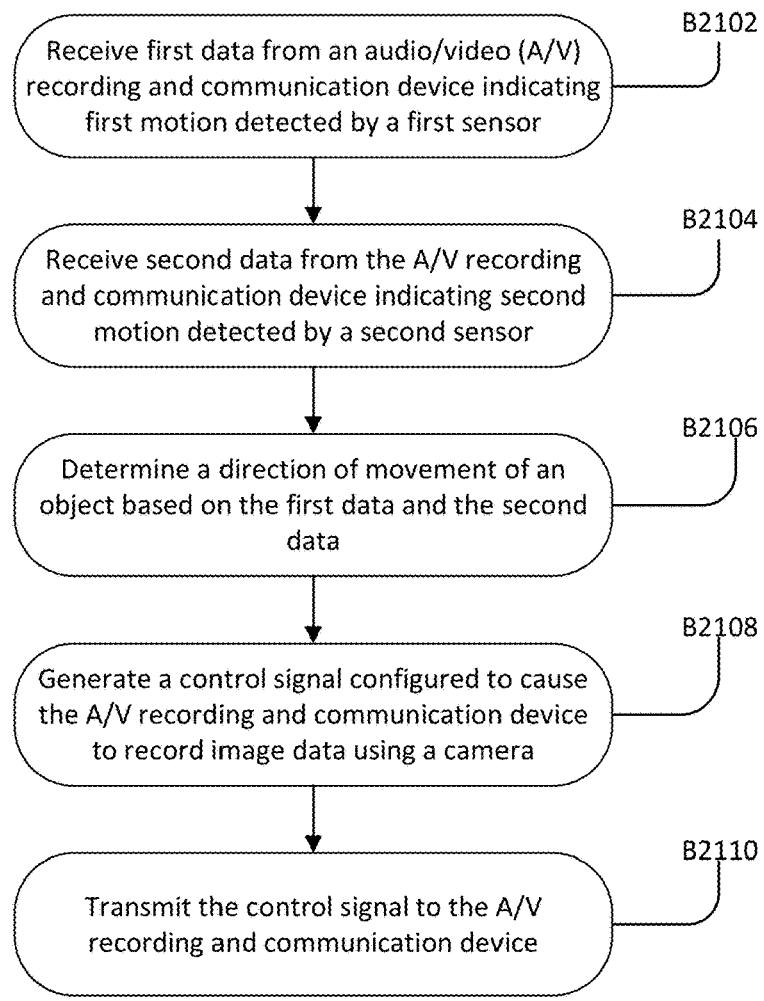

FIG. 21 is a flowchart illustrating an example process 2100 for using motion sensors for direction detection, according to various aspects of the present disclosure. The process 2100, at block B2102, receives first data from an audio/video (A/V) recording and communication device indicating first motion was detected by a first sensor. For example, the processor 1406 of the backend server 1122 may receive, using the communication module 1402 (and/or the processor 1308 of the hub device 1112 may receive, using the communication module 1304), the first sensor data 1242(1) from the A/V recording and communication device 1102. The first sensor data 1242(1) may indicate that the first sensor 1244(1) of the A/V recording and communication device 1102 detected the first motion of the object, such as when the object entered a first FOV of the first sensor 1244(1).

The process 2100, at block B2104, receives second data from the A/V recording and communication device indicating second motion was detected by a second sensor. For example, the processor 1406 of the backend server 1122 may receive, using the communication module 1402 (and/or the processor 1308 of the hub device 1112 may receive, using the communication module 1304), the second sensor data 1242(2) from the A/V recording and communication device 1102. The second sensor data 1242(2) may indicate that the second sensor 1244(2) of the A/V recording and communication device 1102 detected the second motion of the object, such as when the object entered a second FOV of the second sensor 1244(2). In some examples, the first sensor 1244(1) is substantially vertically aligned with and/or above, with respect to the ground plane, the second sensor 1244(2). In some examples, the first sensor 1244(1) is substantially horizontally aligned with and/or laterally spaced from the second sensor 1244(2).

The process 2100, at block B2106, determines a direction of movement of an object based on the first data and the second data. For example, the processor 1406 of the backend server 1122 (and/or the processor 1308 of the hub device 1112) may determine a direction of movement of the object based on the first sensor data 1242(1) and the second sensor data 1242(2). For a first example, and if the first sensor 1244(1) is substantially vertically aligned with the second sensor 1244(2), the processor 1406 of the backend server 1122 (and/or the processor 1308 of the hub device 1112) may determine that the first sensor 1244(1) detected the first motion of the object at a first time and that the second sensor 1244(2) detected the second motion of the object at second time, where the second time is later in time than the first time. In this first example, the processor 1406 of the backend server 1122 (and/or the processor 1308 of the hub device 1112) may determine that the second sensor 1244(2) has a field of view directed more downward than the first sensor 1244(1) (that is, a field of view that encompasses an area closer to the A/V recording and communication device 1102 than the first sensor 1244(1), which detects motion further away from the A/V recording and communication device 1102). Based on the processor 1406 of the backend server 1122 (and/or the processor 1308 of the hub device 1112) determining that the first sensor 1244(1) detected the object at the first time, at a further point from the A/V recording and communication device 1102, and the second sensor 1244(2) detected the object at the second time, at the nearer point from the A/V recording and communication device 1102, the processor 1406 of the backend server 1122 (and/or the processor 1308 of the hub device 1112) may determine that the object was moving toward the A/V recording and communication device 1102.

For a second example, and if the first sensor 1244(1) is substantially horizontally aligned with the second sensor 1244(2), the processor 1406 of the backend server 1122 (and/or the processor 1308 of the hub device 1112) may determine that the first sensor 1244(1) detected the first motion of the object at a first time and that the second sensor 1244(2) detected the second motion of the object at second time, where the second time is later in time than the first time. In this second example, the processor 1406 of the backend server 1122 (and/or the processor 1308 of the hub device 1112) may determine that the second sensor 1244(2) has a field of view directed more to the left of the A/V recording and communication device 1102 than the field of view of the first sensor 1244(1). Based on the processor 1406 of the backend server 1122 (and/or the processor 1308 of the hub device 1112) determining that the first sensor 1244(1) detecting the object at the first time and the second sensor 1244(2) detected the object at the second time, the processor 1406 of the backend server 1122 (and/or the processor 1308 of the hub device 1112) may determine that the object was moving from the right of the A/V recording and communication device 1102 to the left of the A/V recording and communication device 1102.

The process 2100, at block B2108, generates a control signal configured to cause the A/V recording and communication device to record image data using a camera. For example, the processor 1406 of the backend server 1122 (and/or the processor 1308 of the hub device 1112) may generate a control signal 1240 that is configured to cause the A/V recording and communication device 1102 to record image data 1224 using the camera 1204. In some examples, the processor 1406 of the backend server 1122 (and/or the processor 1308 of the hub device 1112) may generate the control signal 1240 based on determining that the direction of movement of the object is towards the A/V recording and communication device 1102. In some examples, the processor 1406 of the backend server 1122 (and/or the processor 1308 of the hub device 1112) may generate the control signal 1240 based on determining that the direction of movement of the object is away from the A/V recording and communication device 1102. In some examples, the processor 1406 of the backend server 1122 (and/or the processor 1308 of the hub device 1112) may generate the control signal 1240 based on determining that the direction of movement is from the left of the A/V recording and communication device to the right of the A/V recording and communication device 1102. Still, in some examples, the processor 1406 of the backend server 1122 (and/or the processor 1308 of the hub device 1112) may generate the control signal 1240 based on determining that the direction of movement is from the right of the A/V recording and communication device to the left of the A/V recording and communication device 1102.

The process 2100, at block B2110, transmits the control signal to the A/V recording and communication device. For example, the processor 1406 of the backend server 1122 may transmit, using the communication module 1402 (and/or the processor 1308 of the hub device 1112 may transmit, using the communication module 1304), the control signal 1240 to the A/V recording and communication device 1102.

In some examples, the processor 1406 of the backend server 1122 (and/or the processor 1308 of the hub device 1112) may determine, based on the direction of movement, not to perform one or more actions, such as generating and transmitting the control signals 1240. For example, based on user settings, when an object is leaving the property (e.g., based on the motion data 1230, the object is moving from an exit of the property away from the exit), the determination may be to not generate a control signal 1240 because the user may not want to see image data 1224 of an object leaving the property.

Figure 22:
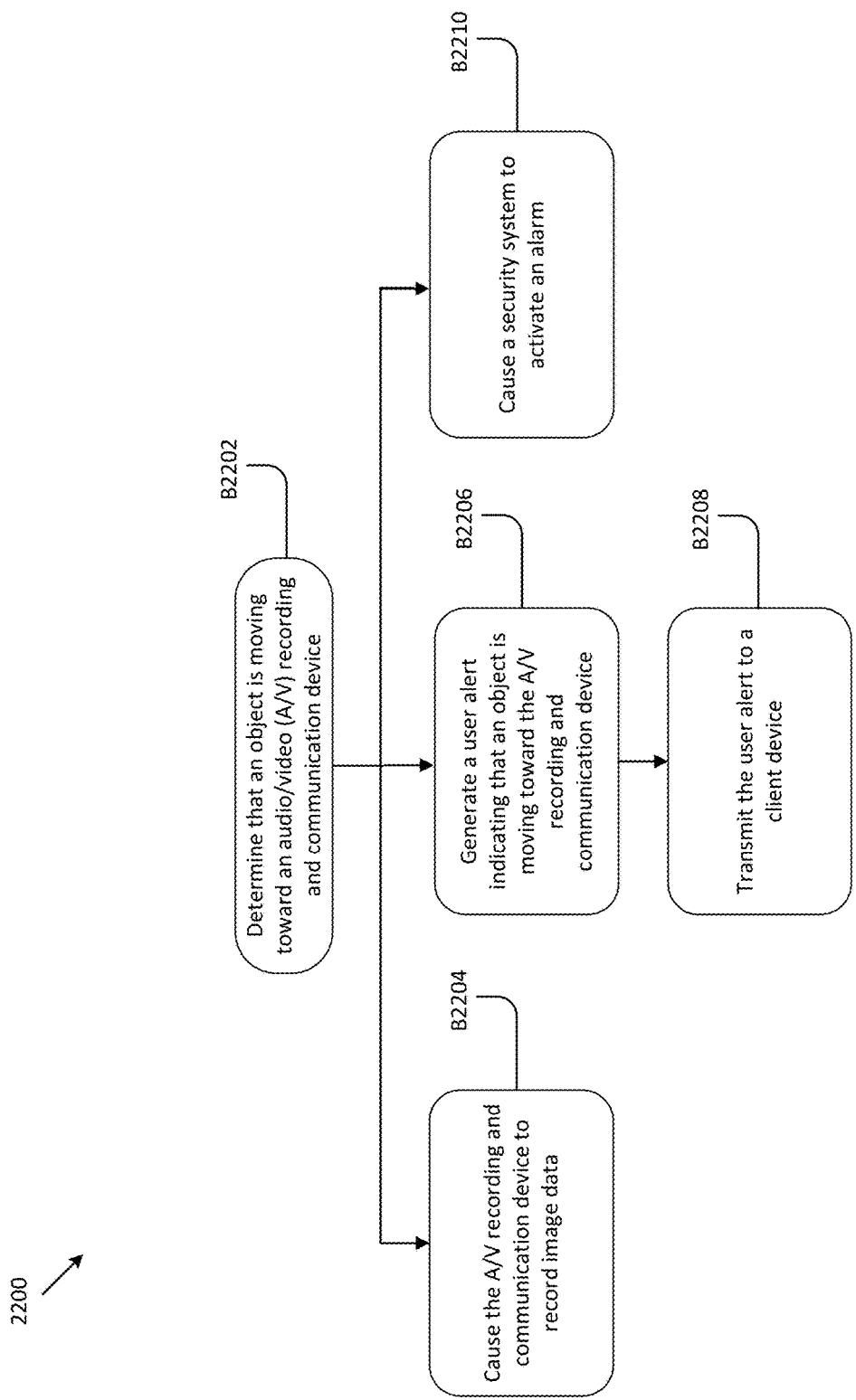

FIG. 22 is a flowchart illustrating an example process 2200 for using motion sensors for direction detection, according to various aspects of the present disclosure. The process 2200, at block B2202, determines that an object is moving toward an audio/video (A/V) recording and communication device. For example, the processor 1216 of the A/V recording and communication device 1102 (and/or the processor 1406 of the backend server 1122) (and/or the processor 1308 of the hub device 1112) may determine, based on the first sensor data 1242(1) and the second sensor data 1242(2), that an object is moving toward the A/V recording and communication device 1102.

The process 2200, at block B2204, causes the A/V recording and communication device to record image data. For a first example, based on the processor 1216 of the A/V recording and communication device 1102 determining that the object is moving towards A/V recording and communication device 1102, the processor 1216 of the A/V recording and communication device 1102 may cause the A/V recording and communication device 1102 to record the image data 1224 using the camera 1204. For a second example, based on the processor 1406 of the backend server 1122 (and/or the processor 1308 of the hub device 1112) determining that the object is moving towards the A/V recording and communication device 1102, the processor 1406 of the backend server 1122 (and/or the processor 1308 of the hub device 1112) may generate a control signal 1240 configured to cause the A/V recording and communication device 1102 to record the image data 1224. The processor 1406 of the backend server 1122 may then transmit, using the communication module 1402 (and/or the processor 1308 of the hub device 1112 may transmit, using the communication module 1304), the control signal 1240 to the A/V recording and communication device 1102.

Additionally to, or alternatively from, block B2204, process 2200, at block B2208, generates a user alert indicating that an object is moving toward the A/V recording and communication device. For example, the processor 1216 of the A/V recording and communication device 1102 (and/or the processor 1406 of the backend server 1122) (and/or the processor 1308 of the hub device 1112) may generate a user alert 1234 indicating that an object is moving toward the A/V recording and communication device 1102. By including the directional information in the user alert 1234, the user alert 1234 may be more informative to the user, and the user may be more likely to interact and/or pay attention to the user alert 1234. For example, a user may ignore user alert 1234 with no directional component, because many people may leave the user's property daily and the user has alert fatigue from receiving too many user alerts 1234. However, in such an example, by including the directional component, the user may interact with and/or pay more attention to user alerts 1234 that include information about objects approaching the user's door/entrance/device. In addition, in some examples, user alerts 1234 may only be generated and transmitted when a certain directional component is satisfied (e.g., user alerts 1234 may only be received by the user when an object is approaching the property).

The process 2200, at block B2208, transmits the user alert to a client device. For example, the processor 1216 of the A/V recording and communication device 1102 may transmit, using the communication module 1212 (and/or the processor 1406 of the backend server 1122 may transmit, using the communication module 1402) (and/or the processor 1308 of the hub device 1112 may transmit, using the communication module 1304), the user alert 1234 to the client device 1108, 1110.

Additionally to, or alternatively from, block B2204 and/or block B2206, the process 2200, at block B2210, causes a security system to activate an alarm. For example, the processor 1216 of the A/V recording and communication device 1102 (and/or the processor 1406 of the backend server 1122) (and/or the processor 1308 of the hub device 1112) may cause the security system to activate the alarm. For a first example, to cause the security system to activate the alarm, the processor 1216 of the A/V recording and communication device 1102 may transmit, using the communication module 1212 (and/or the processor 1406 of the backend server 1122 may transmit, using the communication module 1402) a control signal 1240 to the hub device 1112 that causes the hub device 1112 to activate the alarm. For a second example, to cause the security system to activate the alarm, the processor 1308 of the hub device 1112 may activate the alarm.

The processes described herein provide an A/V recording and communication device 1102 that is capable to detecting motion of an object, and determining a direction of the motion, based on at least the first sensor data 1242(1) generated by the first sensor 1244(1) and the second sensor data 1242(2) generated by the second sensor 1244(2). The A/V recording and communication device 1102 may then utilize the direction of motion in order to determine whether to perform one or more actions, such as recording the image data 1224 and/or transmitting a user alert 1234. As such, the number of user alerts 1234 transmitted by the A/V recording and communication device (and/or the hub device 1112 and/or the backend server 1122) may be reduced and more relevant to a user of the A/V recording and communication device 1102. Additionally, the amount of data (e.g., image data 1224) stored by the A/V recording and communication device 1102, the hub device 1112, and/or the backend server 1122 may be reduced as image data 1224 may be captured only when certain directional criterion are satisfied. Additionally, by not powering up the camera 1204 to record the image data 1224 (and other components, such as the microphone 1206) in response to every motion event, but only in response to motion events where a directional criterion is satisfied, the battery life of a battery powered A/V recording and communication device 1102 may be increased.

Figure 23:
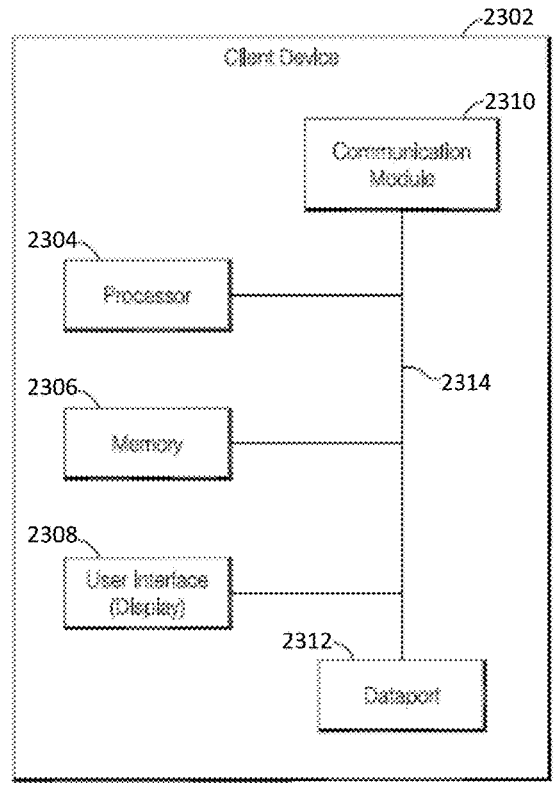
FIG. 23 is a functional block diagram of a client device on which example embodiments may be implemented according to various aspects of the present disclosure.

FIG. 23 is a functional block diagram of a client device 2302 on which the present embodiments may be implemented per various aspects of the present disclosure. The user's client device 114 described with reference to FIG. 1 and/or the client device 1108, 1110 described with reference to FIG. 11 may include some or all of the components and/or functionality of the client device 2302. The client device 2302 may comprise, for example, a smartphone.

With reference to FIG. 23, the client device 2302 includes a processor 2304, a memory 2306, a user interface 2308, a communication module 2310, and a dataport 2312. These components are communicatively coupled together by an interconnect bus 2314. The processor 2304 may include any processor used in smartphones and/or portable computing devices, such as an ARM processor (a processor based on the RISC (reduced instruction set computer) architecture developed by Advanced RISC Machines (ARM).). In some embodiments, the processor 2304 may include one or more other processors, such as one or more conventional microprocessors, and/or one or more supplementary co-processors, such as math co-processors.

The memory 2306 may include both operating memory, such as random-access memory (RAM), as well as data storage, such as read-only memory (ROM), hard drives, flash memory, or any other suitable memory/storage element. The memory 2306 may include removable memory elements, such as a CompactFlash card, a MultiMediaCard (MMC), and/or a Secure Digital (SD) card. In some embodiments, the memory 2306 may comprise a combination of magnetic, optical, and/or semiconductor memory, and may include, for example, RAM, ROM, flash drive, and/or a hard disk or drive. The processor 2304 and the memory 2306 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 2304 may be connected to the memory 2306 via the dataport 2312.

The user interface 2308 may include any user interface or presentation elements suitable for a smartphone and/or a portable computing device, such as a keypad, a display screen, a touchscreen, a microphone, and a speaker. The communication module 2310 is configured to handle communication links between the client device 2302 and other, external devices or receivers, and to route incoming/outgoing data appropriately. For example, inbound data from the dataport 2312 may be routed through the communication module 2310 before being directed to the processor 2304, and outbound data from the processor 2304 may be routed through the communication module 2310 before being directed to the dataport 2312. The communication module 2310 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 2312 may be any type of connector used for physically interfacing with a smartphone and/or a portable computing device, such as a mini-USB port or an IPHONE®/IPOD® 30-pin connector or LIGHTNING® connector. In other embodiments, the dataport 2312 may include multiple communication channels for simultaneous communication with, for example, other processors, servers, and/or client terminals.

The memory 2306 may store instructions for communicating with other systems, such as a computer. The memory 2306 may store, for example, a program (e.g., computer program code) adapted to direct the processor 2304 in accordance with the present embodiments. The instructions also may include program elements, such as an operating system. While execution of sequences of instructions in the program causes the processor 2304 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 24:
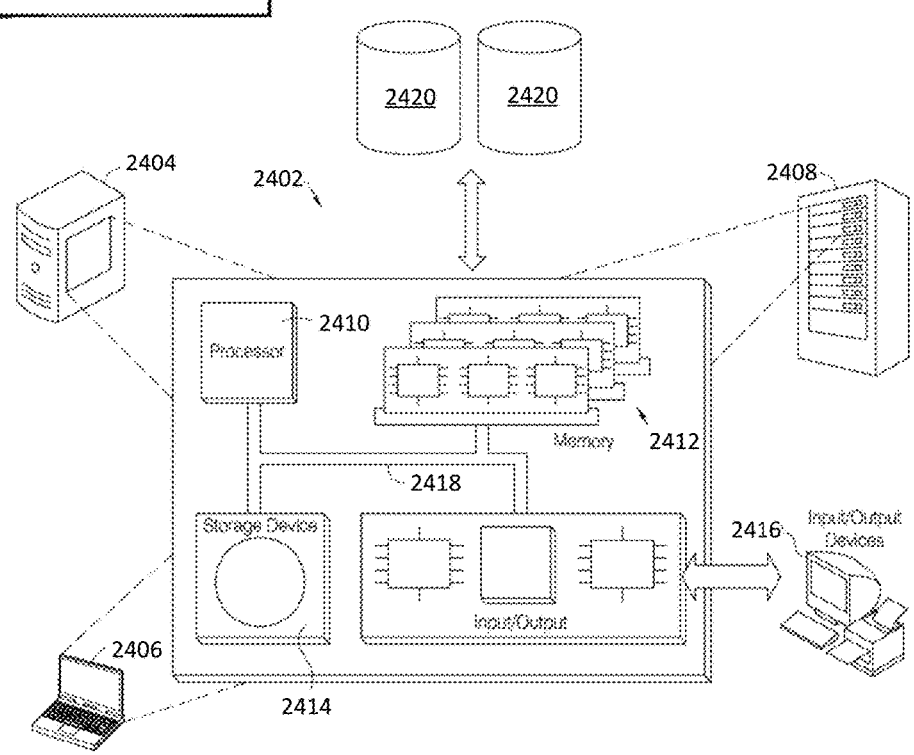
FIG. 24 is a functional block diagram of a general-purpose computing system on which example embodiments may be implemented according to various aspects of present disclosure.

FIG. 24 is a functional block diagram of a general-purpose computing system on which the present embodiments may be implemented according to various aspects of the present disclosure. The computer system 2402 may be embodied in at least one of a personal computer (also referred to as a desktop computer) 2404, a portable computer (also referred to as a laptop or notebook computer) 2406, and/or a server 2408. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 2402 may execute at least some of the operations described above. The computer system 2402 may include at least one processor 2410, memory 2412, at least one storage device 2414, and input/output (I/O) devices 2416. Some or all of the components 2410, 2412, 2414, 2416 may be interconnected via a system bus 2418. The processor 2410 may be single- or multi-threaded and may have one or more cores. The processor 2410 may execute instructions, such as those stored in the memory 2412 and/or in the storage device 2414. Information may be received and output using one or more I/O devices 2416.

The memory 2412 may store information, and may be a computer-readable medium, such as volatile or non-volatile memory. The storage device(s) 2414 may provide storage for the computer system 2402, and may be a computer-readable medium. In various aspects, the storage device(s) 2414 may be a flash memory device, a hard disk device, an optical disk device, a tape device, or any other type of storage device.

The I/O devices 2416 may provide input/output operations for the computer system 2402. The I/O devices 2416 may include a keyboard, a pointing device, and/or a microphone. The I/O devices 2416 may further include a display unit for displaying graphical user interfaces, a speaker, and/or a printer. External data may be stored in one or more accessible external databases 2420.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

Example Clauses

In a first aspect, an audio/video (A/V) recording and communication device comprising: one or more processors; a camera; a first passive infrared (PIR) sensor positioned at a first angle with respect to a ground plane; a second PIR sensor, the second PIR sensor positioned above, in substantially vertical alignment with, the first PIR sensor, the second PIR sensor positioned at a second angle with respect to the ground plane that is less than the first angle; and a non-transitory machine-readable memory storing a program, the program executable by at least one of the one or more processors, the program comprising instructions for: detecting, by the first PIR sensor, first motion of an object in a first field of view (FOV) of the first PIR sensor; based on the detecting of the first motion of the object, generating first data associated with the first motion of the object; detecting, by the second PIR sensor, second motion of the object in a second FOV of the second PIR sensor; based on the detecting of the second motion of the object, generating second data associated with the second motion of the object; analyzing the first data and second data to determine that the object is moving toward the A/V recording and communication device; and based on the determination that the object is moving toward the A/V recording and communication device, recording image data using the camera.

In an embodiment of the first aspect, further comprising a third PIR sensor positioned below, and in substantial vertical alignment with, the first PIR sensor and the second PIR sensor; and the program further comprises instructions for: detecting, by the third PIR sensor, third motion of the object in a third field of view associated with the third PIR sensor; based on the detecting of the third motion of the object, generating third data associated with the third motion of the object; and analyzing the first data, second data, and third data to determine that the object is moving toward the A/V recording and communication device.

In another embodiment of the first aspect, the analyzing the first data and the second data to determine that the object is moving toward the A/V recording and communication device comprises: determining, based on the first data, that the first PIR sensor detected the object at a first time; determining, based on the second data, that the second PIR sensor detected the object at a second time, the second time being later than the first time; and determining that the object is moving toward the A/V recording and communication device based on the first PIR sensor detecting the object at the first time and the second PIR sensor detecting the object at the second time.

In another embodiment of the first aspect, where the program further comprises instructions for, based on detecting at least one of the first motion and the second motion, initiating reliance by the A/V recording and communication device on a battery included as part of the A/V recording and communication device.

In another embodiment of the first aspect, the object comprises a human or an animal.

In another embodiment of the first aspect, the program further comprises instructions for: analyzing the first data and second data to determine a speed of the object, the recording of the image data using the camera is further based on the speed of the object.

In another embodiment of the first aspect, the program further comprises instructions for storing data indicating at least one of the first angle of the first PIR sensor, the second angle of the second PIR sensor, the first FOV of the first PIR sensor, the second FOV of the second PIR sensor, a relative placement of the first PIR sensor, and a relative placement of the second PIR sensor.

In another embodiment of the first aspect, further comprising a communication module, the program further comprises instructions for transmitting, using the communication module, the first data and the second data to at least one of a client device, a hub device, and a backend device.

In another embodiment of the first aspect, the transmitting of the first data and second data is to the client device, and the transmitting is via at least one of the backend device and the hub device.

In another embodiment of the first aspect, further comprising a communication module, the program further comprises instructions for: generating a user alert that indicates that the A/V recording and communication device has detected the object moving toward the A/V recording and communication device; and transmitting, using the communication module, the user alert to at least one of a client device associated with the A/V recording and communication device, a hub device, and a backend device.

In another embodiment of the first aspect, further comprising: a third PIR sensor positioned below, and in substantial vertical alignment with, the first PIR sensor and the second PIR sensor; a fourth PIR sensor positioned to the right of, and in substantially horizontal alignment with, the first PIR sensor, the fourth PIR sensor at a third angle, the third angle directed to the right of the first PIR sensor, the fourth PIR sensor capable of sensing motion substantially to the right of the A/V recording and communication device; a fifth PIR sensor positioned to the left of, and in substantially horizontal alignment with, the first PIR sensor, the fifth PIR sensor at a fourth angle, the fourth angle directed to the left of the first PIR sensor, the fifth PIR sensor capable of sensing motion substantially to the left of the A/V recording and communication device, and the program further comprises instructions for: detecting, by the fourth PIR sensor, third motion of the object in a third field of view associated with the fourth PIR sensor; based on the detecting of the third motion of the object, generating third data associated with the third motion of the object; detecting, by the fifth PIR sensor, fourth motion of the object in a fourth field of view of the fifth PIR sensor; based on the detecting of the fourth motion of the object, generating fourth data associated with the fourth motion of the object; analyzing the third data and fourth data to make a determination of horizontal movement of the object relative to the A/V recording and communication device; and based on the determination of horizontal movement of the object, performing at least one action.

In another embodiment of the first aspect, further comprising a communication module, and the program further comprises instructions for: based on the determining that the object is moving towards the A/V recording and communication device, generating a control signal that is configured to cause a security system to activate an alarm; and transmitting, using the communication module, the control signal to at least one of a hub device and a backend server.

In a second aspect, a method for an audio/video (A/V) recording and communication device, the A/V recording and communication device including a first passive infrared (PIR) sensor having a first field of view (FOV), a second PIR sensor having a second FOV, a processor, and a communication module, the first PIR sensor and the second PIR sensor positioned such that the second FOV extends beyond the first FOV with respect to a front surface of the A/V recording and communication device, the method comprising: detecting, by the first PIR sensor, first motion of an object in a first FOV of the first PIR sensor; based on the detecting of the first motion of the object, generating, by the processor, first data associated with the first motion of the object; detecting, by the second PIR sensor, second motion of the object in a second FOV of the second PIR sensor; based on the detecting of the second motion of the object, generating, by the processor, second data associated with the second motion of the object; analyzing, by the processor, the first data and second data to determine that the object is moving toward the A/V recording and communication device; based on the determination that the object is moving toward the A/V recording and communication device, generating, by the processor, a user alert that indicates that the object was detected; and transmitting, by the processor and using the communication module, the user alert to a client device associated with the A/V recording and communication device.

In an embodiment of the second aspect, the A/V recording and communication device further includes a third PIR sensor having a third FOV that extends beyond the second FOV with respect to the front surface of the A/V recording and communication device, and the method further comprises: detecting, by the third PIR sensor, third motion of the object in the third FOV; based on the detecting of the third motion of the object, generating, by the processor, third data associated with the third motion of the object; analyzing, by the processor, the first data, second data, and third data to determine that the object is moving toward the A/V recording and communication device.

In another embodiment of the second aspect, the method further comprising transmitting, by the processor and using the communication module, the first data and the second data to at least one of a client device, a hub device, and a backend device.

In another embodiment of the second aspect, the transmitting of the first data and the second data to the client device is via at least one of the backend device and the hub device.

In another embodiment of the second aspect, the method further comprising transmitting, by the processor and using the communication module, the user alert to at least one of a hub device and a backend device.

In another embodiment of the second aspect, the method further comprising storing, by the processor, data indicating at least one of a first angle of the first PIR, the second angle, the first FOV of the first PIR sensor, the second FOV of the second PIR sensor, a relative placement of the first PIR sensor, and a relative placement of the second PIR sensor.

In another embodiment of the second aspect, the method further comprising: analyzing, by the processor, the first data and second data to determine a speed of the object, the generating and the transmitting the user alert is further based on the speed of the object.

In another embodiment of the second aspect, the object comprises a human or an animal.

In another embodiment of the second aspect, the analyzing the first data and the second data to determine that the object is moving toward the A/V recording and communication device comprises: determining, by the processor, and based on the first data, that the first PIR sensor detected the object at a first time; determining, by the processor, and based on the second data, that the second PIR sensor detected the object at a second time, the second time being later than the first time; and determining, by the processor, that the object is moving toward the A/V recording and communication device based on the first PIR sensor detecting the object at the first time and the second PIR sensor detecting the object at the second time.

In another embodiment of the second aspect, the method further comprising initiating, by the processor, and based on detecting at least one of the first motion and the second motion, reliance by the A/V recording and communication device on a battery included as part of the A/V recording and communication device.

In another embodiment of the second aspect, the method further comprising activating, by the processor, the camera in response to determining that the object is moving toward the A/V recording and communication device.

In another embodiment of the second aspect, the method further comprising: based on the determining that the object is moving towards the A/V recording and communication device, generating, by the processor, a control signal that is configured to cause a security system to activate an alarm; and transmitting, by the processor and using the communication module, the control signal to at least one of a hub device and a backend server.

In a third aspect, an audio/video (A/V) recording and communication device comprising: one or more processors; a camera; a first passive infrared (PIR) sensor positioned at a first angle that is a positive angle with respect to a plane perpendicular to a ground plane, the first PIR sensor capable of sensing motion substantially to the left of the A/V recording and communication device; a second PIR sensor positioned to the right of, and in substantially horizontal alignment with, the first PIR sensor, at a second angle that is a negative angle with respect to the plane perpendicular to the ground plane, the second PIR sensor capable of sensing motion substantially to the right of the A/V recording and communication device; a non-transitory machine-readable memory storing a program, the program executable by at least one of the one or more processors, the program comprising instructions for: detecting, by the first PIR sensor, first motion of an object in a first field of view (FOV) of the first PIR sensor; based on the detecting of the first motion of the object, generating first data associated with the first motion of the object; detecting, by the second PIR sensor, second motion of the object in a second FOV of the second PIR sensor; based on the detecting of the second motion of the object, generating second data associated with the second motion of the object; analyzing the first data and the second data to determine a direction of movement of the object relative to the A/V recording and communication device; and based on the direction of movement of the object relative to the A/V recording and communication device, recording image data using the camera.

In an embodiment of the third aspect, the direction of movement includes at least one of from the right of the A/V recording and communication device to the left of the A/V recording and communication device and from the left of the A/V recording and communication device to the right of the A/V recording and communication device.

In another embodiment of the third aspect, further comprising a communication module, and the program further comprises instructions for: generating a user alert that indicates that the A/V recording and communication device has detected the object moving in the direction of movement; and transmitting, using the communication module, the user alert to at least one of a client device, a hub device, and a backend device.

In another embodiment of the third aspect, the analyzing the first data and the second data to determine the direction of movement of the object relative to the A/V recording and communication device comprises: determining, based on the first data, that the first PIR sensor detected the object at a first time; determining, based on the second data, that the second PIR sensor detected the object at a second time, the second time being later than the first time; and determining that the object is moving from left to right or from right to left relative to the A/V recording and communication device based on the first PIR sensor detecting the object at the first time and the second PIR sensor detecting the object at the second time.

In another embodiment of the third aspect, further comprising a communication module, and the program further comprises instructions for transmitting, using the communication module, the first data and the second data to at least one of a client, a hub device, and a backend server.

In another embodiment of the third aspect, further comprising a communication module, and the program further comprises instructions for: based on the movement of the object relative to the A/V recording and communication device, generating a control signal that is configured to cause a security system to activate an alarm; and transmitting, using the communication module, the control signal to at least one of a hub device and a backend device.

In another embodiment of the third aspect, the transmitting of the first data and second data to the client device is via at least one of the backend device and the hub device.

In another embodiment of the third aspect, the program further comprises instructions for storing data indicating at least one of a first angle of the first PIR sensor, a second angle of the second PIR sensor, the first FOV of the first PIR sensor, the second FOV of the second PIR sensor, a relative placement of the first PIR sensor, and a relative placement of the second PIR sensor.

In another embodiment of the third aspect, the program further comprises instructions for: analyzing the first data and second data to determine a speed of the object, the recording of the image data using the camera is further based on the speed of the object.

In another embodiment of the third aspect, the object comprises a human, a vehicle, or an animal.

In another embodiment of the third aspect, where the program further comprises instructions initiating, by the processor, and based on detecting at least one of the first motion and the second motion, reliance by the A/V recording and communication device on a battery included as part of the A/V recording and communication device.

In a fourth aspect, a method for an audio/video (A/V) recording and communication device, the A/V recording and communication device including a first passive infrared (PIR) sensor at a first angle that is a positive angle with respect to a plane perpendicular to a ground plane, a second PIR sensor positioned to the right of, and in substantially horizontal alignment with, the first PIR sensor, at a second angle that is a negative angle with respect to the plane perpendicular to the ground plane, a camera, a processor, and a communication module, the method comprising: detecting, by the first PIR sensor, first motion of an object in a first FOV of the first PIR sensor; based on the detecting of the first motion of the object, generating, by the processor, first data associated with the first motion of the object; detecting, by the second PIR sensor, second motion of the object in a second FOV of the second PIR sensor; based on the detecting of the second motion of the object, generating, by the processor, second data associated with the second motion of the object; analyzing, by the processor, the first data and the second data to determine a direction of movement of the object relative to the A/V recording and communication device; based on the direction of movement of the object relative to the A/V recording and communication device, generating, by the processor, a user alert that indicates that the A/V recording and communication device detected the object; and transmitting, by the processor and using the communication module, the user alert to a client device.

In an embodiment of the fourth aspect, the direction of movement includes at least one of from the right of the A/V recording and communication device to the left of the A/V recording and communication device and from the left of the A/V recording and communication device to the right of the A/V recording and communication device.

In another embodiment of the fourth aspect, the analyzing the first data and the second data to determine the direction of movement of the object relative to the A/V recording and communication device comprises: determining, by the processor and based on the first data, that the first PIR sensor detected the object at a first time; determining, by the processor and based on the second data, that the second PIR sensor detected the object at a second time, the second time being later than the first time; and determining, by the processor, that the object is moving from left to right or from right to left relative to the A/V recording and communication device based on the first PIR sensor detecting the object at the first time and the second PIR sensor detecting the object at the second time.

In another embodiment of the fourth aspect, the method further comprising storing, by the processor, data indicating at least one of the first angle, the second angle, the first FOV of the first PIR sensor, the second FOV of the second PIR sensor, a relative placement of the first PIR sensor, and a relative placement of the second PIR sensor.

In another embodiment of the fourth aspect, the method further comprising: analyzing, by the processor, the first data and second data to determine a speed of the object, the generating of the user alert is further based on the determining the speed of the object.

In another embodiment of the fourth aspect, the method further comprising recording, using a camera, image data depicting at least the object.

In another embodiment of the fourth aspect, the method further comprising initiating, by the processor, and based on detecting at least one of the first motion and the second motion, reliance by the A/V recording and communication device on a battery included as part of the A/V recording and communication device.

In another embodiment of the fourth aspect, the method further comprising: based on the movement of the object relative to the A/V recording and communication device, generating, by the processor, a control signal that is configured to cause a security system to activate an alarm; and transmitting, by the processor and using the communication module, the control signal to at least one of a hub device and a backend device.

In a fifth aspect, an audio/video (A/V) recording and communication device comprising: a camera; one or more processors; a first passive infrared (PIR) sensor having a first field of view (FOV); a second PIR sensor having a second FOV different than the first FOV; and a non-transitory machine-readable memory storing a program, the program executable by at least one of the one or more processors, the program comprising instructions for: detecting, by the first PIR sensor, first motion of an object in the first FOV of the first PIR sensor; detecting, by the second PIR sensor, second motion of the object in the second FOV of the second PIR sensor; based on the detecting the first motion and the detecting the second motion, determining a direction of movement of the object; and based on the direction of movement, determining whether to activate the camera to record image data in a FOV of the camera.

In an embodiment of the fifth aspect, the first PIR sensor and the second PIR sensor are in substantially vertical alignment, and the A/V recording and communication device further comprises: a third PIR sensor positioned in substantial vertical alignment with the first PIR sensor and the second PIR sensor; and the program further comprises instructions for: detecting, by the third PIR sensor, third motion of the object in a third field of view associated with the third PIR sensor; based on the detection the first motion, the detecting the second motion, and the detecting the third motion, determining that the object is moving toward the A/V recording and communication device, based on the determination that the object is moving toward the A/V recording and communication device, recording image data using the camera.

In another embodiment of the fifth aspect, further comprising: a third PIR sensor positioned below, and in substantial vertical alignment with, the first PIR sensor and the second PIR sensor; a fourth PIR sensor positioned to the right of, and in substantially horizontal alignment with, the first PIR sensor, at a first angle that is a negative angle with respect to the plane perpendicular to the ground plane, the fourth PIR sensor capable of sensing motion substantially to the right of the A/V recording and communication device; a fifth PIR sensor positioned to the left of, and in substantially horizontal alignment with, the first PIR sensor, at a second angle that is a positive angle with respect to a plane perpendicular to a ground plane, the fifth PIR sensor capable of sensing motion substantially to the left of the A/V recording and communication device, and the program further comprises instructions for: detecting, by the fourth PIR sensor, third motion of the object in a third field of view associated with the fourth PIR sensor; detecting, by the fifth PIR sensor, fourth motion of the object in a fourth field of view of the fifth PIR sensor; based on the detecting of the third motion and the detecting of the fourth motion, determining a horizontal movement of the object relative to the A/V recording and communication device; and based on the determination that the object is moving horizontally, performing at least one action.

In another embodiment of the fifth aspect, the determining the direction of movement of the object comprises: based on the detecting of the first motion of the object, generating first data associated with the first motion of the object; based on the detecting of the second motion of the object, generating second data associated with the second motion of the object; determining, based on the first data, that the first PIR sensor detected the object at a first time; determining, based on the second data, that the second PIR sensor detected the object at a second time, the second time being later than the first time; and determining the direction of the object relative to the A/V recording and communication device based on the first PIR sensor detecting the object at the first time and the second PIR sensor detecting the object at the second time.

In another embodiment of the fifth aspect, the program further comprises instructions for: determining the direction of movement is toward the A/V recording and communication device, the determining whether to activate the camera to record image data in the FOV of the camera comprises determining to activate the camera to record the image data in the FOV of the camera based on the determining that the direction of movement is toward the A/V recording and communication device.

In another embodiment of the fifth aspect, the program further comprises instructions for: determining the direction of movement is away from the A/V recording and communication device, the determining whether to activate the camera to record image data in the FOV of the camera comprises determining to refrain from activating the camera to record the image data in the FOV of the camera based on the determining that the direction of movement is away from the A/V recording and communication device.

In another embodiment of the fifth aspect, the determining to refrain from activating the camera is further based on determining an absence of movement toward the A/V recording and communication device occurring within a threshold time of the determining the direction of movement is away from the A/V recording and communication device.

In another embodiment of the fifth aspect, the program further comprises instructions for: determining the direction of movement is away from the A/V recording and communication device, based on determining that the direction of movement is away from the A/V recording and communication device, powering down components of the A/V recording and communication device.

In another embodiment of the fifth aspect, further comprising a communication module, the program further comprises instructions for: generating a user alert that indicates that the A/V recording and communication device has detected the object moving toward the A/V recording and communication device; and transmitting, using the communication module, the user alert to at least one of a client device, a hub device, and a backend device.

In another embodiment of the fifth aspect, the transmitting of the user alert to the client device is via at least one of the backend device and the hub device.

In another embodiment of the fifth aspect, the program further comprises instructions for storing data indicating at least one of a first angle of the first PIR sensor, a second angle of the second PIR sensor, the first FOV of the first PIR sensor, the second FOV of the second PIR sensor, a relative placement of the first PIR sensor, and a relative placement of the second PIR sensor.

In another embodiment of the fifth aspect, the program further comprises instructions for: based on the detecting the first motion and the detecting the second motion, determining a speed of the object, determining whether to activate the camera to record image data in a FOV of the camera is further based on the determining the speed of the object.

In another embodiment of the fifth aspect, the program further comprises instructions for initiating, by the processor and based on detecting at least one of the first motion and the second motion, reliance by the A/V recording and communication device on a battery included as part of the A/V recording and communication device In another embodiment of the fifth aspect, the first PIR sensor is vertically aligned with the second PIR sensor.

In another embodiment of the fifth aspect, the first PIR sensor is horizontally aligned with the second PIR sensor.

In another embodiment of the fifth aspect, further comprising a communication module, and the program further comprises instructions for: based on the direction of movement, generating a control signal that is configured to cause a security system to activate an alarm; and transmitting, by the processor and using the communication module, the control signal to at least one of a hub device and a backend device.

In a sixth aspect, a method for an audio/video (A/V) recording and communication device, the A/V recording and communication device including a first passive infrared (PIR) sensor having a first field of view (FOV), a second PIR sensor having a second FOV, the first FOV and the second FOV only partially overlapping, and a processor, the method comprising: detecting, by the first PIR sensor, first motion of an object in the first FOV of the first PIR sensor; detecting, by the second PIR sensor, second motion of the object in the second FOV of the second PIR sensor; based on the detecting the first motion and the detecting the second motion, determining, by the processor, a direction of movement of the object; and based on the direction of movement, performing, by the processor, at least one action.

In an embodiment of the sixth aspect, the determining the direction of movement of the object comprises: based on the detecting of the first motion of the object, generating, by the processor, first data associated with the first motion of the object; based on the detecting of the second motion of the object, generating, by the processor, second data associated with the second motion of the object; determining, by the processor and based on the first data, that the first PIR sensor detected the object at a first time; determining, by the processor and based on the second data, that the second PIR sensor detected the object at a second time, the second time being later than the first time; and determining, by the processor, the direction of movement of the object relative to the A/V recording and communication device based on the first PIR sensor detecting the object at the first time and the second PIR sensor detecting the object at the second time.

In another embodiment of the sixth aspect, the A/V recording and communication device further includes a communication module, and the performing the at least one action comprises: generating, by the processor, a user alert that indicates that the A/V recording and communication device has detected the object moving toward the A/V recording and communication device; and transmitting, by the processor and using the communication module, the user alert to at least one of a client device, a hub device, and a backend device.

In another embodiment of the sixth aspect, the A/V recording and communication device further includes a communication module, and the performing the at least one action comprises: generating, by the processor, a control signal that is configured to cause a security system to activate an alarm; and transmitting, by the processor and using the communication module, the user alert to at least one of a client device, a hub device, and a backend device.

In another embodiment of the sixth aspect, the A/V recording and communication device further includes a camera, and the performing the at least one action comprises recording image data using the camera.

In another embodiment of the sixth aspect, the A/V recording and communication device further includes a speaker, and the performing the at least one action comprises causing, by the processor, the speaker to output sound.

In another embodiment of the sixth aspect, the method further comprising storing, by the processor, data indicating at least one of a first angle of the first PIR sensor, a second angle of the second PIR sensor, the first FOV of the first PIR sensor, the second FOV of the second PIR sensor, a relative placement of the first PIR sensor, and a relative placement of the second PIR sensor.

In another embodiment of the sixth aspect, the method further comprising: based on the detecting the first motion and the detecting the second motion, determining, by the processor, a speed of the object, the performing, by the processor, the at least one action is further based on the determining the speed of the object.

In another embodiment of the sixth aspect, the object comprises a human, a vehicle, or an animal.

In another embodiment of the sixth aspect, the method further comprising initiating, by the processor, and based on the detecting at least one of the first motion and the second motion, reliance by the A/V recording and communication device on a battery included as part of the A/V recording and communication device.

In another embodiment of the sixth aspect, the first PIR sensor is vertically aligned with the second PIR sensor.

In another embodiment of the sixth aspect, the first PIR sensor is horizontally aligned with the second PIR sensor.

In a seventh aspect, a network device communicatively coupled to an audio/video (A/V) recording and communication device that includes a first passive infrared (PIR) sensor at a first angle with respect to a ground plane, a second PIR sensor positioned substantially below the first PIR sensor at a second angle with respect to the ground plane that is less than the first angle, and a camera, the network device comprising: a communication module; one or more processors; and a non-transitory machine-readable memory storing a program, the program executable by at least one of the one or more processors, the program comprising instructions for: receiving, using the communication module, first data from the A/V recording and communication device, the first data indicating a first motion of an object detected by the first PIR sensor in a first field of view (FOV) of the first PIR sensor; receiving, using the communication module, second data from the A/V recording and communication device, the second data indicating a second motion of the object detected by the second PIR sensor in a second FOV of the second PIR sensor; analyzing the first data and second data to determine that the object is moving toward the A/V recording and communication device; based on the determination that the object is moving toward the A/V recording and communication device, generating a control signal that is configured to cause the A/V recording and communication device to record image data using the camera; and transmitting, using the communication module, the control signal to the A/V recording and communication device.

In an embodiment of the seventh aspect, the network device is at least one of a hub device and a backend device.

In another embodiment of the seventh aspect, the program further comprises instructions for transmitting, using the communication module, the first data and the second data to a client device associated with the A/V recording and communication device.

In another embodiment of the seventh aspect, the program further comprises instructions for: generating a user alert that indicates that the network device has detected the object moving toward the A/V recording and communication device; and transmitting, using the communication module, the user alert to a client device associated with the A/V recording and communication device.

In another embodiment of the seventh aspect, the program further comprises instructions for storing data indicating at least one of the first angle, the second angle, the first FOV of the first PIR sensor, the second FOV of the second PIR sensor, a relative placement of the first PIR sensor, and a relative placement of the second PIR sensor.

In another embodiment of the seventh aspect, the program further comprises instructions for: based on the first data and the second data, determining a speed of the object, the generating and the transmitting of the control signal to the A/V recording and communication device is further based on the determining the speed of the object.

In another embodiment of the seventh aspect, the control signal is a first control signal, and the program further comprises instructions for: based the determination that the object is moving toward the A/V recording and communication device, generating a second control signal that is configured to cause the A/V recording and communication device to initiate reliance by the A/V recording and communication device on a battery included as part of the A/V recording and communication device; and transmitting, using the communication module, the second control signal to the A/V recording and communication device.

In another embodiment of the seventh aspect, the analyzing the first data and second data to determine that the object is moving toward the A/V recording and communication device comprises: determining, based on the first data, that the first PIR sensor detected the object at a first time; determining, based on the second data, that the second PIR sensor detected the object at a second time, the second time being later than the first time; and determining that the object is moving toward the A/V recording and communication device based on the first PIR sensor detecting the object at the first time and the second PIR sensor detecting the object at the second time.

In another embodiment of the seventh aspect, the control signal is a first control signal, and the program further comprises instructions for: based on the determining that the object is moving toward the A/V recording and communication device, generating a second control signal that is configured to cause a second A/V recording and communication device to record image data using a second camera associated with the second A/V recording and communication device; and transmitting, using the communication module, the second control signal to the second A/V recording and communication device.

In another embodiment of the seventh aspect, the program further comprises instructions for: based on the determining that the object is moving toward the A/V recording and communication device, causing a security system to activate an alarm.

In another embodiment of the seventh aspect, the first PIR sensor is vertically aligned with the second PIR sensor.

In another embodiment of the seventh aspect, the A/V recording and communication device further includes a third PIR sensor horizontally aligned with the sensor PIR sensor, and the program further comprises instructions for: receiving, using the communication module, third data from the A/V recording and communication device, the third data indicating a third motion of the object detected by the third PIR sensor in a third FOV of the third PIR sensor; analyzing the second data and third data to make a determination of horizontal movement of the object relative to the A/V recording and communication device; and based on the determination that the object is moving horizontally, performing at least one action.

In an eighth aspect, a method for a network device including a communication module and a processor, the network device communicatively coupled to an audio/video (A/V) recording and communication device including a first passive infrared (PIR) sensor and a second PIR sensor, the first PIR sensor and the second PIR sensor positioned such that a first field of view (FOV) of the first PIR sensor is different than the second FOV of the second PIR sensor, the method comprising: receiving, by the processor and using the communication module, first data from the A/V recording and communication device, the first data indicating a first motion of an object by the first PIR sensor in the FOV of the first PIR sensor; receiving, by the processor and using the communication module, second data from the A/V recording and communication device, the second data indicating a second motion of the object detected by the second PIR sensor in the second FOV of the second PIR sensor; analyzing, by the processor, the first data and second data to determine that the object is moving toward the A/V recording and communication device; based on the determining that the object is moving toward the A/V recording and communication device, generating, by the processor, a user alert that indicates that the object was detected; and transmitting, using the communication module, the user alert to at least a client device associated with the A/V recording and communication device.

In an embodiment of the eighth aspect, the network device is at least one of a hub device and a backend device.

In another embodiment of the eighth aspect, the method further comprising transmitting, by the processor and using the communication module, the first data and the second data to the client device associated with the A/V recording and communication device.

In an embodiment of the eighth aspect, the method further comprising storing, by the processor, data indicating at least one of a first angle of the first PIR sensor, a second angle of the second PIR sensor, the first FOV of the first PIR sensor, the second FOV of the second PIR sensor, a relative placement of the first PIR sensor, and a relative placement of the second PIR sensor.

In an embodiment of the eighth aspect, the method further comprising: based on the first data and the second data, determining, by the processor, a speed of the object, the generating and the transmitting of the user alert is further based on the determining the speed of the object.

In an embodiment of the eighth aspect, the object comprises a human, a vehicle, or an animal.

In an embodiment of the eighth aspect, the control signal is a first control signal, and further comprises: based the determining that the object is moving toward the A/V recording and communication device, generating, by the processor, a second control signal that is configured to cause the A/V recording and communication device to initiate reliance by the A/V recording and communication device on a battery included as part of the A/V recording and communication device; and transmitting, by the processor and using the communication module, the second control signal to the A/V recording and communication device.

In an embodiment of the eighth aspect, analyzing the first data and second data to determine that the object is moving toward the A/V recording and communication device comprises: determining, by the processor and based on the first data, that the first PIR sensor detected the object at a first time; determining, by the processor and based on the second data, that the second PIR sensor detected the object at a second time, the second time being later than the first time; and determining, by the processor, that the object is moving toward the A/V recording and communication device based on the first PIR sensor detecting the object at the first time and the second PIR sensor detecting the user at the second time.

In an embodiment of the eighth aspect, the control signal is a first control signal, and the method further comprises: based on the determining that the object is moving toward the A/V recording and communication device, generating, by the processor, a second control signal that is configured to cause the A/V recording and communication device to record image data using a camera associated with the A/V recording and communication device; and transmitting, by the processor and using the communication module, the second control signal to the A/V recording and communication device.

In an embodiment of the eighth aspect, the control signal is a first control signal, and the method further comprises: based the determining that the object is moving toward the A/V recording and communication device, causing a security system to activate an alarm.

In a ninth aspect, a network device communicatively coupled to an electronic device that includes a first passive infrared (PIR) sensor having a first field of view (FOV) and a second PIR sensor having a second FOV extending beyond the first FOV with respect to a front surface of the electronic device, the network device comprising: a communication module; one or more processors; and a non-transitory machine-readable memory storing a program, the program executable by at least one of the one or more processors, the program comprising instructions for: receiving, using the communication module, first data from the electronic device, the first data is associated with a first motion of an object detected by the first PIR sensor; receiving, using the communication module, second data from the electronic device, the second data is associated with a second motion of the object detected by the second PIR sensor; analyzing the first data and second data to determine a direction of travel of the object; and based on the direction of travel of the object, performing at least one action.

In an embodiment of the ninth aspect, the program further comprises instructions for: determining that the direction of travel of the object is toward the electronic device, the performing the at least one action comprises: generating a user alert that indicates the object is moving toward the electronic device; and transmitting, using the communication module, the user alert to a client device associated with the electronic device.

In another embodiment of the ninth aspect, the program further comprises instructions for: determining that the direction of travel of the object is toward the electronic device, the performing the at least one action comprises: based on the determining that the direction of travel of the object is toward the electronic device, generating a control signal that is configured to cause the electronic device to record image data using a camera; and transmitting, using the communication module, the control signal to the electronic device.

In another embodiment of the ninth aspect, the electronic device is a first electronic device, and the program further comprises instructions for: determining that the direction of travel of the object is toward the electronic device, the performing the at least one action comprises: generating a control signal that is configured to cause a second electronic device to record second image data using a camera associated with the second electronic device; and transmitting, using the communication module, the control signal to the second electronic device.

In another embodiment of the ninth aspect, the program further comprises instructions for: determining that the direction of travel of the object is toward the electronic device, the performing the at least one action comprises causing a security system to activate an alarm.

In another embodiment of the ninth aspect, the network device is at least one of a hub device and a backend device.

In another embodiment of the ninth aspect, the electronic device is an audio/video recording and communication device.

In another embodiment of the ninth aspect, the program further comprises instructions for transmitting, using the communication module, the first data and the second data to a client device associated with the electronic device.

In another embodiment of the ninth aspect, the program further comprises instructions for storing data indicating at least one of a first angle of the first PIR sensor, a second angle of the second PIR sensor, the first FOV of the first PIR sensor, the second FOV of the second PIR sensor, a relative placement of the first PIR sensor, and a relative placement of the second PIR sensor.

In another embodiment of the ninth aspect, the program further comprises instructions for: analyzing the first data and the second data to determine a speed of the object, the performing the at least one action is further based on the determining the speed of the object.

In another embodiment of the ninth aspect, the object comprises a human, a vehicle, or an animal.

In another embodiment of the ninth aspect, the program further comprises instructions for: based on receiving the first data or second data, generating a control signal that is configured to cause the electronic device to initiate reliance by the electronic device on a battery included as part of the electronic device; and transmitting, using the communication module, the control signal to the electronic device.

In another embodiment of the ninth aspect, analyzing the first data and second data to determine the direction of travel of the object comprises: determining, based on the first data, that the first PIR sensor detected the object at a first time; determining, based on the second data, that the second PIR sensor detected the object at a second time, the second time being later than the first time; and determining the direction of travel of the object based on the first PIR sensor detecting the object at the first time and the second PIR sensor detecting the object at the second time.

In another embodiment of the ninth aspect, the first PIR sensor is vertically aligned with the second PIR sensor.

In another embodiment of the ninth aspect, the first PIR sensor is horizontally aligned with the second PIR sensor.

In a tenth aspect, a method for a network device, the network device communicatively coupled to an electronic device, the method comprising: receiving, by a processor of the network device, first data from the electronic device, the first data is associated with a first motion of an object detected by a first passive infrared (PIR) sensor of the electronic device; receiving, by the processor, second data from the electronic device, the second data is associated with a second motion of the object detected by a second PIR sensor of the electronic device; analyzing, by the processor, the first data and the second data to determine a direction of travel of the object; based on the direction of travel, generating, by the processor, a control signal that is configured to cause the electronic device to perform an action; and transmitting, using a communication module of the network device, the control signal to the electronic device.

In an embodiment of the tenth aspect, the method further comprising: determining, by the processor, that the direction of travel of the object is toward the electronic device, the control signal that is configured to cause the electronic device to perform the at least one action comprises a control signal that is configured to cause the electronic device to output a sound.

In another embodiment of the tenth aspect, the network device is at least one of a hub device and a backend device.

In another embodiment of the tenth aspect, the electronic device is one of an audio/video recording and communication device and a motion sensor.

In another embodiment of the tenth aspect, wherein analyzing, by the processor, the first data and second data to determine the direction of travel of the object comprises: determining, by the processor and based on the first data, that the first PIR sensor detected the object at a first time; determining, by the processor and based on the second data, that the second PIR sensor detected the object at a second time, the second time being later than the first time; and determining, by the processor, the direction of travel of the object based on the first PIR sensor detecting the object at the first time and the second PIR sensor detecting the object at the second time.

In another embodiment of the tenth aspect, the method further comprising: determining, by the processor, that the direction of travel of the object is toward the electronic device, the control signal that is configured to cause the electronic device to perform the at least one action comprises a control signal that is configured to cause the electronic device to record image data using a camera.

In another embodiment of the tenth aspect, the electronic device is a first electronic device and the control signal is a first control signal, and the method further comprises: generating, by the processor, a second control signal that is configured to cause a second electronic device to record second image data using a camera associated with the second electronic device; and transmitting, by the processor and using the communication module, the second control signal to the second electronic device.

In another embodiment of the tenth aspect, the method further comprising transmitting, by the processor and using the communication module, the first data and the second data to a client device associated with the electronic device.

In another embodiment of the tenth aspect, the method further comprising: generating, by the processor, a user alert that indicates the object is moving toward the electronic device; and transmitting, by the processor and using the communication module, the user alert to a client device associated with the electronic device.

In another embodiment of the tenth aspect, the method further comprising storing, by the processor, data indicating at least one of a first angle of the first PIR sensor, a second angle of the second PIR sensor, a first field of view (FOV) of the first PIR sensor, a second FOV of the second PIR sensor, a relative placement of the first PIR sensor, and a relative placement of the second PIR sensor.

In another embodiment of the tenth aspect, the method further comprising: analyzing, by the processor, the first data and the second data to determine a speed of the object, the generating and the transmitting of the control signal to the electronic device is further based on the determining the speed of the object.

In another embodiment of the tenth aspect, the object comprises a human, a vehicle, or an animal.

In another embodiment of the tenth aspect, the control signal is a first control signal, and the method further comprises: based on the receiving the first data or the receiving the second data, generating, by the processor, a second control signal that is configured to cause the electronic device to initiate reliance by the electronic device on a battery included as part of the electronic device; and transmitting, by the processor and using the communication module, the second control signal to the electronic device.

In another embodiment of the tenth aspect, the first PIR sensor is vertically aligned with the second PIR sensor.

In another embodiment of the tenth aspect, the first PIR sensor is horizontally aligned with the second PIR sensor.

In an eleventh aspect, an audio/video (A/V) device comprises: one or more network interfaces; a camera; a first passive infrared (PIR) sensor positioned at a first angle with respect to a ground plane, the first PIR sensor including a first field of view (FOV); a second PIR sensor positioned above, and in substantially vertical alignment with, the first PIR sensor, the second PIR sensor positioned at a second angle with respect to the ground plane, the second angle being less than the first angle, and the second PIR sensor including a second FOV; one or more processors; and one or more non-transitory computer-readable media storing instructions that, when executed by the one or more processors, cause the one or more processors to perform operations comprising: receiving, from the second PIR sensor, a first signal at a first time; determining, using the first signal, that the second PIR sensor detected an object within the second FOV at the first time; after receiving the first signal, receiving, from the first PIR sensor, a second signal at a second time; determining, using the second signal, that the first PIR sensor detected the object within the first FOV at the second time; determining that the first PIR sensor detected the object after the second PIR sensor detected the object; determining that the object is moving toward the A/V device; after determining that the object is moving toward the A/V device, generating image data using the camera; and sending, using the one or more network interfaces, the image data to one or more computing devices.

In an embodiment of the first aspect, the A/V device further comprising: a third PIR sensor positioned beside, and substantially horizontally aligned with, the first PIR sensor, the third PIR sensor including a third FOV, and wherein the one or more non-transitory computer-readable media store further instructions that, when executed by the one or more processors, cause the one or more processors to perform further operations comprising: after receiving the first signal, receiving, from the third PIR sensor, a third signal at a third time; determining that the third PIR sensor detected the object after the first PIR sensor detected the object; and determining that the object is moving in a given direction with respect to the A/V device.

In another embodiment of the eleventh aspect, the one or more non-transitory computer-readable media storing further instructions that, when executed by the one or more processors, cause the one or more processors to perform further operations comprising: determining that the second time is within a threshold period of time after the first time, wherein generating the image data further occurs after determining that the second time is within the threshold period of time after the first time.

In a twelfth aspect, an electronic device comprises: one or more network interfaces; a camera; a first motion sensor, the first motion sensor including a first field of view (FOV); a second motion sensor positioned above, and in substantially vertical alignment with, the first motion sensor, the second motion sensor including a second FOV that extends farther from the electronic device than the first FOV; one or more processors; and one or more non-transitory computer-readable media storing instructions that are executable by the one or more processors.

In an embodiment of the twelfth aspect, wherein: the first motion sensor is positioned at a first angle with respect to a ground plane; and the second motion sensor is positioned at a second angle with respect to the ground plane, the second angle being less than the first angle.

In another embodiment of the twelfth aspect, wherein the first motion sensor comprises a first passive infrared (PIR) sensor, and wherein the second motion sensor comprises a second PIR sensor.

In another embodiment of the twelfth aspect, further comprising a third motion sensor positioned below, and in substantially vertical alignment with, the first motion sensor, the third motion sensor including a third FOV, wherein the first FOV extends farther from the electronic device than the third FOV.

In another embodiment of the twelfth aspect, the electronic further comprising: a third motion sensor positioned in a first direction from, and in substantially horizontal alignment with, one of the first motion sensor or the second motion sensor, the third motion sensor including a third FOV; and a fourth motion sensor positioned in a second direction from, and in substantially horizontal alignment with, the one of the first motion sensor or the second motion sensor, the fourth motion sensor including a fourth FOV, the second direction being opposite the first direction.

In another embodiment of the twelfth aspect, the electronic further comprising: a third motion sensor positioned below, and in substantially vertical alignment with, the first motion sensor, the third motion sensor including a third FOV, wherein the first FOV extends farther from the electronic device than the third FOV; a fourth motion sensor positioned in a first direction from, and in substantially horizontal alignment with, the first motion sensor, the fourth motion sensor including a fourth FOV; and a fifth motion sensor positioned in a second direction from, and in substantially horizontal alignment with, the first motion sensor, the fifth motion sensor including a fifth FOV, the second direction being opposite the first direction.

In another embodiment of the twelfth aspect, the one or more computer-readable media storing further instructions that, when executed by the one or more processors, cause the one or more processors to perform further operations comprising: receiving, from the second motion sensor, a first output signal at a first time, the first output signal indicating possible motion in the first FOV; receiving, from the first motion sensor, a second output signal at a second time, the second time being later than the first time, the second output signal indicating possible motion in the second FOV; after receiving the second output signal, generating image data using the camera; and sending, using the one or more network interfaces, the image data to one or more computing devices.

In another embodiment of the twelfth aspect, the one or more computer-readable media storing further instructions that, when executed by the one or more processors, cause the one or more processors to perform further operations comprising: determining that the second time is within a threshold period of time after the first time; and subsequently determining that an object is moving toward the electronic device.

In another embodiment of the twelfth aspect, the one or more computer-readable media storing further instructions that, when executed by the one or more processors, cause the one or more processors to perform further operations comprising: determining, using the first time and the second time, a speed at which the object is moving toward the electronic device, wherein generating the image data using the camera further occurs after determining the speed at which the object is moving toward the electronic device.

In another embodiment of the twelfth aspect, the one or more computer-readable media storing further instructions that, when executed by the one or more processors, cause the one or more processors to perform further operations comprising: receiving, from the first motion sensor, a first output signal at a first time, the first output signal indicating possible motion in the first FOV; receiving, from the second motion sensor, a second output signal at a second time, the second time being later than the first time, the second output signal indicating possible motion in the second FOV; and determining, based on receiving the first output signal at the first time and receiving the second output signal at the second time, that an object is moving away from the electronic device.

In a thirteenth aspect, a method comprises: receiving a first signal generated by a first motion sensor of an electronic device; after receiving the first signal, receiving a second signal generated by a second motion sensor of the electronic device; determining, using at least the first signal and the second signal, that the second motion sensor detected an object after the first motion sensor; determining that the object is moving toward the electronic device; and after determining that the object is moving toward the electronic device, causing the electronic device to perform one or more actions.

In an embodiment of the thirteenth aspect, the method further comprising storing data indicating that a first field of view (FOV) of the first motion sensor extends farther from the electronic device than a second FOV of the second motion sensor.

In another embodiment of the thirteenth aspect, the method further comprising: determining a first time at which the first motion sensor generated the first signal; determining a second time at which the second motion sensor generated the second signal; and determining, using at least the first time and the second time, a speed associated with the object.

In another embodiment of the thirteenth aspect, wherein causing the electronic device to perform the one or more actions comprises at least one of: causing the electronic device to generate image data using a camera; causing the electronic device to send a user alert indicating that motion was detected; or causing the electronic device to activate an alarm.

In another embodiment of the thirteenth aspect, the method further comprising: receiving a third signal generated by the second motion sensor; after receiving the third signal, receiving the fourth signal generated by the first motion sensor; determining, using at least the third signal and the fourth signal, that the first motion sensor detected an additional object after the second motion sensor; and determining that the additional object is moving away from the electronic device.

In another embodiment of the thirteenth aspect, wherein receiving the first signal occurred at a first time and receiving the second signal occurred at a second time, and wherein the method further comprises: determining, using the first time and the second time, a speed at which the object is moving toward the electronic device, wherein causing the electronic device to perform the one or more actions further occurs after determining the speed at which the object is moving toward the electronic device.

In another embodiment of the thirteenth aspect, the method further comprising, before causing the electronic device to perform the one or more actions, determining that receiving the second signal occurred within a threshold period of time after receiving the first signal.

What is claimed is:

1. A method comprising:
    receiving a first signal generated by a first motion sensor;
    determining, using the first signal, that the first motion sensor detected first motion at a first time;
    receiving a second signal generated by a second motion sensor;
    determining, using the second signal, that the second motion sensor detected second motion at a second time;
    determining based at least in part on the first time and the second time, that the first motion sensor detected the first motion before the second motion sensor detected the second motion;
    based at least in part on the first motion sensor detecting the first motion before the second motion sensor detected the second motion, causing an electronic device to generate first image data;
    receiving a third signal generated by the second motion sensor;
    determining, using the third signal, that the second motion sensor detected third motion at a third time;
    receiving a fourth signal generated by the first motion sensor;
    determining, using the fourth signal, that the first motion sensor detected fourth motion at a fourth time;
    determining based at least in part on the third time and the fourth time, that the second motion sensor detected the third motion before the first motion sensor detected the fourth motion; and
    based at least in part on the second motion sensor detecting the third motion before the first motion sensor detected the fourth motion, refraining from causing the electronic device to generate second image data.

2. The method as recited in claim 1, further comprising at least one of:
    causing the electronic device to send the first image data;
    causing the electronic device to send a motion alert; or
    causing the electronic device to activate an alarm.

3. The method as recited in claim 1, further comprising:
    determining a difference between the first time and the second time,
    wherein the causing the electronic device to generate the first image data is further based at least in part on the difference.

4. The method as recited in claim 1, further comprising:
    determining that the second time is within a threshold period of time to the first time,
    wherein the causing the electronic device to generate the first image data is further based at least in part on the determining that the second time is within the threshold period of time to the first time.

5. The method as recited in claim 1, further comprising determining that an object is moving toward the electronic device based at least in part on the determining that the first motion sensor detected the first motion before the second motion sensor detected the second motion.

6. The method as recited in claim 1, further comprising determining that an object is moving away from the electronic device based at least in part on the determining that the first motion sensor detected the fourth motion after the second motion sensor detected the third motion.

7. The method as recited in claim 1, further comprising:
    storing first data representing a first field of view associated with the first motion sensor;
    storing second data representing a second field of view associated with the second motion sensor, the second field of view extending farther from the electronic device than the first field of view; and
    determining that an object is moving toward the electronic device based at least in part on the first data, the second data, and the determining that the first motion sensor detected the first motion before the second motion sensor detected the second motion.

8. The method as recited in claim 1, further comprising:
    storing first data representing a first angle associated with the first motion sensor, the first angle being with respect to a plane associated with the electronic device;
    storing second data representing a second angle associated with the second motion sensor, the second angle being with respect to the plane associated with the electronic device; and
    determining that an object is moving toward the electronic device based at least in part on the first data, and the second data, and the determining that the first motion sensor detected the first motion before the second motion sensor detected the second motion.

9. An electronic device comprising:
    a camera;
    a first motion sensor;
    a second motion sensor;
    one or more processors; and
    one or more computer-readable media storing instructions that, when executed by the one or more processors, cause the one or more processors to perform operations comprising:
        receiving a first signal generated by the first motion sensor;

determining, using the first signal, that the first motion sensor detected first motion at a first time;

receiving a second signal generated by the second motion sensor;

determining, using the second signal, that the second motion sensor detected second motion at a second time;

determining that the first motion sensor detected the first motion before the second motion sensor detected the second motion;

determining that the second time is within a threshold period of time to the first time; and based at least in part on the determining that the first motion sensor detected the first motion before the second motion sensor detected the second motion and the determining that the second time is within the threshold period of time to the first time, refraining from generating first image data using the camera.

10. The electronic device as recited in claim 9, the one or more computer-readable media storing further instructions that, when executed by the one or more processors, cause the one or more processors to perform further operations comprising determining that an object is moving away from the electronic device based at least in part on the determining that the first motion sensor detected the first motion before the second motion sensor detected the second motion.

11. The electronic device as recited in claim 9, the one or more computer-readable media storing further instructions that, when executed by the one or more processors, cause the one or more processors to perform further operations comprising:

receiving a third signal generated by the second motion sensor;

determining, using the third signal, that the second motion sensor detected third motion;

receiving a fourth signal generated by the first motion sensor;

determining, using the fourth signal, that the first motion sensor detected fourth motion;

determining that the first motion sensor detected the fourth motion after the second motion sensor detected the third motion; and generating second image data using the camera.

12. The electronic device as recited in claim 11, the one or more computer-readable media storing further instructions that, when executed by the one or more processors, cause the one or more processors to perform further operations comprising determining that an object is moving towards the electronic device based at least in part on the determining that the first motion sensor detected the fourth motion after the second motion sensor detected the third motion.

13. The electronic device as recited in claim 9, the one or more computer-readable media storing further instructions that, when executed by the one or more processors, cause the one or more processors to perform further operations comprising:

storing first data representing a first field of view associated with the first motion sensor;

storing second data representing a second field of view associated with the second motion sensor, the first field of view extending farther from the electronic device than the second field of view; and determining that an object is moving away from the electronic device based at least in part on the first data, and the second data, and the determining that the first motion sensor detected the first motion before the second motion sensor detected the second motion.

14. The electronic device as recited in claim 9, the one or more computer-readable media storing further instructions that, when executed by the one or more processors, cause the one or more processors to perform further operations comprising:

storing first data representing a first angle associated with the first motion sensor, the first angle being with respect to a plane associated with the electronic device;

storing second data representing a second angle associated with the second motion sensor, the second angle being with respect to the plane associated with the electronic device; and determining that an object is moving away from the electronic device based at least in part on the first data, and the second data, and the determining that the first motion sensor detected the first motion before the second motion sensor detected the second motion.

15. The electronic device as recited in claim 9, wherein:

the determining that the first motion sensor detected the first motion using the first signal comprises determining that a first voltage represented by the first signal is greater than a threshold voltage; and the determining that the second motion sensor detected the second motion using the second signal comprises determining that a second voltage represented by the second signal is greater than the threshold voltage.

16. An electronic device comprising:

a camera;

a first motion sensor;

a second motion sensor;

one or more processors; and one or more computer-readable media storing instructions that, when executed by the one or more processors, cause the one or more processors to perform operations comprising:

receiving a first signal generated by the first motion sensor;

determining, using the first signal, that the first motion sensor detected first motion;

receiving a second signal generated by the second motion sensor;

determining, using the second signal, that the second motion sensor detected second motion;

determining that the first motion sensor detected the first motion before the second motion sensor detected the second motion;

based at least in part on the first motion sensor detecting the first motion before the second motion sensor detected the second motion, generating first image data using the camera receiving a third signal generated by the second motion sensor;

determining, using the third signal, that the second motion sensor detected third motion;

receiving a fourth signal generated by the first motion sensor;

determining, using the fourth signal, that the first motion sensor detected fourth motion;

determining that the second motion sensor detected the third motion before the first motion sensor detected the fourth motion; and based at least in part on the second motion sensor detecting the third motion before the first motion sensor detected the fourth motion, generating second image data using the camera.

17. The electronic device as recited in claim 16, the one or more computer-readable media storing further instructions that, when executed by the one or more processors, cause the one or more processors to perform further operations comprising receiving an instruction from a user device, the instruction to generate the first image data based at least in part on the first motion sensor detecting first motion before the second motion sensor detects second motion.

18. The method as recited in claim 1, further comprising:
   determining that a first object is moving in a first direction based at least in part on the first motion sensor detecting the first motion before the second motion sensor detected the second motion; and
   determining that a second object is moving in a second direction based at least in part on the second motion sensor detecting the third motion before the first motion sensor detected the fourth motion.

19. The method as recited in claim 18, further comprising:
   receiving a first instruction to generate the first image data based at least in part on the first object is moving in the first direction; and
   receiving a second instruction to generate the second image data based at least in part on the second object is moving in the second direction.

20. The method as recited in claim 1, further comprising:
   determining that the second time is within a threshold period of time to the first time; and
   determining that the third time is outside of the threshold period of time to the second time.

\* \* \* \* \*